(12) United States Patent
Kumagai et al.

(10) Patent No.: US 7,222,794 B2
(45) Date of Patent: May 29, 2007

(54) OPTICAL READER APPLICABLE TO PLURALITY OF USES

(75) Inventors: Toshimitsu Kumagai, Kawasaki (JP); Mitsuharu Ishii, Kawasaki (JP); Yuichirou Takashima, Kawasaki (JP); Hiroaki Katoh, Kawasaki (JP); Toshitaka Aoki, Kawasaki (JP)

(73) Assignee: Fujitsu Limiteed, Kawasaki (JP)

( * ) Notice: Subject to any disclaimer, the term of this patent is extended or adjusted under 35 U.S.C. 154(b) by 0 days.

(21) Appl. No.: 10/234,149

(22) Filed: Sep. 5, 2002

(65) Prior Publication Data
US 2003/0001014 A1    Jan. 2, 2003

Related U.S. Application Data

(62) Division of application No. 09/227,529, filed on Jan. 8, 1999, now Pat. No. 6,811,086.

(51) Int. Cl.
*G06K 7/10* (2006.01)
(52) U.S. Cl. ............... 235/462.43; 235/462.01; 235/462.09
(58) Field of Classification Search ........... 235/462.01, 235/462.09, 462.35, 462.44, 462.45, 462.48, 235/472.01, 462.14, 462.43
See application file for complete search history.

(56) References Cited

U.S. PATENT DOCUMENTS 3,718,783 A    2/1973   Kemenczky ........... 200/1 R
(Continued)

FOREIGN PATENT DOCUMENTS

EP        0 460 669      12/1991
(Continued)

OTHER PUBLICATIONS

Japanese Office Action Communication for corresponding Japanese Application No. 3-214278 and 63-149775 dated Jul. 31, 2001.
Patent Abstracts of Japan vol. 018, No. 247 (p. 1735), May 11, 1994.
Patent Abstracts of Japan vol. 017, No. 619 (p. 1644), Nov. 15, 1993 and JP 05 196855 A (Ricoh Co Ltd), Aug. 6, 1993.
Office Action dated Jun. 20, 2003 in corresponding Chinese Patent Application No. 96110684.0.
European Patent Office Communication for corresponding European Patent Office Action 03019172 including European Search Report dated Oct. 27, 2003.

*Primary Examiner*—Ahshik Kim
(74) *Attorney, Agent, or Firm*—Armstrong, Kratz, Quintos, Hanson & Brooks, LLP

(57) ABSTRACT

An optical reader capable of reading a bar code in a mounted state when an article carrying the bar code passes and of reading bar codes set in array on a menu sheet in a hand-held state has been disclosed. The optical reader comprises a light source, a scanner that is driven by a drive and scans light emanating from the light source, a plurality of reflection mirrors that reflect scanning light scanned by the scanner and create a scanning pattern composed of a plurality of scan trajectories, a read window through which scanning light reflected from the reflection mirrors is emitted, and a light receiver for receiving light reflected from a mark. The optical reader further comprises a mode changer for changing a plurality of operation modes among which one or ones of the plurality of scan trajectories to be validated for reading are different. The operation modes include a specific scanning ray mode in which reading the mark by tracing only a given scan trajectory constituting the scanning pattern is validated but reading the mark by tracing the other scan trajectories is invalidated. For reading any of bar codes set in array on a menu sheet, the given scan trajectory constituting the scanning pattern will be drawn on a bar code to be read. Since reading by tracing the other scan trajectories is invalid, only the bar code to be read is read.

2 Claims, 84 Drawing Sheets

U.S. PATENT DOCUMENTS

| | | | |
|---|---|---|---|
| 4,578,571 A | 3/1986 | Williams | 235/472 |
| 4,652,732 A | 3/1987 | Nicki | 235/462 |
| 4,766,297 A | 8/1988 | McMillan | 235/455 |
| 4,825,058 A | 4/1989 | Poland | 235/472 |
| 4,871,904 A * | 10/1989 | Metlitsky et al. | 235/462.38 |
| 5,059,779 A | 10/1991 | Krichever et al. | 235/467 |
| 5,107,100 A | 4/1992 | Shepard et al. | 235/472 |
| 5,124,539 A | 6/1992 | Krichever et al. | 235/472 |
| 5,140,141 A | 8/1992 | Inagaki et al. | 235/462 |
| 5,177,345 A | 1/1993 | Baitz | 235/462 |
| 5,198,650 A | 3/1993 | Wike, Jr. | 235/467 |
| 5,200,599 A | 4/1993 | Krichever et al. | 235/472 |
| 5,214,270 A | 5/1993 | Rando | 235/472 |
| 5,216,232 A | 6/1993 | Knowles et al. | 235/467 |
| 5,231,277 A | 7/1993 | Aritake et al. | 235/462 |
| 5,235,167 A | 8/1993 | Dvorkis et al. | 235/462 |
| 5,260,553 A | 11/1993 | Rockstein et al. | 235/462.01 |
| 5,274,219 A * | 12/1993 | Harden et al. | 235/462.44 |
| 5,340,973 A | 8/1994 | Knowles et al. | 235/462 |
| 5,406,063 A | 4/1995 | Jelen | 235/472 |
| 5,408,081 A | 4/1995 | Barkan | 235/462 |
| 5,420,411 A * | 5/1995 | Salatto, Jr. et al. | 235/462.22 |
| 5,436,440 A | 7/1995 | Barkan | 235/462 |
| 5,446,272 A | 8/1995 | Barkan | 235/462 |
| 5,475,207 A | 12/1995 | Bobba et al. | 235/467 |
| 5,477,044 A | 12/1995 | Aragon | 235/472 |
| 5,484,992 A | 1/1996 | Wilz et al. | 235/472 |
| 5,500,516 A | 3/1996 | Durbin | 235/472 |
| 5,504,316 A * | 4/1996 | Bridgelall et al. | 235/462.07 |
| 5,528,024 A * | 6/1996 | Rockstein et al. | 235/462.22 |
| 5,545,888 A | 8/1996 | Barkan et al. | 235/462 |
| 5,581,072 A | 12/1996 | Bridgelall et al. | 235/462 |
| 5,591,953 A | 1/1997 | Rockstein et al. | 235/462 |
| 5,594,228 A | 1/1997 | Swartz et al. | 235/383 |
| 5,612,530 A | 3/1997 | Sanders et al. | 235/462 |
| 5,619,028 A | 4/1997 | Barkan | 235/462 |
| 5,637,851 A | 6/1997 | Swatz et al. | 235/462 |
| 5,691,528 A * | 11/1997 | Wyatt et al. | 235/462.07 |
| 5,693,930 A | 12/1997 | Katoh et al. | 235/462 |
| 5,719,385 A * | 2/1998 | Wike, Jr. et al. | 235/462.09 |
| 5,763,865 A | 6/1998 | Swift et al. | 235/472 |
| 5,783,813 A | 7/1998 | Metlitsky et al. | 235/472 |
| 5,796,091 A | 8/1998 | Schmidt et al. | 235/472 |
| 5,811,780 A | 9/1998 | Rockstein et al. | 235/462 |
| 5,902,989 A | 5/1999 | Metlitsky et al. | 235/472.01 |
| 5,952,644 A | 9/1999 | Barkan | 235/463 |
| 5,962,838 A * | 10/1999 | Tamburrini | 235/462.45 |
| 5,988,502 A * | 11/1999 | Krichever et al. | 235/454 |
| 5,992,747 A | 11/1999 | Katoh et al. | 235/462.43 |
| 6,053,413 A | 4/2000 | Swift et al. | 235/472.01 |
| 6,065,676 A | 5/2000 | Ring et al. | 235/462.43 |
| 6,216,951 B1 | 4/2001 | Swift et al. | 235/462.45 |
| 6,216,953 B1 | 4/2001 | Kumagai et al. | 235/462.14 |
| 6,575,368 B1 * | 6/2003 | Tamburrini et al. | 235/462.25 |

FOREIGN PATENT DOCUMENTS

| | | |
|---|---|---|
| EP | 0 543 649 | 5/1993 |
| EP | 0 653 723 | 5/1995 |
| GB | 1 487 431 | 9/1977 |
| JP | 60-136911 | 7/1985 |
| JP | 60-246015 | 12/1985 |
| JP | 62-14550 | 1/1987 |
| JP | 63-39769 | 3/1988 |
| JP | 63-149775 | 6/1988 |
| JP | 1-155563 | 10/1989 |
| JP | 3-214278 | 9/1991 |
| JP | 04-21918 | 1/1992 |
| JP | 04-040680 | 2/1992 |
| JP | 04-219618 | 8/1992 |
| JP | 05-074086 | 3/1993 |
| JP | 6-28508 | 2/1994 |
| JP | 6-502949 | 3/1994 |
| WO | WO 93/06565 | 4/1993 |

* cited by examiner

Fig. 21
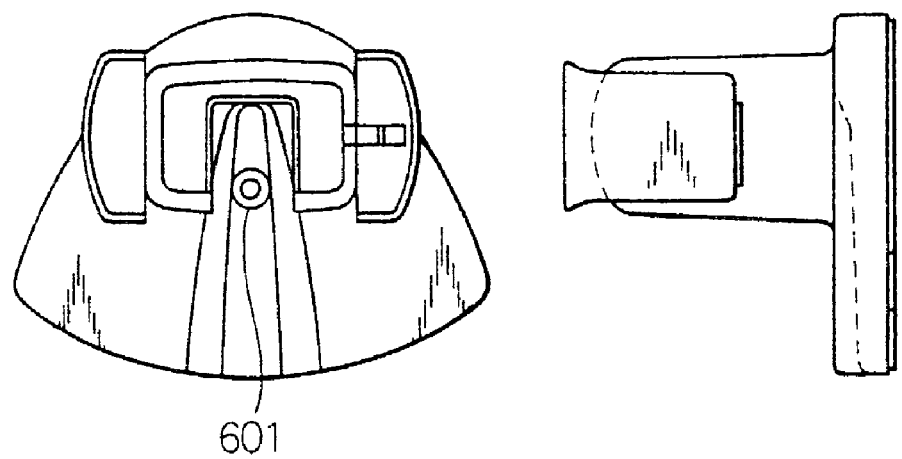
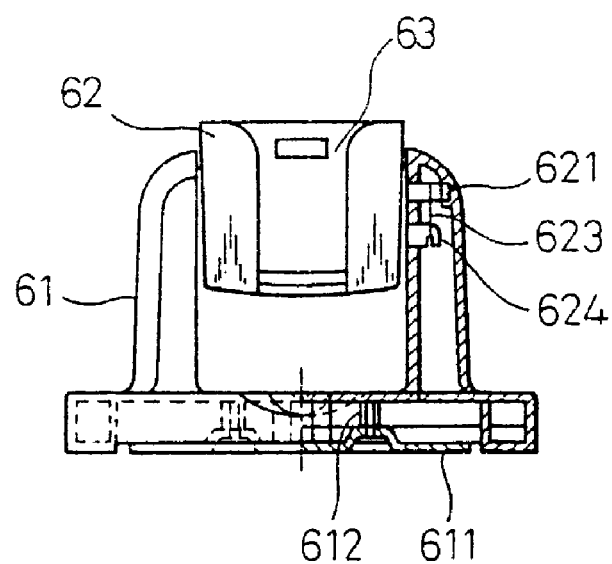

Fig. 22
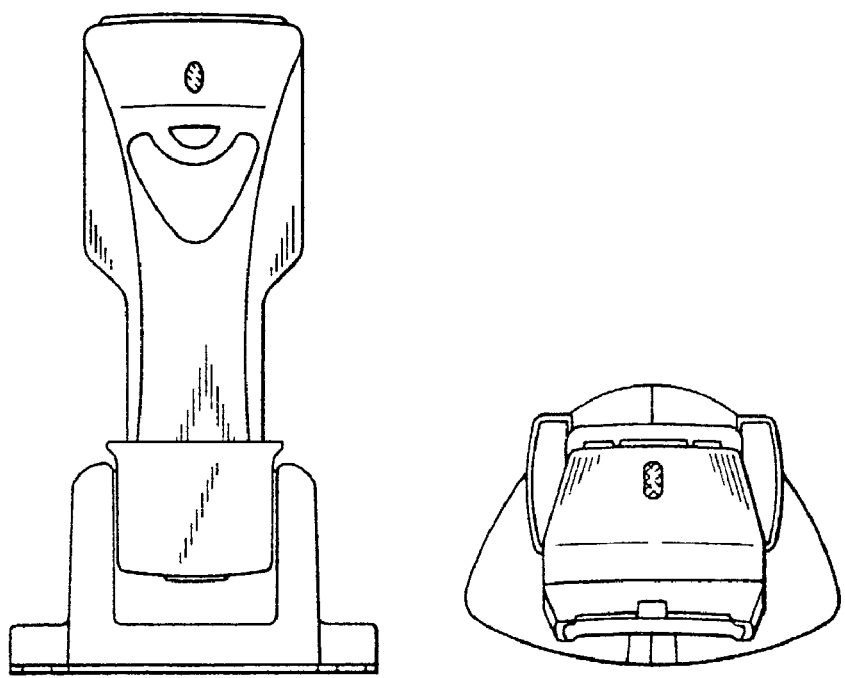
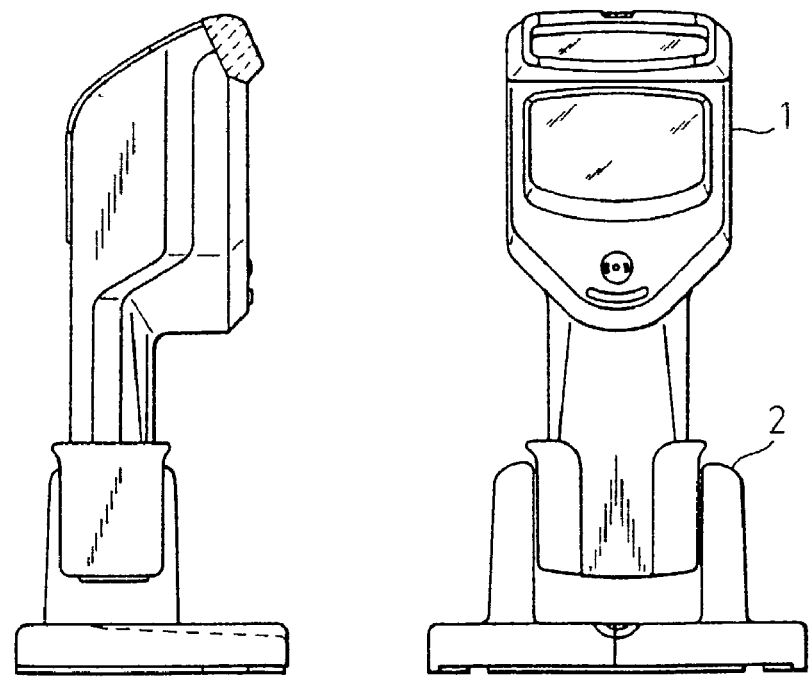

Fig. 25
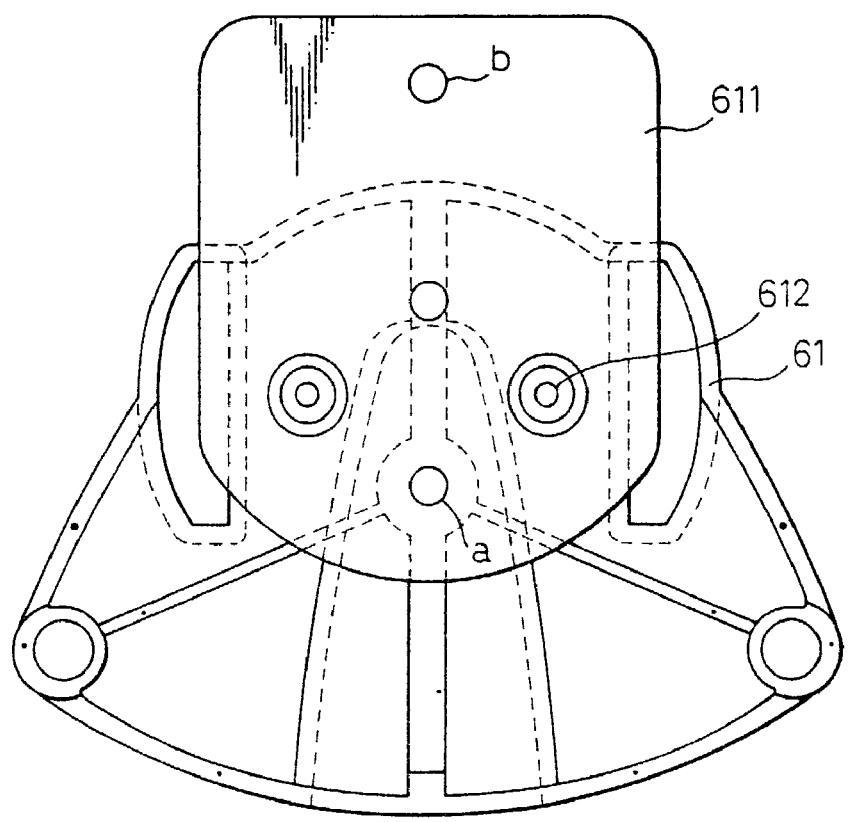
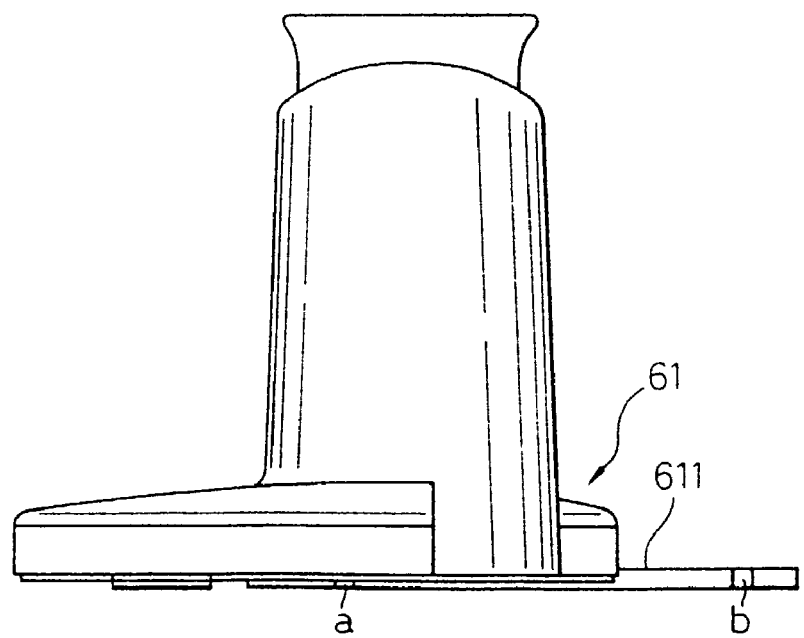

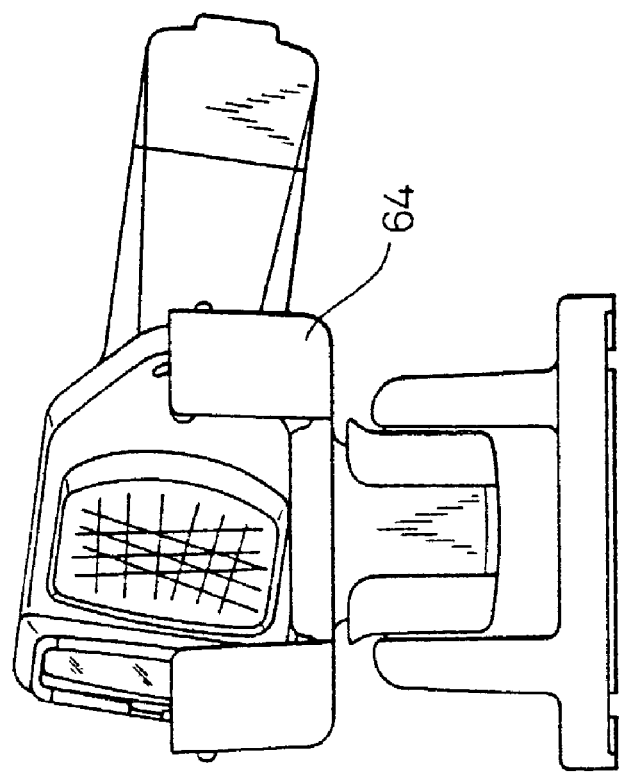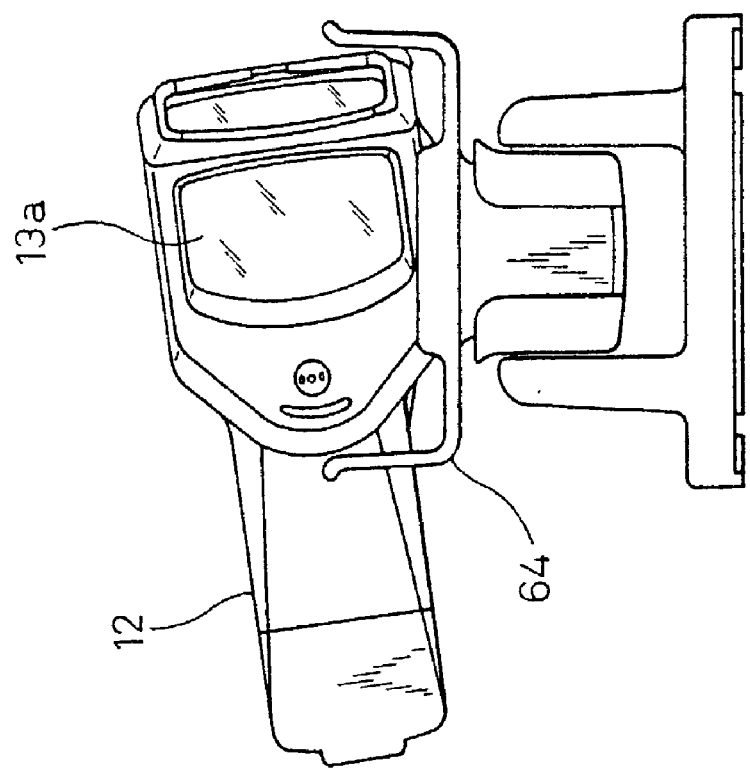

Fig.48
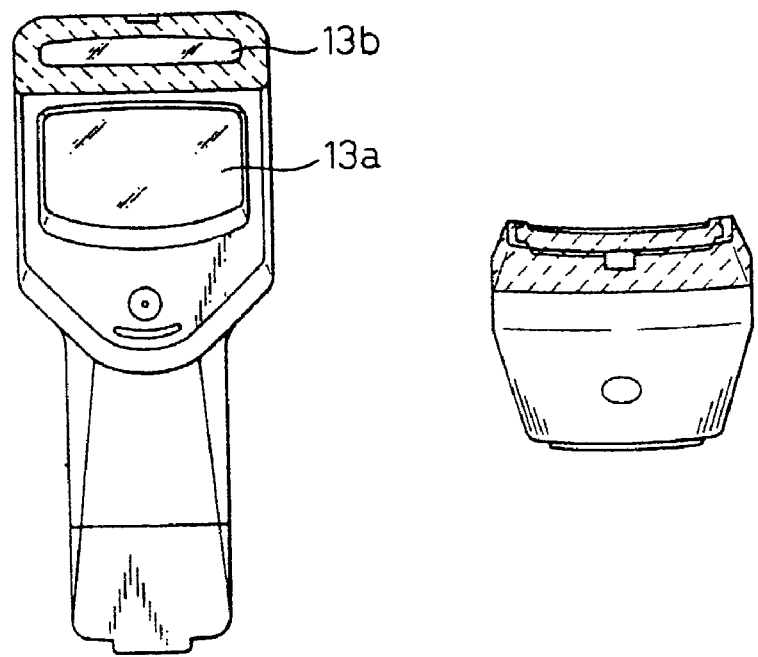
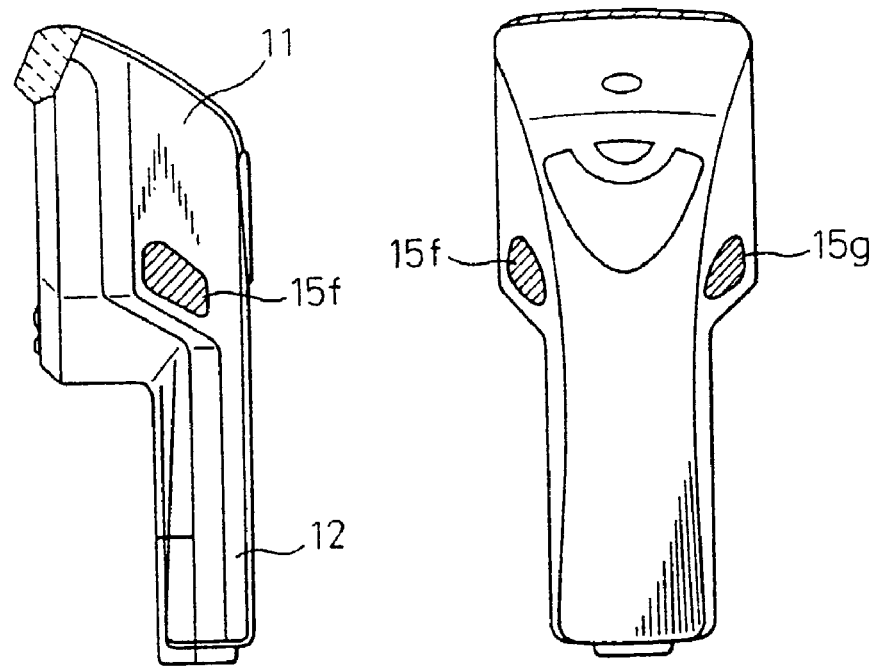

Fig. 56
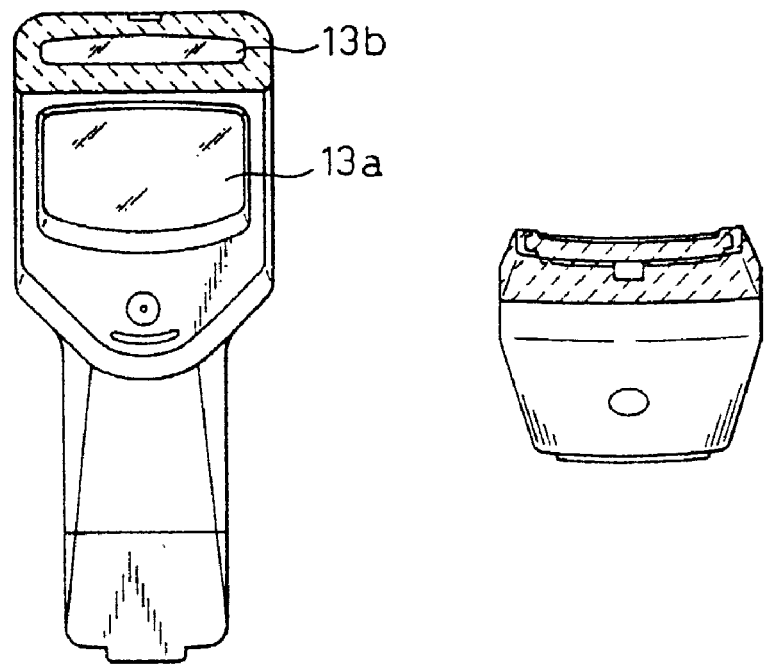
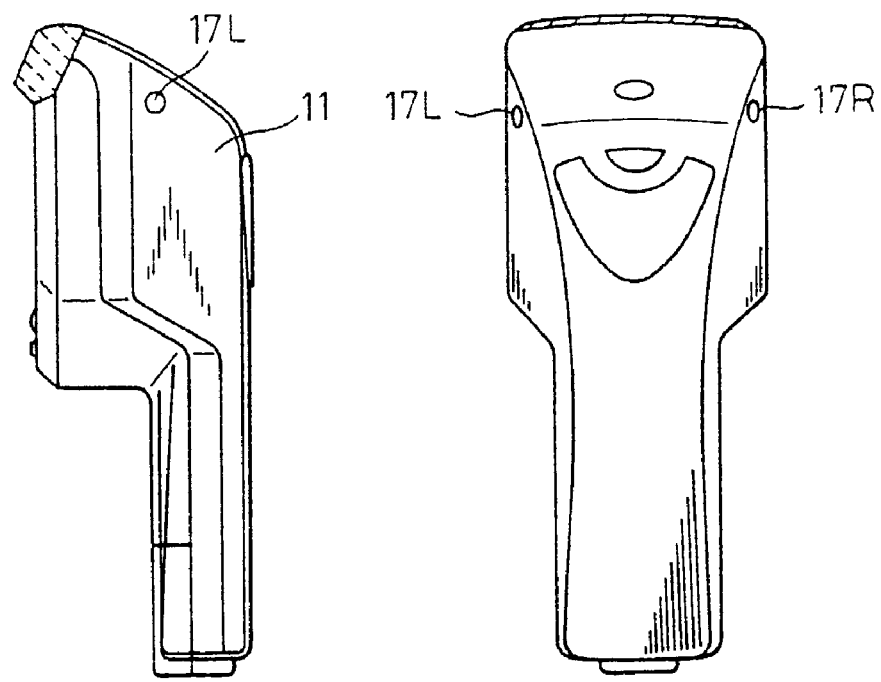

Fig. 60
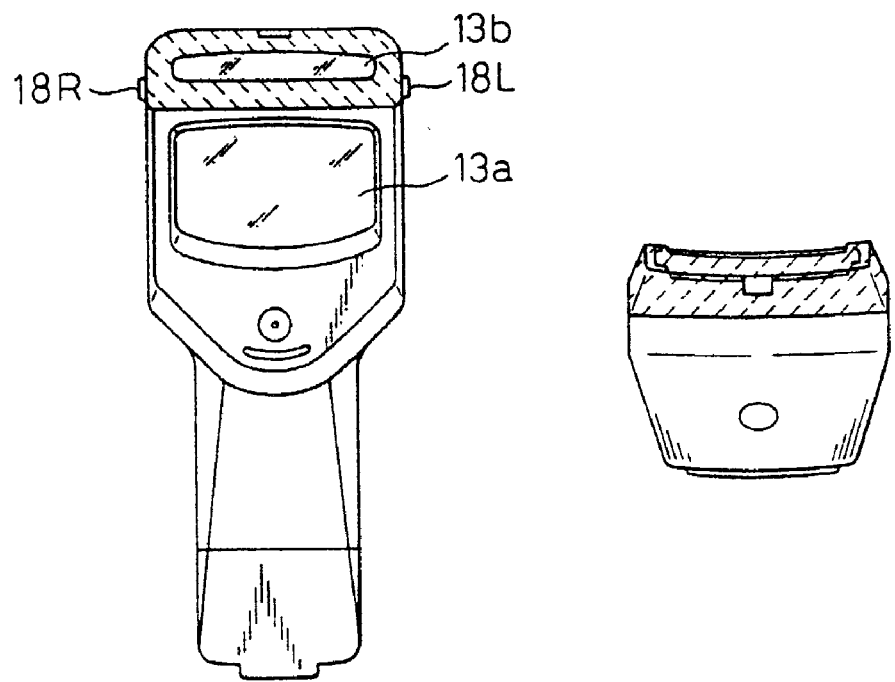
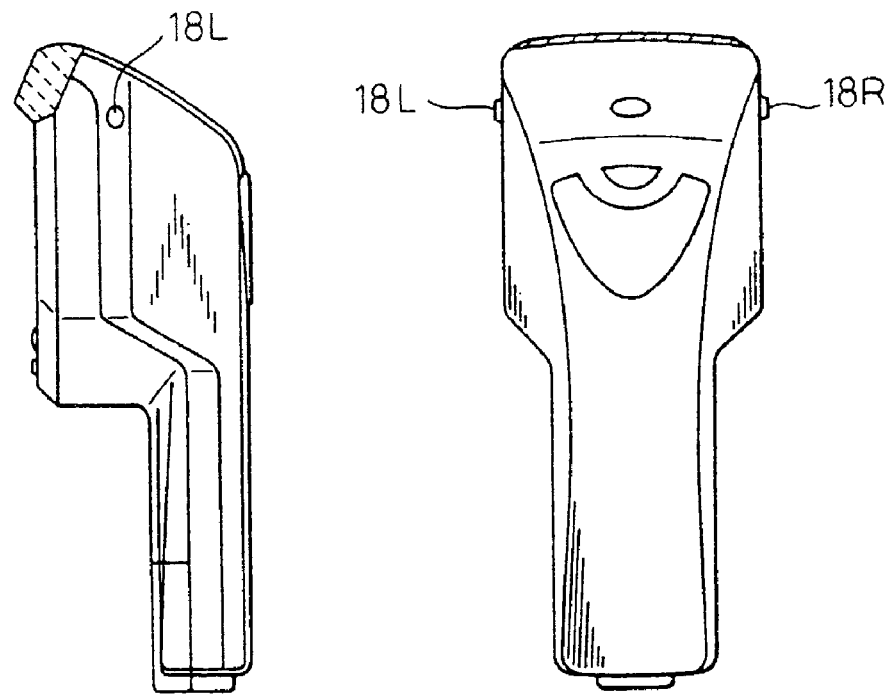

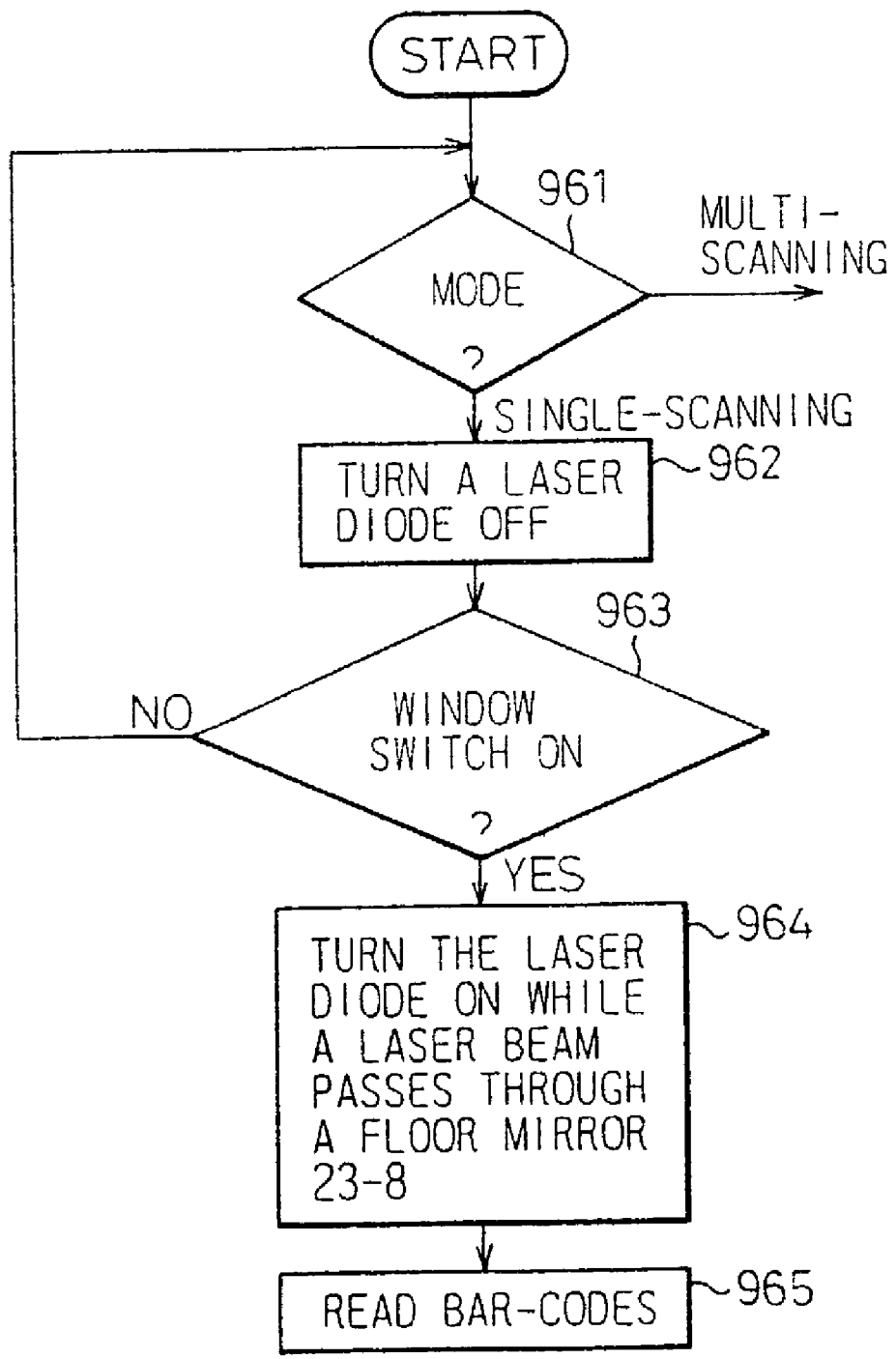

OPTICAL READER APPLICABLE TO PLURALITY OF USES

RELATED APPLICATIONS

This application is a divisional application of U.S. patent application Ser. No. 09/227,529, filed Jan. 8, 1999, now U.S. Pat. No. 6,811,086, issued on Nov. 2, 2004, which claims the benefit of priority under 35 USC § 119 of Japanese Application No. 7-183768, filed Jul. 20, 1995 and Japanese Application No. 8-107928, filed Apr. 26, 1996, the contents of which are incorporated herein by reference.

BACKGROUND OF THE INVENTION

1. Field of the Invention

The present invention relates to an optical reader, or more particularly, to a compact bar-code reader applicable to portable use.

In recent years, information input using bar codes has prevailed. For example, when a shopper purchases a product at a store, a bar-code reader is used to read a bar code carried by the product. Thus, the product code provided in the form of the bar code can be input and the purchase can be registered.

For controlling inventories in a warehouse, it has become a matter of daily practice to read bar codes carried by the inventory or by containers for the inventory and to carry out inventory control on the basis of the read data.

Thus, the bar-code reader is employed in information input for a variety of applications. Bar-code readers of optimal forms (shapes or the like) are used for the respective applications. The present invention realizes a bar-code reader usable for various kinds of applications.

2. Description of the Related Art

Conventional bar-code readers are broadly divided by application into stationary readers and portable (hand-held) readers.

The stationary reader is literally a reader placed on, for example, a cashier's counter or a conveyer for carrying articles. The stationary reader has a read window. Scanning light such as laser light is emitted through the read window. The scanning light emitted through the read window is irradiated to an article bearing a bar code. The surface of the article is scanned by the scanning light. The scanning light scanner over the article is reflected. The reflected light is received through the read window, whereby the bar code is read. An article that is an object of bar-code reading passes a position at a distance from the reader.

The orientation of bar codes passing in front of the reader are not always a constant direction but are usually various directions (inclinations). A general stationary reader therefore produces scanning light so as to generate a scanning pattern created by scanning rays traveling in a plurality of directions, in particular, a scanning pattern created by mutually-intersecting scanning rays.

A light reception sensor for receiving light reflected from a bar code is incorporated in the stationary reader. Light reflected from a bar-code surface is scattered light. A condenser for gathering as much of the light reflected from a bar code as possible is therefore placed in front of the light reception sensor.

As mentioned above, the stationary reader is designed to read bar codes of articles passing a position away from the reader. The focal position of scanning light emitted through the read window is therefore set to a position away from the read window.

In the case of the stationary reader, a user is required to merely pass articles in front of the read window. Bar codes are then read out. Scanning for bar-code reading is very simple. Maneuverability is excellent. In particular, even when it is required to read bar codes carried by a large number of articles for a limited period of time, since the articles need merely be passed in front of the reader, bar-code reading can be achieved efficiently.

The hand-held reader is a reader which is held in a hand and of which the read window is directed toward articles in order to read bar codes carried by the articles.

In the case of the stationary reader, since articles must be passed in front of the read window, when an article, for example, a heavy article or large article is hard to pass the read window, the maneuver for reading is hard to do. In case an article contains liquid or an article cannot be tilted, it is conceivable that the article may be passed in front of the read window but the bar-code surface thereof may not be able to be directed toward the read window.

In contrast, a hand-held reader is designed to approach an article for reading. Even if an article bearing a bar code is large or heavy, the bar code can be read readily. Even when an article cannot be tilted, a bar code can be read by bringing the reader to the position of the bar code.

Herein, a gun-shaped reader has, similarly to the stationary reader, a form suitable for reading the bar code of an article located relatively distant. The gun reader has a grip by which a user grasps and operates the reader.

In the case of the gun reader, a user holds the grip and directs a read window thereof toward a bar code to be read. A laser light source is lit by manipulating a trigger switch formed on the grip. A scanning beam is then emitted through the read window, whereby the bar code is read out.

Unlike the aforesaid readers, a touch-system reader is a reader that is brought into contact with a bar code for reading or that is used to read a bar code located very near. A light source such as an LED and a light reception sensor such as a CCD are incorporated in the tough reader. For reading a bar code, a light source illuminates the bar-code surface. Light reflected from the bar code is then received by the light reception sensor.

There is a method to be adopted when bar codes cannot be affixed directly to products or the like, wherein: a plurality of bar codes are recorded on a menu sheet in order to create a so-called bar-code menu; and when it is required to input product information, a necessary bar code is read out. Numerous different bar codes are recorded mutually adjacent on the bar-code menu. When an attempt is made to read the bar-code menu, only the bar code to be read must be read by the reader but unwanted bar codes must not be read thereby.

However, in the case of the stationary reader or the like, scanning rays to be scanned in a plurality of directions (or sometimes mutually-intersecting scanning rays) are emitted. The scan range covered by the stationary reader is very wide. When this kind of reader is used to scan a bar-code menu, the possibility of scanning and reading unnecessary bar codes is very high. It is quite hard to scan only a specific bar code. Moreover, for reading a bar-code menu using the gun reader, a method in which the reader is distant from or near to the bar-code menu is conceivable. In this case, when the gun reader is located at a distant position, it is hard to align a bar code with a position scanned by the reader. When the gun reader is too closed, the read window interferes with locating the position being scanned. When an attempt is made to read a bar-code menu using either the stationary or gun reader, bar codes that need not to be read are read out. These readers are therefore unsuitable for reading the bar-code menu.

By contrast, the touch reader is brought into contact with a bar code or located at a position very close to the bar code. A very limited range alone is an object range of reading. The touch reader can easily read specific bar codes alone selectively and is therefore very suitable for reading a bar-code menu.

As mentioned above, readers associated with bar-code read forms have been used in the past. The readers may be suitable for certain applications but may not be suitable for other applications. The readers are applicable to only specific applications. For coping with various read forms, readers associated with the read forms must be prepared.

For example, as mentioned above, it is difficult for the stationary reader to read bar codes borne by articles that are difficult to pass in front of the read window; such as, heavy articles. When the bar codes borne by such articles must be read, the hand-held reader must be made ready to operate.

By contrast, in the case of the hand-held reader, it is required to direct the reader toward a bar code. Especially, in the case of the touch reader, the reader must approach a bar code to such an extent that it comes into contact with the bar code. The maneuverability for reading is poor. When numerous bar codes must be read in a short period of time, the use of the stationary reader is essential to improvement of reading efficiency.

Furthermore, since the stationary reader and gun reader scan a wide range, there is a possibility of reading excessive bar codes. The stationary reader and gun reader are therefore unsuitable for reading a bar-code menu. Especially, in the case of the gun reader, when the reader is too close to a menu sheet, a bar code is hidden behind the face of the reader. It becomes hard to located a position of the menu sheet being scanned or to check if a bar code that is an object of reading is being scanned successfully.

When there is a possibility of reading a bar-code menu, the use of the touch reader is needed. However, the touch reader cannot read a bar code located at a distance.

Consequently, optimal readers must be prepared for various read forms. However, preparing two or three kinds of readers for different read forms leads to an increase is cost involved in installing equipment. Besides, the case in which the use frequencies of readers dedicated to different applications are the same is rarer than the case in which the use frequencies of some of the readers dedicated to specific applications are higher There is difficulty even cost-wise in preparing readers, which operate in rarely-used forms, just in case.

For preparing readers that operate in a plurality of forms, an extra space is needed to install the plurality of readers. However, only a limited space can be allocated to, for example, a cashier's counter. When a store itself is narrow, it cannot afford to install the plurality of readers. In this case, the idea of installing the plurality of readers itself becomes a disadvantageous condition for the store.

SUMMARY OF THE INVENTION

An object of the present invention is to realize a reader applicable to different read forms.

For coping with different read forms using one reader, it is required to change the reader among read modes associated with the read forms whenever it becomes necessary. The present invention is characterized in that it realizes a mechanism for manually or automatically changing read modes optimally for the read forms in which a reader operates.

Furthermore, an object of the present invention is to assist in and facilitate the user's work of reading by setting the emission direction of a scanning ray according to each read form or by indirectly notifying the user of the scan direction of a scanning ray.

Yet another object of the present invention is to design a stand needed to use a reader as a stationary reader so that the stand will be user-friendly.

Still another object of the present invention is to improve an optical system for a reader.

An optical reader according to the present invention scans a mark carried by an article using scanning light, detects light reflected from said mark, and thus reads information represented by said mark. The optical reader comprises: a light source; a scanning means that is driven by a driving means and scans light emanating from the light source; a plurality of reflection mirrors for reflecting scanning light scanned by the scanning means and creating a scanning pattern composed of a plurality of scan trajectories; a read window through which scanning light reflected from the reflection mirrors is emitted; and a light receiving means for receiving light reflected from the mark; and a mode changing means for changing a plurality of operation modes among which one or ones of the plurality of scan trajectories to be validated for reading are different, the plurality of operation modes including a specific scanning ray mode in which reading the mark using only a specific scan trajectory constituting the scanning pattern is validated and reading the mark using the other scan trajectories is invalidated.

According to the present invention, in the specific scanning ray mode, only a specific scan trajectory is validated and the other scan trajectories are invalidated, therefore, other marks except a target mark are not read. This is particularly effective when bar-codes on a menu sheet are read.

The read window is divided into a first area and a second area, scanning rays tracing the other scan trajectories are output through the first area, and a scanning ray tracing the given scan trajectory is output through the second area. The first area is a first read window, and the second area is a second read window independent of the first read window. The emission direction of a scanning ray tracing the given scan trajectory is obliquely upwards relative to scanning rays tracing the other scan trajectories, and the second read window is located above the first read window, and the face of the second read window is located obliquely to the face of the first read window.

According to these constitutions, a user can easily recognize the position from which the given scan trajectory is output.

The scanning means is a rotary polygon mirror that has a plurality of reflection surfaces and that is driven to rotate by means of the driving means, and at least one of the plurality of reflection surfaces is placed at an angle, which is different from an angle at which the other reflection surfaces are placed, with respect to an axis of rotation of the rotary polygon mirror. The reflection mirrors include a first group of reflection mirrors for determining the other scan trajectories and a second group of reflection mirrors for determining the given scan trajectory. The second group of reflection mirrors comprises a single reflection mirror. The other scan trajectories are traced by a plurality of intersecting scanning rays, and the given trajectory is traced by a scanning ray scanned in one direction. The focal position of scanning rays tracing the other scan trajectories is set to a position separated by a first distance from the first area, and the focal position of a scanning ray tracing the given scan trajectory is set to a second position that is closer to the read window than the first position. The second position lies on the face of the second area of the read window. A scan width on the read window permitted by a scanning ray tracing the given scan trajectory is larger than a scan width on the read window permitted by scanning rays tracing the other scan trajectories.

The optical reader comprises emission position indicating means for indicating positions between which a scanning ray tracing the given scan trajectory is emitted through the read window. The emission position indicating means are marks inscribed on the sides of the read window. The emission position indicating means are indicating means for indicating the start point and end point of scanning light emitted through the read window and notifying a user of the fact that reading the mark is completed. The emission position indicating means are projections projecting from positions coincident with the start point and end point of scanning light emitted through the read window. The projections are extending to the focal position of a scanning ray that is emitted through the read window and that traces the given scan trajectory.

The second read window is located at a position away from the first read window. The optical reader further comprises a transparent cover attached to the face of the second read window, wherein the focal position of a scanning ray that is emitted through the second read window and traces the given scan trajectory lies at the tip of the transparent cover.

The optical reader further comprises a mode selection instructing means for instructing which of the plurality of operation modes should be selected, wherein the mode changing means selects an operation mode instructed by the mode selection instructing means. The mode selection instructing means is a switch to be manipulated by a user. The switch has a switch plate that is placed on the top of the switch and that pressurizes the switch. The mode selection instructing means comprises a plurality of manipulable parts, and the contents of instruction made by the instructing means are changed into the contents of instruction other than selection of any of the plurality of operation modes according to whether one of the plurality of manipulable parts is manipulated or the plurality of manipulable parts are manipulated simultaneously. The mode selection instructing means includes a detecting means located on at least one of the lateral sides of the optical reader, and any of the plurality of operation modes is selected according to a mounted state of the optical reader which is detected on the basis of an output of the detecting means.

The optical reader can be mounted in a specific holding member, the mode selection instructing means is a set detecting means for detecting whether or not the optical reader is mounted in the specific holding member, and when the set detecting means detects that the optical reader is mounted in the specific holding member, an operation mode other than the specific scanning ray mode is selected. The set detecting means is a switch to be pushed by a jut formed on the specific holding member when the optical reader is mounted in the specific holding member. The set detecting means is a specific mark detecting means that when the optical reader is mounted on the specific holding member, detects if scanning light emitted through one of the areas of the optical reader has detected the mark. The optical reader further comprises a second instructing means for use in designating an operation mode, wherein an operation mode is selected according to a combination of the state of the first instructing means and the state of the second instructing means.

The mode changing means given control so that in the given operation mode, the light source will be lit only for a period during which a scanning ray tracing the given scan trajectory is being output. The specific scan trajectory validating means gives control so that in any mode other than the given operation mode, the light source is put out for a period during which scanning rays tracing the other scan trajectories are being output. The specific scan trajectory validating means gives control so that in the given operation mode, the operation of the light receiving means will be validated only for a period during which a scanning ray tracing the given scan trajectory is being output. The specific scan trajectory validating means gives control so that in any mode other than the specific operation mode, the operation of the light receiving means will be invalidated for a period during which scanning rays tracing the other scan trajectories are being output. Invalidating the operation of said light receiving means is invalidation of the decoding of said read mark.

In the optical reader, the light source, scanning means, plurality of reflection mirrors, read window, and light receiving means are stowed in a head. The optical reader further comprises a grip that is provided with the head and enables a user to grasp the optical reader. The back side of the head is molded obliquely. The back side of the head is molded to be angled in the emission direction of scanning light emitted through the second area. The back side of the head has a concave dent formed so that scanning light emitted through the second area can be discerned.

The optical reader further comprises a notifying means for notifying a user of a selected mode. The notifying means is an indicating means, and the indication form of the indicating means is varied depending on a selected mode. The indicating means selects continual indication or intermittent indication according to a selected mode. The notifying means is a speaker for generating a notification sound, and the notification sound is varied depending on a selected mode. The notifying means is a means for reporting the result of reading of the mark, and the notification form for the result of reading to be notified by the notifying means is varied depending on a selected mode.

An optical reader according to a second aspect of the present invention scans a mark borne by an article using scanning light, detects light reflected from the mark, and thus reads information represented by said mark. The optical reader comprises:

a light source; a scanning means that is driven by a driving means and scans light emanating from the light source; a plurality of reflection mirrors for reflecting scanning light scanned by the scanning means and creating a scanning pattern composed of a plurality of scan trajectories; a read window through which scanning light reflected from the reflection mirrors is emitted; a head including a light receiving means for receiving light reflected from the mark; and a grip being provided with the head and enabling a user to grasp the optical reader.

A switch according to the present invention, comprises: a switch body incorporated in an apparatus; and a switch plate that is attached to the top of said switch body and that depresses said switch body when manipulated, the switch plates is supported at two or more supporting points; and when the switch plate is manipulated, the switch plate is pivoted in a manipulated direction with the supporting points as fulcrums and the switch body is pressurized. The supporting points are three supporting points arranged in the form of a triangle, and the switch plate is held on the apparatus at the three supporting points.

A stand according to the present invention is used to hold an optical reader. The optical reader has a read window through which scanning light is emitted and a grip enabling a user to grasp said optical reader, and which scans a mark borne by an article using scanning light emitted through said read window, detects light reflected from said mark, and thus reads information. The stand comprises: a holder section in which the grip is mounted so that the grip can be dismounted freely; and a base for supporting the holder section so that the holder section can pivot, said holder section has a slit, through which a cable coupled with the optical reader can pass, on the same side thereof as the side of the optical reader having the read window. A concave dent is formed from a position on the base coincident with a lower end of the grip of the optical reader mounted toward the forward side of the stand. The holder section has a member to be actuated with an instruction sent from the optical reader so that a state in which the optical reader is mounted on the stand can be reported to the optical reader. The member is shaped like a jut, and when the optical reader is mounted on the stand, the member pushes the instructing means. The member is a mark readable by the optical reader, and the mark is located at a position enabling scanning light emanating from the optical reader mounted on the stand to scan the mark.

A stand according to another aspect of the present invention is used to mount an optical reader on it. The optical reader includes a read window through which scanning light is emitted and a grip enabling a user to grasp the optical reader, and which scans a mark borne by an article using scanning light emitted through the read window, detects light reflected from the mark, and thus reads information. The stand comprises a stand member on which the optical reader is mounted in such a manner that the grip of the optical reader will face laterally. The stand further comprises:

a holder section in which the grip is mounted so that the grip can be dismounted freely; and a base for supporting said holder section so that said holder section can pivot, the stand member having a tongue, which is inserted into the holder section so that the tongue can be removed freely, on a bottom thereof. When the optical reader is mounted in the stand member, the optical reader is held at an angle at which at least one scanning pattern, which is composed of a group of scanning rays, of scanning patterns created by scanning rays emitted through the read window of the optical reader, becomes horizontal.

An optical unit for an optical reader according to the present invention comprises a plurality of reflection mirrors; a laser light source; a light reception sensor; a condenser mirror that has a plane mirror, which reflects laser light emanating from the laser light source, around the center thereof and that gathers incident light to the light to the light reception sensor; a rotary scanning means that has a plurality of reflection surfaces for reflecting laser light reflected from said plane mirror, that is driven to rotate by means of a driving means, and that thus scans the laser light; and a frame which is molded as a united body and in which the reflection mirrors, the laser light source, the light reception sensor, the condenser mirror, and the rotary scanning means are locked. The rotary scanning means is mounted on the frame via a cushioning member. The condenser mirror has both edges thereof supported by the frame; one edge of the condenser mirror is supported so that it can move back and forth; the other edge of the condenser mirror is supported so that it can pivot with an axis of pivoting extending in a longitudinal direction of the condenser mirror as a center.

An optical unit according to another aspect of the present invention comprises:

an optical part having a first and second stems formed coaxially on both edges thereof and a third stem formed vertically to the second stem on one of the edges thereof; and a frame on which the optical part is mounted, and which includes a first slit-like bearing into which the first stem is fitted, a second bearing into which the second stem is fitted, and a third elongated bearing into which the third stem is fitted and which forms an arc with the second bearing as a center.

BRIEF DESCRIPTION OF THE DRAWINGS

The present invention will be more clearly understood from the description as set below with reference to the accompanying drawings, wherein:

FIG. 21 is a three-side view of a stand in accordance with an embodiment;

FIG. 22 is a four-side view of a stand on which a reader is mounted;

FIG. 25 is a diagram showing a state in which the plate is attached to a wall;

FIGS. 33A and 33B are views showing the laying stand on which the reader is mounted with the grip of the reader jutted out right and left;

FIG. 48 is a view showing a reader having side switches;

FIG. 55 is a view showing a reader having mode detection sensors on the lateral sides thereof;

FIG. 60 is a reader having detection switches on the lateral sides thereof;

FIG. 64 is a flowchart describing another procedure of read mode change performed by the reader shown in FIG. 62;

DETAILED DESCRIPTION OF THE PREFERRED EMBODIMENTS

Before proceeding to a detailed description of the preferred embodiments of the present invention, prior art bar-code readers will be described with reference to the accompanying drawings thereto for a clearer understanding of the differences between the prior art and the present invention.

Figure 1:
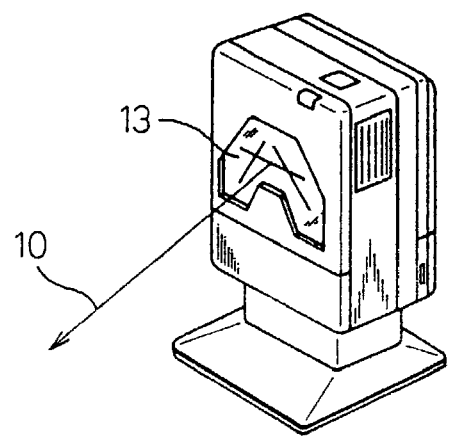
FIG. 1 is a diagram showing a conventional stationary reader.

FIG. 1 is a view showing the appearance of an example of a stationary bar-code reader.

A stationary reader is placed on, for example, a cashier's counter or a conveyer for transporting articles. The stationary reader has a read window 13. Scanning light 10 such as laser light is emitted through the read window. The scanning light emitted through the read window is irradiated to an article bearing a bar code. The structure of the article is scanned by the scanning light. The scanning light scanned over the article is reflected. The reflected light is received through the read window, whereby the bar code is read. Articles that are objects of bar-code reading pass a position at a distance from the reader.

Figure 2A:
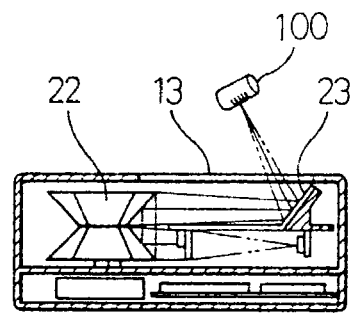
FIGS. 2A and 2B are a sectional view and perspective oblique view of the conventional stationary reader.
Figure 2B:
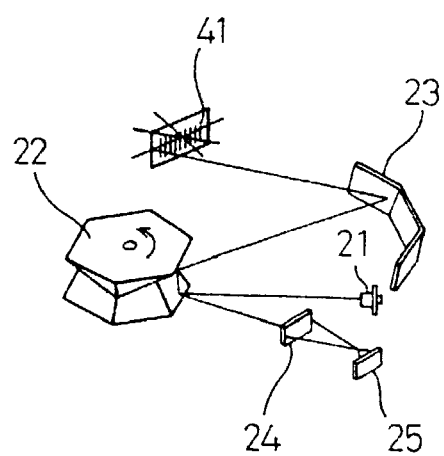

FIGS. 2A and 2B are views showing the internal components of the stationary reader shown in FIG. 1. FIG. 2A is a side sectional view of the reader, and FIG. 2B is a perspective oblique view of the internal components of the reader.

A laser light source 21 for emitting laser light is incorporated in the reader. Laser light emanating from the laser light source is reflected and scanned by a polygon mirror 22 that is driven to rotate by means of a motor and that has a plurality of reflection surfaces, and then enters a patterning mirror 23.

The orientations of bar codes passing in front of the reader are not always a constant direction but usually various directions (inclinations). A general stationary reader therefore produces scanning light so as to generate a scanning pattern created by scanning rays traveling in a plurality of directions, or in particular, a scanning patter created by mutually-intersecting scanning rays. In the reader shown in FIG. 1, the scanning pattern is composed of three scanning rays.

For producing a plurality of scanning rays, the patterning mirror 23 is incorporated in the stationary reader. As shown in FIG. 2B, the patterning mirror includes the same number of mirrors as the number of scanning rays to be generated. In FIG. 2B, the patterning mirror includes three mirrors. A bar-code surface is therefore, as shown in FIG. 2B, scanned using the scanning pattern created by three intersecting scanning rays. Due to this way of scanning, even if a bar code 41 is not level, the bar code can be scanned.

A light reception sensor 25 for receiving light reflected from a bar code is incorporated in the stationary reader. Light reflected from a bar-code surface is scattered light. A condenser lens 24 for gathering as much of the light reflected from a bar code as possible is therefore placed in front of the light reception sensor.

As described previously, the stationary reader is designed to read bar codes of articles passing a position away from the reader. The focal position of scanning light emitted through the read window is set to a position away from the read window.

In the case of the stationary reader, a user should merely have to pass articles in front of the read window. Bar-code reading is then carried out. The maneuver for reading bar codes is very simple. The maneuverability of the reader is therefore excellent. In particular, when it is required to read bar codes carried by a large number of articles for a short period of time, the articles should merely be passed in front of the reader. Bar-code reading can be achieved efficiently.

Figure 3:
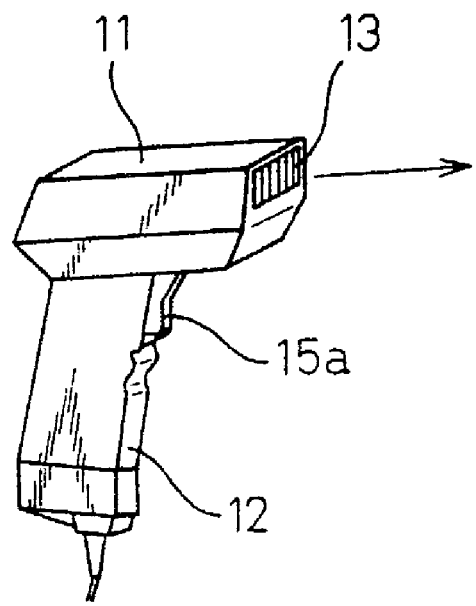
FIG. 3 is a view showing a conventional gun reader.
Figure 4:
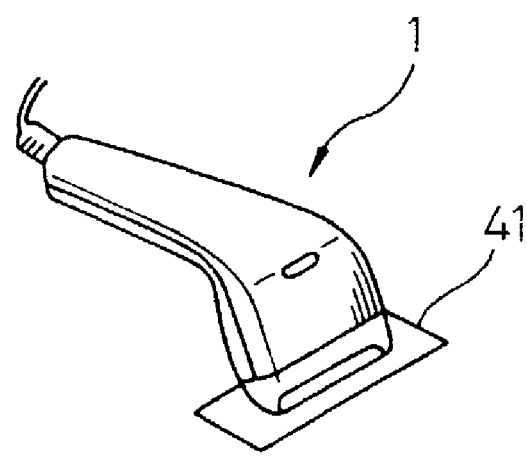
FIG. 4 is a view showing a conventional touch reader.

FIGS. 3 and 4 are views showing an example of a hand-held reader. FIG. 1 shows a so-called gun-shaped reader. FIG. 4 shows a so-called touch-system reader.

The hand-held reader is a reader which is held by a hand and of which a read window is directed toward an article in order to read a bar code carried by the article.

In the case of the stationary reader, articles must be passed in front of the read window. For an article, for example, a heavy article or large article that is difficult to make pass the read window, the maneuver for reading is difficult. When an article cannot be tilted because it contains liquid, it is conceivable that even if the article can be passed in front of the read window, the bar-code surface thereof cannot be directed toward the read window.

In contrast, in the case of the hand-held reader, the reader can approach an article for reading. Even if an article bearing a bar code is large or heavy, the bar code can be read readily. As for an article that cannot be tilted, if the reader is drawn close to the position of a bar code, the bar code can be read.

Similarly to the stationary reader, the gun reader has a form suitable for reading a bar code of an article located at a relatively distant position. The gun reader is, as shown in FIG. 3, broadly divided into a head 11 and a grip 12. A light source, scanning mirrors including a polygon mirror and galvano-mirror, and a light reception sensor for sensing light reflected from a bar code are incorporated in the head. The grip is held by a user when the user operates the reader. A power supply or the like may be stowed in the grip.

In the case of the gun reader, a user holds the grip and directs a read window 13 toward a bar code to be read. When a trigger-like trigger switch 15a formed on the grip is manipulated, a laser light source is lit. A scanning beam is emitted through the read window, whereby the bar code is read.

Unlike the aforesaid readers, as shown in FIG. 4, the touch reader is brought into contact with a bar code 41 for reading or used to read a bar code located very close.

A light source such as an LED and a light reception sensor are incorporated in the touch reader. For reading a bar code, a light source illuminates the bar code. Light reflecting from the bar code is received by the light reception sensor.

There is a method to be adopted when a bar code cannot be affixed directly to a product or the like, wherein: a bar-code menu is created by recording a plurality of bar codes on a menu sheet 4; and when inputting product information is needed, a necessary bar code is read. Numerous different bar codes are recorded adjacently on the bar-code menu. When an attempt is made to read the bar-code menu, only a bar code to be read by a reader must be read but unwanted bar codes must not be read thereby.

Figure 5A:
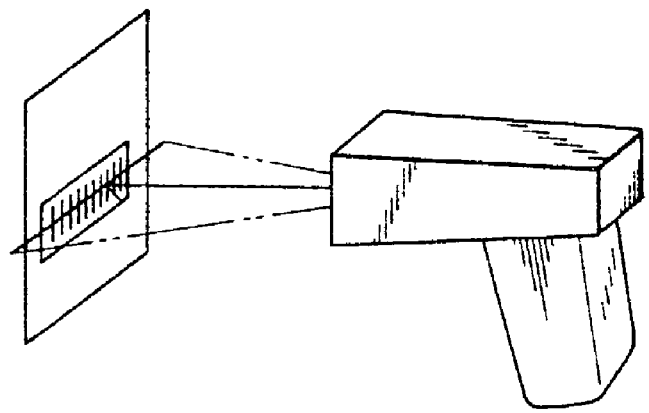
FIGS. 5A and 5B are views showing a problem occurring when the gun reader is used to read a bar-code menu.
Figure 5B:
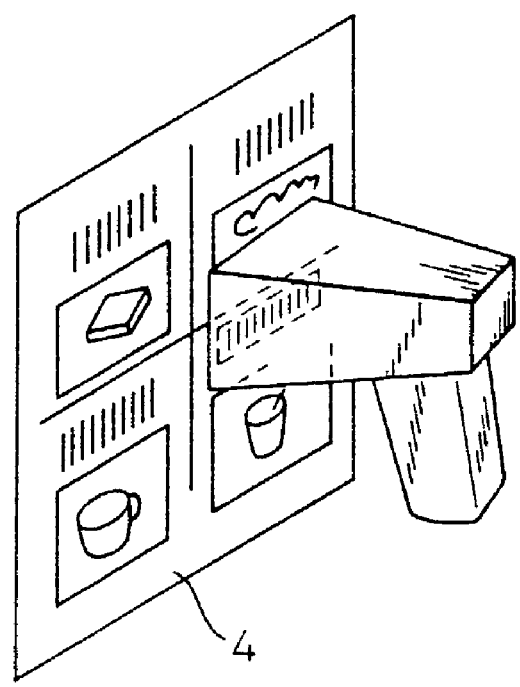

However, in the case of the stationary reader, scanning rays to be scanned in a plurality of directions (or sometimes mutually-intersecting scanning rays) are emitted. The scan range covered by the stationary reader is very wide. When this kind of reader is used to scan a bar-code menu, the possibility of scanning and reading unwanted bar codes is very high. Besides, it is very hard to scan only a specific bar code. When the gun reader is used to read the bar-code menu, the reader may presumably be distant from the bar-code menu as shown in FIG. 5A or near to the bar-code menu as shown in FIG. 5B. In this case, when the reader is distant, it becomes hard to align a bar code with a scan position of the gun reader. When the gun reader is too near, the read window interferes with checking of a position being scanned.

When an attempt is made to read a bar-code menu using either the stationary or gun reader, a bar code that need not be read is read. These readers are therefore unsuitable for reading of the bar-code menu.

By contrast, in the case of the touch reader, the reader is brought into contact with a bar code or approached very closely to the bar code. A quite limited range is therefore an object range of reading. The touch reader can selectively read specific bar codes alone and is therefore very suitable for reading of a bar-code menu.

As mentioned above, readers associated with bar-code read forms have been employed in the past. The readers are suitable for certain applications but may not be suitable for other applications. The readers are applicable to only specific applications. For copying with various read forms, readers associated with the read forms must be prepared.

Figure 6:
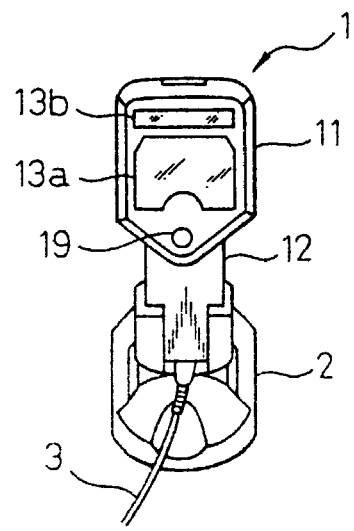
FIG. 6 is a front view of a reader of an embodiment of the present invention.

FIG. 6 is a view showing the appearance of a bar-code reader of an embodiment of the present invention.

The reader of this embodiment has the ability to cope with the forms associated with the stationary reader, gun-shaped reader, and touch-system reader. The one reader are therefore applicable to different uses.

In FIG. 6, reference numeral 1 denotes a reader body. 2 denotes a stand on which the reader body 1 is mounted. The reader body 1 has a head 11, in which a light source, scanning means, and light receiving means (which are not shown) are incorporated, and a grip 12 that can be held by a user.

A first read window 13a and a second read window 13b are formed on the front side of the head 11. The first read window 13a has a large area. In the reader shown in FIG. 6, the first read window is shaped like a sector. The shape of the window is not limited to the one shown in FIG. 6. The shape may be a square or the like. The second read window 13b has a smaller area than the first read window 13a and has a straight laterally-elongated shape. The shape of the second read window is also not limited to the one shown in FIG. 6.

The first read window 13a and second read window 13b supply a first scanning pattern and second scanning pattern that are mutually different. The details of the scanning patterns will be described later. The scanning patterns associated with different read forms are supplied.

A cable 3 is coupled with an end of the grip 12. The other end of the cable 3 is coupled with an external unit such as a POS terminal that is not shown. The cable 3 is used to supply power to the reader body 1 and to transmit read data (bar-code data) produced in the reader body 1 to the external unit.

A speaker 19 for generating a notification sound used to notify a user of a result of bar-code reading is located on the front side of the reader.

Figure 7A:
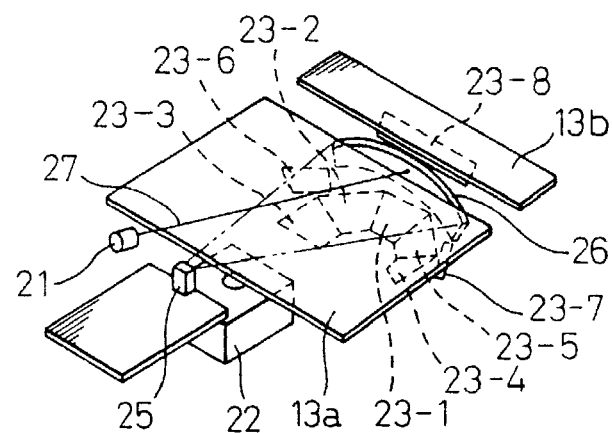
FIGS. 7A and 7B are a perspective oblique view and side sectional view of the reader of the embodiment.
Figure 7B:
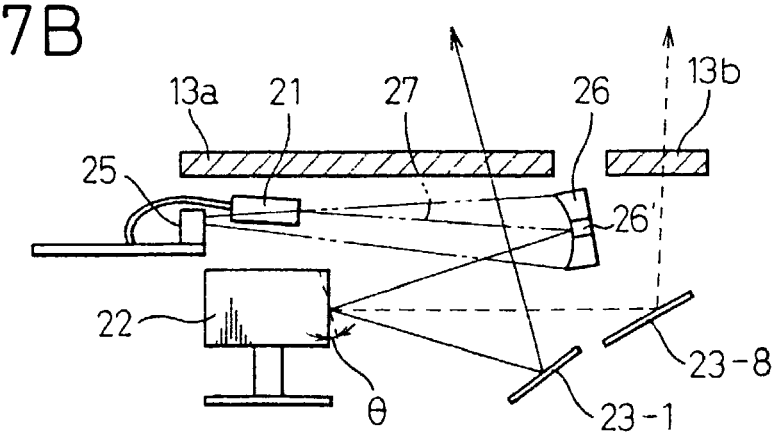

FIGS. 7A and 7B are views showing the internal components of the reader shown in FIG. 6, especially, of the head. FIG. 7A is a perspective oblique view showing the components from the side of the read windows of the head, and FIG. 7B is a side sectional view showing the head. In FIGS. 7A and 7B, the same functional parts as those in FIGS. 2A and 2B are assigned the same reference numerals. The description of the functional parts will be omitted. A semiconductor laser or the like is used as a light source 21. Reference numeral 26 denotes a reflection mirror (condenser mirror) realized with a concave mirror. A planar small mirror 26' is placed around the center of the concave mirror. The reflection mirror 26 and small mirror 26' may be provided as separate members and joined with each other afterward. Alternatively, the reflection mirror 26 and small mirror 26' may be formed unitedly using, for example, a resin or the like. Thereafter, a reflection membrane may be deposited on the united body. Light emanating from the light source 21 is emitted toward the small mirror 26'.

The reflection surface of the small mirror 26' is formed at such an angle that it allows laser light reflected from the small mirror 26' to be irradiated to a polygon mirror 22. The polygon mirror 22 shown in FIGS. 7A and 7B has a reflection surface on each of the four sides thereof. The number of reflection surfaces is not limited to four. The polygon mirror 22 is attached to the shaft of a motor that is not shown, and driven to rotate by means of the motor. The inclinations (0) of the four sides of reflection surfaces of the polygon mirror with respect to a vertical line are different from one another. The inclination of the polygon mirror itself can be set freely. The inclination of one of the sides of the polygon mirror may be different from those of the other sides. Alternatively, all the sides may share the same inclination.

Laser light reflected from the reflection surfaces of the polygon mirror 22 is scanned in responsive to the rotation of the polygon mirror and then enters floor mirrors 23-1 to 23-8.

The floor mirrors are a plurality of mirrors and produce a plurality of scanning rays constituting a scanning pattern. The floor mirrors shown in FIG. 2 are eight mirrors. Among them, the floor mirrors 23-1 to 23-5 are arranged adjacently in such a manner that they define an arc. All the reflection surfaces are directed inward. The floor mirrors 23-6 and 23-7 are placed above the floor mirrors 23-1 and 23-5 respectively, and the reflection surfaces thereof are directed in the same direction as those of the floor mirrors 23-1 and 23-5. The floor mirrors 23-1 to 23-7 are placed under the first read window 13*a* and constitute a first group of floor mirrors.

The floor mirror 23-8 is placed under the second read window 13*b*. The floor mirror 23-8 has a thinner and longer shape that the other floor mirrors. A scanning ray emanating from the floor mirror 23-8 therefore lasts longer than those emanating from the other floor mirrors 23-1 to 23-7 at the levels of the read windows.

Herein, assuming that a scanning ray permits a large scan width, compared with a scanning ray permitting a small scan width, a width to be scanned by the former scanning ray within the same scan time is larger. In other words, as long as a width to be scanned is unchanged, the scan speed of the former scanning ray is lower. Bars of smaller thicknesses can therefore be detected. This leads to a substantial increase in resolution. Thus, it is advantageous to increase a scan width permitted by a scanning ray. For increasing all scan widths, all the floor mirrors must be made wider. This results in a larger head. In this embodiment, therefore, the floor mirror 23-8 alone is realized with a long mirror in consideration of the position of installation thereof. The floor mirror 23-8 is regarded as a second group of floor mirrors.

The numbers of floor mirrors constituting the first and second groups of floor mirrors can be properly selected according to read forms that are presumably handled by the reader. The first and second groups of floor mirrors may each include a plurality of floor mirrors. Scanning light emitted from each of the first and second group of floor mirrors through an associated read window should merely cope with a presumed read form.

Scanning light reflected from the polygon mirror 22 is reflected upward in FIG. 7B by the floor mirrors 23-1 and 23-8 and emitted through the read window associated with the floor mirrors. Scanning light reflected from the floor mirrors 23-1 to 23-7 is emitted through the first read window 13*a* and creates a first scanning pattern. The first scanning pattern is therefore basically composed of seven scanning rays. Scanning light reflected from the floor mirror 23-8 is emitted through the second read window 13*b*. A second scanning pattern is basically created by one scanning ray permitting a large scan width.

As shown in FIG. 7B, the mounting position of the floor mirrors 23-1 to 23-5 and those of the floor mirrors 23-6 to 23-8 are deviated vertically. As described previously, the reflection surfaces of the polygon mirror have different inclinations. When laser light is irradiated to a reflection surface of the polygon mirror drawn with a solid line in FIG. 7B, scanning light is reflected from the floor mirrors 23-1 to 23-5 along a path drawn with a solid line in FIG. 7B. Scanning light incident to the floor mirror 23-1 to 23-5 is reflected upward, and emitted through the first read window 13*a*.

By the way, a reflection surface of the polygon mirror drawn with a dashed line in FIG. 7B faces up compared with the reflection surface drawn with a solid line. Scanning light (drawn with a dashed line in FIG. 7B) reflected by the reflection surface drawn with a dashed line is reflected upward more greatly than the scanning light reflected by the reflection surface drawn with a solid line, and then enters the floor mirrors 23-8 and floor mirrors 23-6 and 23-7 which are mounted above the floor mirrors 23-1 to 23-5. Of the scanning light, a scanning ray incident to the floor mirror 23-8 is reflected and emitted through the second read window 13*b*. Scanning rays incident to the floor mirrors 23-6 and 23-7, which are not shown, are reflected by the mirrors and emitted through the first read window 13*a*.

As mentioned above, since the reflection surfaces of the polygon mirror are inclined differently, a floor mirror to which scanning light is incident is selected according to a reflection surface by which the scanning light is reflected. A scanning pattern dependent on the floor mirrors is supplied through an associated read window.

Light reflected from a bar code enters the light reception sensor 25 along the same path as the emission path of scanning light. For example, reflected light of scanning light reflected by the floor mirror 23-1 travels along the path of the first read window, floor mirror 23-1, polygon mirror 22, reflection mirror 26, and light reception sensor 25. Herein, light reflected from a bar code is scattered light. For increasing the quantity of light received by the light reception sensor G, the reflection mirror 26 that is a concave mirror is placed on the light path. The reflection mirror gathers the light reflected from the bar code and routes it to the light reception sensor 25. The focal position of the reflection mirror 26 is set on the light reception surface of the light reception sensor 25. This is intended to improve the light reception efficiency of the light reception sensor 25.

Next, emitting scanning light will be described.

Figure 8:
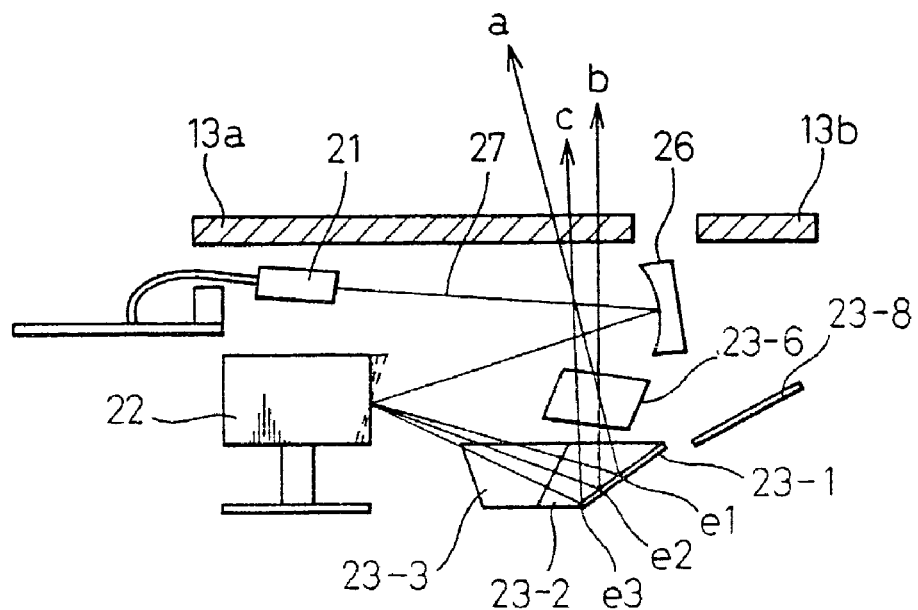
FIG. 8 is a diagram showing the emission direction of scanning light reflected by first to third reflection surfaces.
Figure 9:
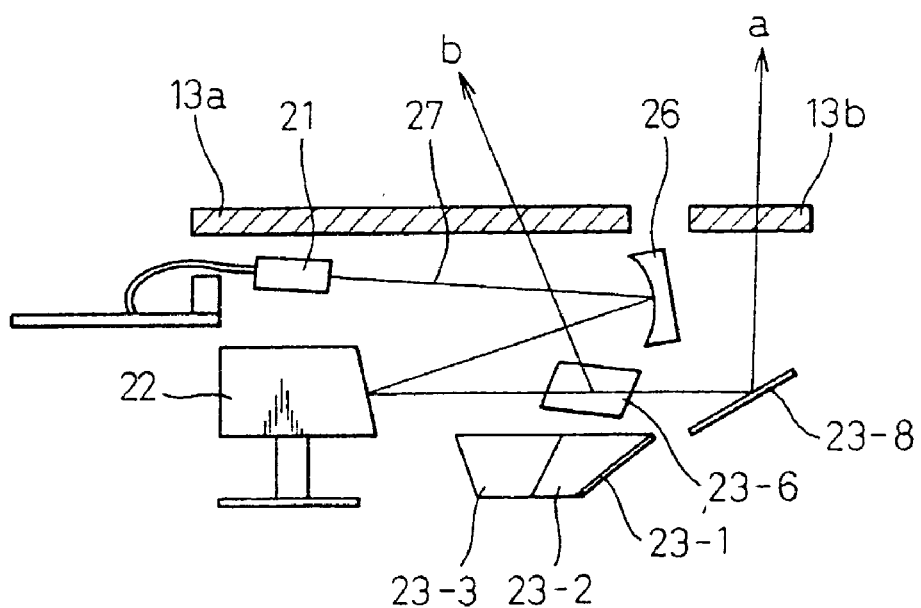
FIG. 9 is a diagram showing the emission direction of scanning light reflected by a fourth reflection surface.

FIGS. 8 and 9 are diagrams for explaining the emitted state of scanning light. FIG. 8 shows a state in which scanning light is reflected by the first to third reflection surfaces of the polygon mirror, while FIG. 9 shows a state in which scanning light is reflected by the fourth reflection surface of the polygon mirror.

As shown in FIG. 8, in case scanning light is reflected by the first, second, and third reflection surfaces of the polygon mirror (corresponding to the reflection surface drawn with a solid line in FIG. 7B), the scanning light is reflected by the floor mirrors 23-1 to 23-5 (the floor mirrors 23-4 and 23-5 are not shown), and emitted through the first read window 13*a*. Herein, since the surfaces of the polygon mirror have different angles of reflection, a scanning ray reflected from the first reflection surface falls on a first position e1 of a floor mirror, a scanning ray reflected from the second reflection surface falls on a second position e2 of the floor mirror, and a scanning ray reflected from the third reflection surface falls on a third position e3 of the floor mirror. Thus, the incident positions are different from one another.

The angles of incidence of the three scanning rays entering the floor mirror are therefore different from one another. The emission direction of a scanning ray reflected from each floor mirror varies depending on the incident position. For example, the scanning ray reflected from the first position e1 is emitted in a direction a in FIG. 8. The scanning ray reflected from the second position e2 is emitted in a direction b in FIG. 8. The scanning light reflected from the third position e3 is emitted in a direction c in FIG. 8.

Since the emission directions of scanning rays thus differ from one another, a scanning pattern supplied through the first read window varies slightly in terms of scan position, and is available in three different kinds. In the case shown in FIG. 8, the three scanning rays a, b, and c trace trajectories that are mutually parallel. Thus, when one scanning pattern is created by a larger number of scanning rays, a range scanned by the scanning rays can be expanded. This leads to an increase in probability of scanning a bar code passing in front of a read window. Eventually, it becomes possible to improve the success rate of bar-code reading.

FIG. 9 shows a state in which scanning light is reflected by the fourth reflection surface of the polygon mirror (corresponding to the reflection surface drawn with a dashed line in FIG. 7B). The fourth reflection surface faces slightly up compared with the first to third reflection surfaces. The scanning light reflected from the fourth reflection surface of the polygon mirror therefore falls on the floor mirrors 23-6 to 23-8 (the floor mirror 23-7 is not shown) mounted at a position higher that the floor mirrors 23-1 to 23-5.

Of the scanning light, scanning rays reflected from the floor mirrors 23-6 and 23-7 are emitted as a scanning ray b through the first read window. By contrast, a scanning ray reflected from the floor mirror 23-8 is emitted as a scanning ray a through the second read window. Owing to this structure, the read window through which scanning light is emitted can be changed from one to the other according to the length of a period during which laser light is scanned.

As mentioned above, the number of scanning rays generated during one rotation of the polygon mirror can be increased by differentiating the inclinations of the reflection surfaces of the polygon mirror. Besides, the read window through which scanning light is emitted can be changed from one to the other.

Figure 10:
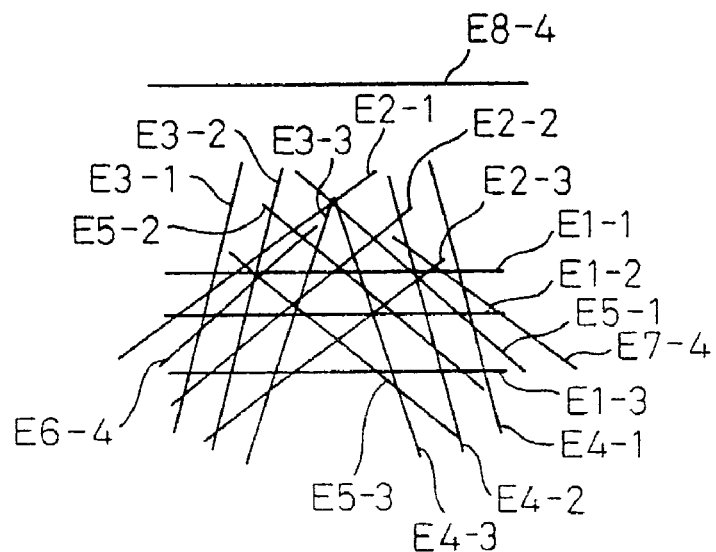
FIG. 10 is a diagram showing scanning patterns supplied by the reader of the embodiment.

FIG. 10 is a diagram showing scanning patterns supplied through the first and second read windows. Straight lines shown in FIG. 10 indicate trajectories of scanning rays. Reference numerals assigned to the scanning rays indicate the associated floor mirrors and reflection surfaces of the polygon mirror. For example, 23-1 denotes a trajectory of a scanning ray reflected from the floor mirror 23-1, and implies that this scanning ray is reflected from the first reflection surface of the polygon mirror.

Straight lines 23-1 to 23-7 indicate trajectories of scanning rays emitted through the first read window. Straight lines 23-8 indicates a trajectory of a scanning ray emitted through the second read window.

Scanning rays reflected from the first to third reflection surfaces of the polygon mirror fall on the floor mirrors 23-1 to 23-5. Each of the floor mirrors therefore generates three scanning rays during one rotation of the polygon mirror. Three scanning rays reflected from the floor mirrors trace trajectories that are mutually parallel with given gaps among them.

A scanning ray emanating from the floor mirror 23-1 is substantially horizontal relative to the read window. Scanning rays emanating from the floor mirrors 23-2 and 23-5 are angled substantially at 45". The scanning ray emanating from the floor mirror 23-2 angles right, while the scanning ray emanation from the floor mirror 23-5 angles left.

Likewise, a scanning ray emanating from the floor mirror 23-3 angles right, while a scanning ray emanating from the floor mirror 23-4 angles left. These scanning rays are angled more sharply than those emanating from the floor mirrors 23-2 and 23-5.

Scanning light reflected from the fourth reflection surface of the polygon mirror enters the floor mirrors 23-6 to 23-8. While the polygon mirror is making one rotation, each of the floor mirrors 23-6 to 23-8 generates one scanning ray.

A scanning ray emanating from the floor mirror 23-6 is scanned at substantially the same angle as (but is slightly mismatched with) the one emanating from the floor mirror 23-2. The scan position of the scanning ray is a position at which the scanning ray emanating from the floor mirror 23-2 does not scan. Likewise, the inclination of a scanning ray emanating from the floor mirror 23-7 is slightly different from that of the one emanating from the floor mirror 23-5. The scan position of the scanning ray is a position at which the scanning ray emanating from the floor mirror 23-5 does not scan.

Each of the floor mirrors 23-6 and 23-7 generates one scanning ray during one rotation of the polygon mirror. Owing to this small number of scanning rays emanating from each of the floor mirrors 23-6 and 23-7, the number of scanning rays emitted through the first read window can be increased. Eventually, the possibility that a bar code is scanned can be improved.

As mentioned above, scanning rays to be scanned are emitted in about five directions through the first read window. Even if bar codes passing the first read window are tilted in various directions, any of the scanning rays can scan the bar codes in units of a readable length. Consequently, the probability of reading a bar code can be improved. A scanning pattern dependent on the floor mirrors 23-1 to 23-5 is created by three scanning rays that are scanned mutually parallel. Even if a bar code passes a position that may not be able to be scanned by a single scanning ray, since the number of scanning rays is large, a wide scan range is ensured. Consequently, if a plurality of scanning rays are employed, any of them can scan the bar code. Eventually, the probability of reading a bar code further improves.

A scanning ray emanating from the floor mirror 23-8 is scanned horizontally and emitted straight through the second read window. Herein, the length of the floor mirror 23-8 is longer than those of the other floor mirrors 23-1 to 23-7. The scanning ray emanating from the floor mirror 23-8 therefore lasts longer.

A scanning ray emitted through the second read window has the scan direction thereof fixed. The scanning ray is therefore suitable for a bar code or an object of reading of which orientation is determined in advance or for a bar code of which position can be aligned in a direction optimal for reading.

Thus, the reader of this embodiment produces a total of 18 scanning rays during one rotation of the polygon mirror.

In the example of FIG. 10, each of the floor mirrors 23-6 to 23-8 produces one scanning ray during one rotation of the polygon mirror. The number of scanning rays emanating from each floor mirror can be varied by modifying the number of reflection surfaces of the polygon mirror for transmitting scanning light to floor mirrors. The number of scanning rays emanating from each floor mirror is therefore not limited to the value shown in FIG. 10. The reader shown in FIG. 10 has the precondition that only one scanning ray is emitted through the second read window.

Figure 11:
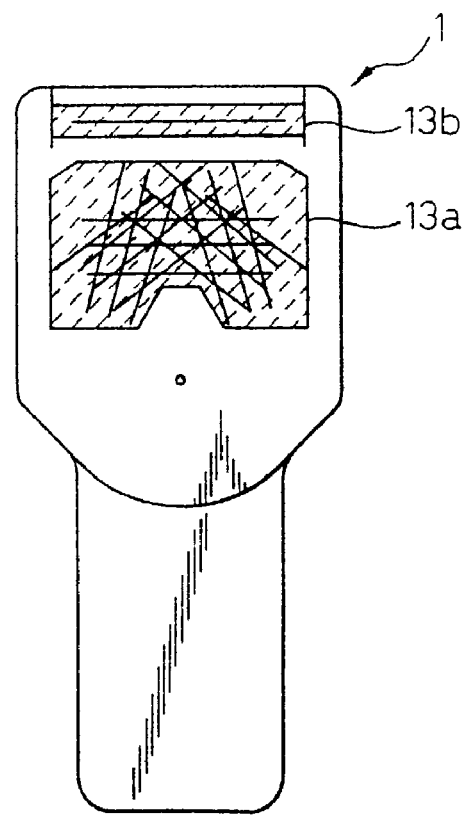
FIG. 11 is a diagram showing scanning patterns within read windows.

FIG. 11 is a diagram showing trajectories constituting scanning patterns on read surfaces. As shown in FIG. 11, a total of 17 scanning rays are emitted through the first read window, while one scanning ray permitting a long scan width is emitted through the second read window.

Figure 12:
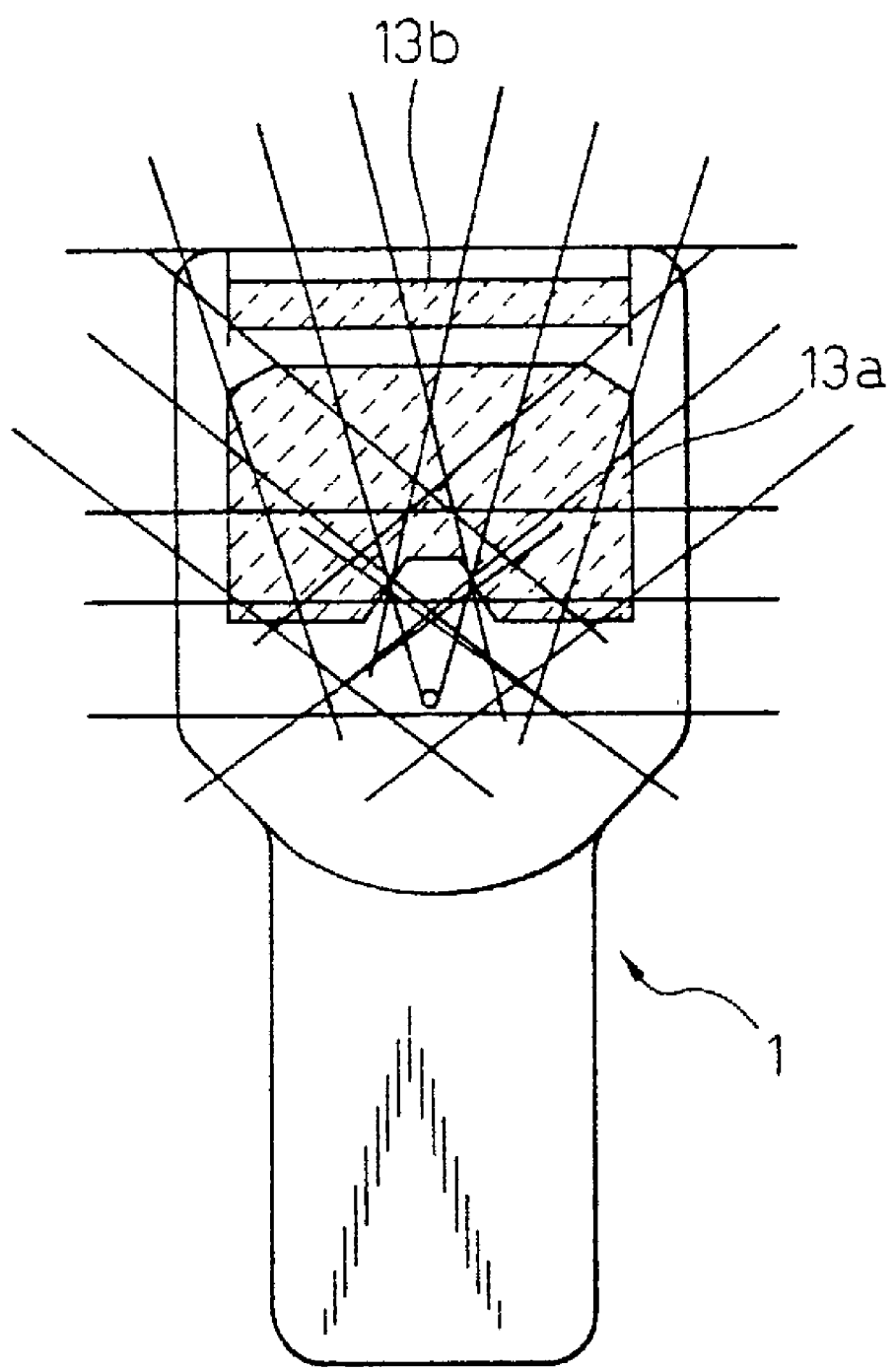
FIG. 12 is a diagram showing scanning patterns at a distance from the read windows.

FIG. 12 is a diagram showing trajectories of scanning rays at a distance from the read windows. In this case, examples of scanning rays at a position distanced by 100 mm from the read windows are shown. Compared with the scanning patterns shown in FIG. 11, the scanning patterns spread widely as a whole. As shown in FIG. 11, the larger the distance form the read windows is, the more widely the scanning patterns spread. Consequently, even if the position of a bar code passing a position away from the reader is a position off the center of a read window, the probability that the bar code is scanned is high. Eventually, the success rate (read probability) of reading a bar code improves.

Figure 13A:
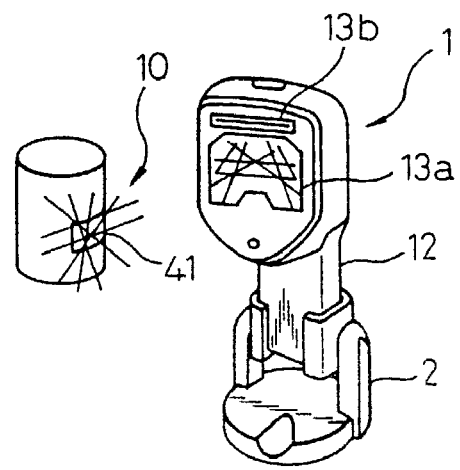
FIGS. 13A to 13C are views showing read forms permitted by the reader of the embodiment.
Figure 13B:
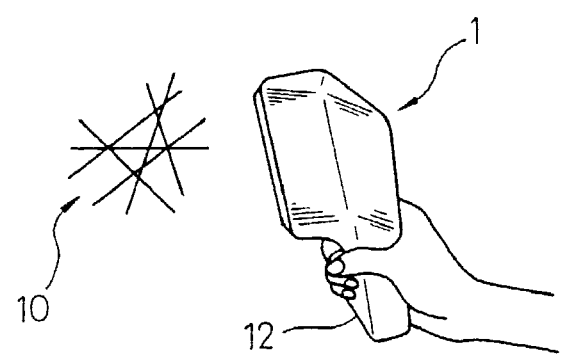
Figure 13C:
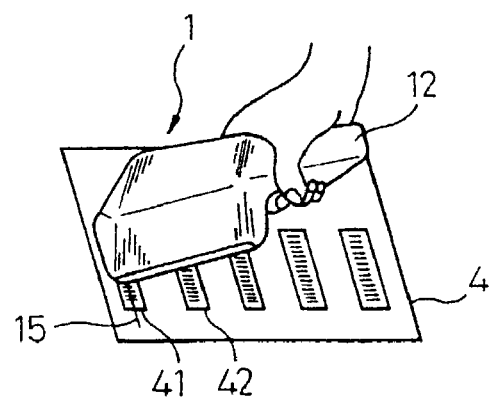

FIGS. 13A to 13C are views showing the usages of the reader of this embodiment. FIG. 13A shows an example of using the reader as a stationary reader. FIG. 13B shows an example of using the reader as a gun reader. FIG. 13C shows an example of using the reader as a touch reader.

For using the reader as a stationary reader, the reader body is mounted on the stand. In this case, the grip of the reader is inserted into a holder section of the stand. Thus, the reader body is immobilized and the read windows face in a given direction.

For reading bar codes in this state, articles bearing bar codes are passed with the bar codes opposed to the read window employed. As already described, a scanning pattern 10 permitting scanning in a plurality of directions is supplied through the first read window. The scanning rays can a wide range. As shown in FIG. 13A, a bar code is scanned by numerous scanning rays having different inclinations. For reading bar codes using the stationary reader, the inclinations of the bar codes passing the read window are not constant as long as a user is not especially conscious of them. However, since a bar code is scanned using the above scanning pattern, even if a bar code passing the read window employed is tilted, the possibility that the bar code is scanned by any of the scanning rays is high.

For using the reader as a gun reader, as shown in FIG. 18B, a user holds the grip and directs the read window employed toward a bar-code surface located at a far position. The bar-code surface is then scanned using the scanning pattern. When the reader is used as a gun reader, bar codes are often at a distance from the read window. Similarly to those scanned by the stationary reader, the bar codes do not have a constant inclination. In particular, bar codes supposed to be read by a gun reader include those located beyond one's reach and those carried by heavy articles. In some cases, the orientations of bar codes cannot be changed. Even when the reader is used as a gun reader, the scanning pattern supplied through the first read window is used to read bar codes. The scanning pattern spreads more widely as it gets farther from the read window employed. If the read window employed is only aimed roughly at a bar code, the desired bar code can be scanned.

For using the reader as a touch reader, as shown in FIG. 13C, a user holds the grip of the reader body. The second read window is then brought to the position of a specific bar code on, for example, a bar-code menu. A scanning ray emitted through the second read window is used to scan the bar code that is an object of reading. The scan direction of the scanning ray emitted through the second read window is fixed. Since the bar-code menu is placed near the user's hand, it is easy to align the bar code.

When the scanning pattern supplied through the second read window is made different from that supplied through the first read window so that mutually-intersecting scanning rays to be scanned in many directions will not be produced, the scan range of the scanning ray emitted through the second read window is a quite limited range. For example, when a scanning ray that is emitted through the second read window is only the one scanned in one direction as shown in FIG. 10, the scanning pattern supplied through the second read window merely enables horizontal and linear scanning of a scan surface.

A bar code is in principle long sideways. When scanned in a direction along the shorter edges of a bar code, the bar code cannot be read. A scanning ray emitted through the second read window is therefore designed to be scanned in one direction. Consequently, a bar code that is not an object of reading or any other unwanted area will not be scanned. Reading an unwanted bar code or an incidence posing a problem when a bar-code menu is read can be avoided.

When the reader is used as a touch reader, it is possible to align the inclination of a bar code with the read window employed. Scanning rays having different scan directions are therefore unnecessary. When the reader is used as a touch reader, therefore, one scanning ray emitted through the second read window and scanned in one direction is used to read bar codes.

A scanning ray has a minimum diameter at a focal position. The smaller the diameter is, the thinner the readable bars of a bar code are. When a bar code is located at (or in the vicinity of) the focal position of a scanning ray, even if the bar code consists of thin bars, reading succeeds. It is therefore preferable that a position at which a scanning ray is focused be in the vicinity of the position of a bar code to be read in each read form.

When the reader is used as a stationary or gun reader, bar codes pass a position away from the read window employed. It is therefore preferable that the focal position of scanning rays emitted through the first read window be a position away from the read window, for example, a position several tens of centimeters away therefrom. For a larger read range, it is required that a readable area is realized ahead and behind the read window. Consequently, a read depth permitted by scanning rays emitted through the first read window should preferably be large.

When the reader is used as a touch reader, a bar code is located very close to the read window employed. It is therefore preferable that the focal position of a scanning ray emitted through the second read window be on or near the second read window. Moreover, since the spacing between a bar code and the read window is not so large, the read depth of a scanning ray emitted through the second read window may be small.

When the reader is used as a touch reader, if the read depth of scanning light emitted through the second read window is large, a bar code located at a position away from the second read window is also scanned. In this case, the possibility of reading a bar code that need not be read is high. For reading a bar-code menu, especially, while the reader is being moved to a desired bar code, it passes over the other bar codes recorded on the menu sheet. At this time, there is a possibility that the scanning light may scan the other bar codes and read them. The bar codes recorded on the menu sheet are valid data irrespective of whether or not they are objects of reading. While the reader is being move, if unnecessary bar codes are read, unwanted information is input to cause a problem.

For preventing the occurrence of a problem, it is preferable that the read depth of scanning light emitted through the second read window be small.

Figure 14:
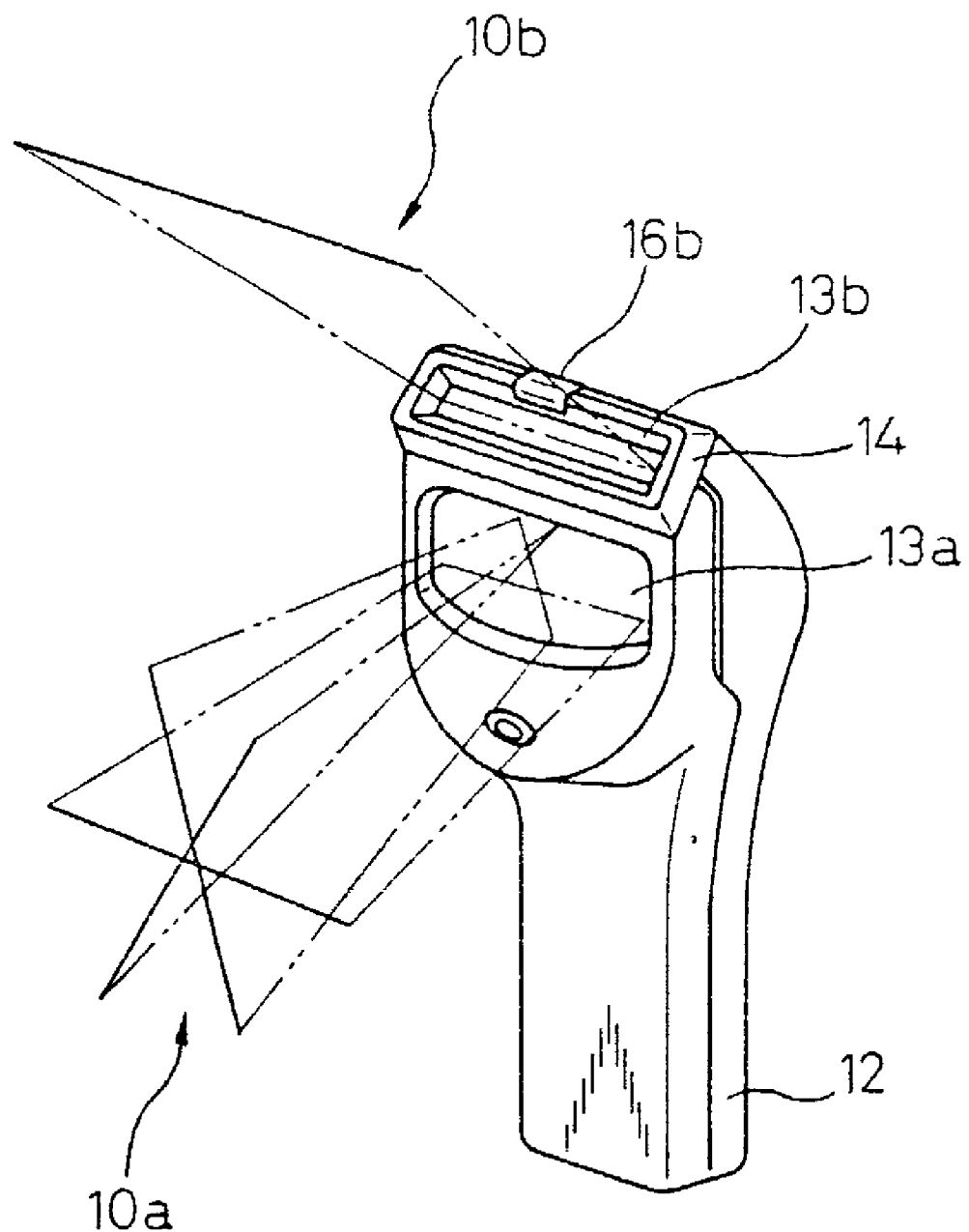
FIG. 14 is a view showing another embodiment of a reader.

FIG. 14 is a view showing a variant of the reader of this embodiment. A reader shown in FIG. 14 has, unlike the reader shown in FIG. 6, the first read window and second read window thereof angled differently.

Scanning light emitted through the first read window is emitted horizontally or slightly downward in FIG. 14 with the read window directed substantially in a vertical direction. When the reader is mounted on the stand, it is preferable, in consideration of the height of the read window and a position at which an article bearing a bar code passes, that the scanning light emitted through the first read window be angled slightly downward.

In contrast, the emission direction of scanning light emitted through the second read window is obliquely up.

A conventional touch reader uses an LED as a light source to illuminate the whole of a range having almost the same size as a read window. To use the conventional touch reader, a user should merely aim at a proper position so as to put the read window employed in the vicinity of a bar code. The bar code is then illuminated entirely by light emanating from the LED, and can be read.

However, in the case of the reader of this embodiment, what is emitted through the second read window is a linear scanning ray (laser light) alone. A range illuminated by the scanning ray is linear. In this case, unless a bar code is placed exactly at a position at which the scanning ray passes, the bar code will not be scanned by the scanning ray and cannot be read. For reading an intended bar code correctly, therefore, it is important to locate a position at which a scanning ray scans and a position of a bar code and to align a read window with the bar code.

When a user's line of vision and an emission direction of scanning light emitted through the second read window are coincident with each other and a bar code lies on an extension of the emission direction of scanning light, it is easy to align the read window with the bar code. When the reader is used as a touch reader (in particular, when a bar-code menu is placed on a tabletop), a bar code that is an object of reading is located obliquely ahead of a user. For reading a bar-code menu, a user is though to bring the reader into oblique contact with the bar code for reading. The reader of this embodiment is realized from this viewpoint. The emission direction of scanning light emitted through the second read window is, as illustrated, obliquely up. A user can therefore easily aim at the position of a bar code. The emission direction of scanning light emitted through the second read window and a user's line of vision can be coaxially coincided with each other.

In the case of FIG. 14, three scanning rays having different inclinations are emitted through the first read window. One scanning ray permitting a large scan width is emitted through the second read window. Incidentally, the number of scanning rays is not limited to the one shown in FIG. 14.

Figure 15:
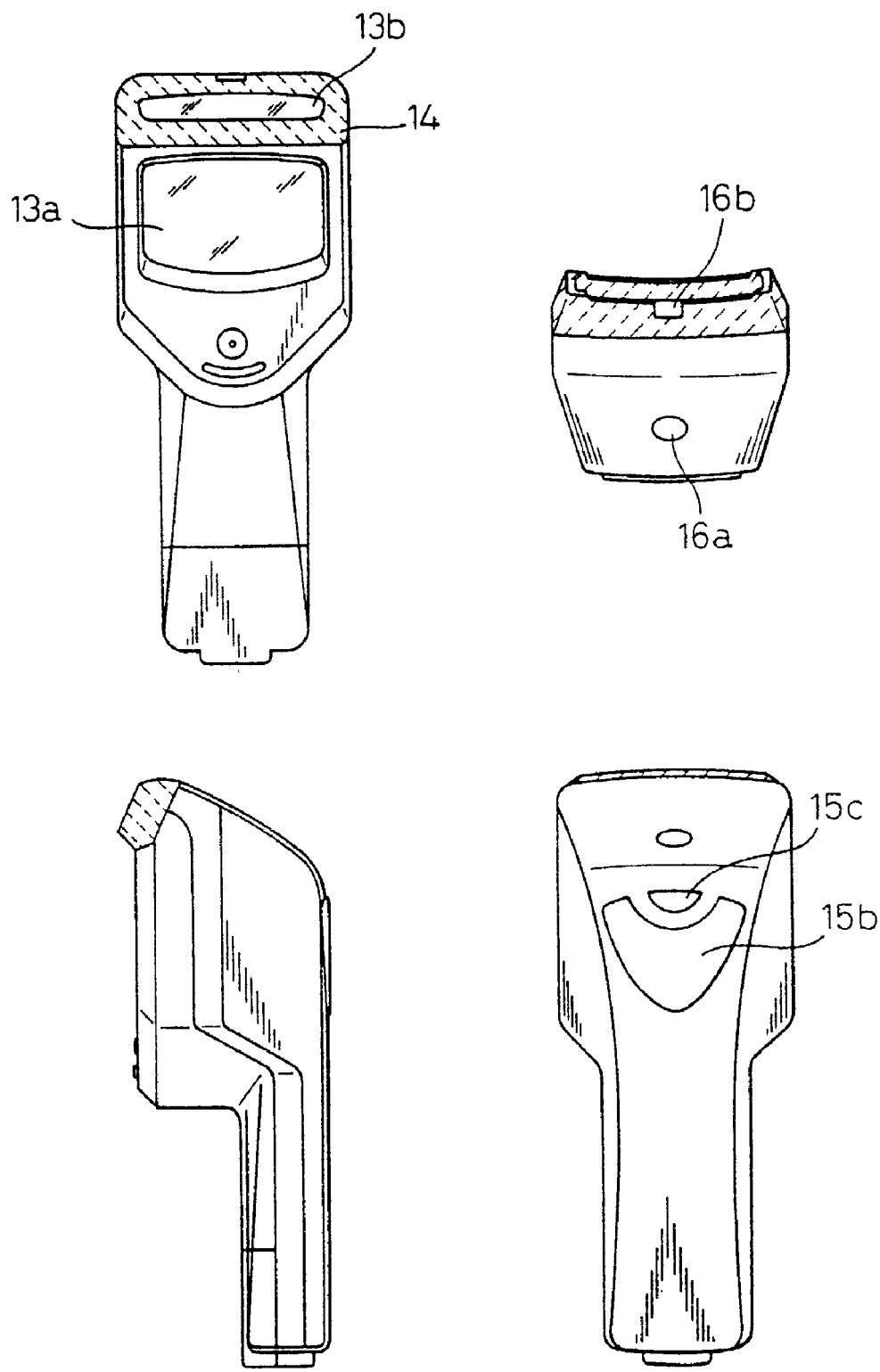
FIG. 15 is a four-side view of the reader shown in FIG. 14.

FIG. 15 is a four-side view of the reader shown in FIG. 14. A plan view is seen in the left upper area in the drawing, a side view is seen in the left lower area, a back view is seen in the right lower area, and a top view is seen in the right upper area. A cover 14 molded using a member having elasticity, for example, rubber is attached to the perimeter of the second read window. When the second read window is used to read a bar code, the cover prevents the second read window from coming into direct contact with a surface bearing a bar code or the like and being flawed. Moreover, the cover absorbs impact occurring when the read window is brought into contact with the bar-code surface. In addition, the cover exerts the operation of a spacer for separating a bar cover and the second read window optimally for reading of the bar code. When this kind of cover is attached, a bar code that is an object of reading is located around the tip of the cover. Consequently, the local position of scanning light emitted through the second read window (a position at which the scanning light is focused) should preferably be the position of the tip of the cover or a position slightly ahead of the tip.

Indicators 16*a* and 16*b* for notifying a user of whether or not a bar code has been read normally are located on the upper margin of the second read window and on the back side of the reader respectively. FIG. 14 shows an example in which an indicator 16*b* is located on the cover 14 attached to the perimeter of the second read window. An indicator on the back side is not shown.

The indicators 16*a* and 16*b* are lit when a bar code is read normally or reading a bar code fails, whereby a user is notified of a bar-code reading situation.

Another mechanism for notifying a bar-code reading situation is a speaker for giving a reporting sound.

Moreover, a mode selection switch 15*b* is located on the back side of the reader. The operation of the mode selection switch will be described in detail later. In short, the mode selection switch is used to change a read mode in which a bar code is read using scanning light emitted through the first read window into a read mode in which a bar code is read using scanning light emitted through the second read window, or vice versa.

A cable is coupled with the rear end of the grip, though it is not shown in FIG. 15.

Figure 16:
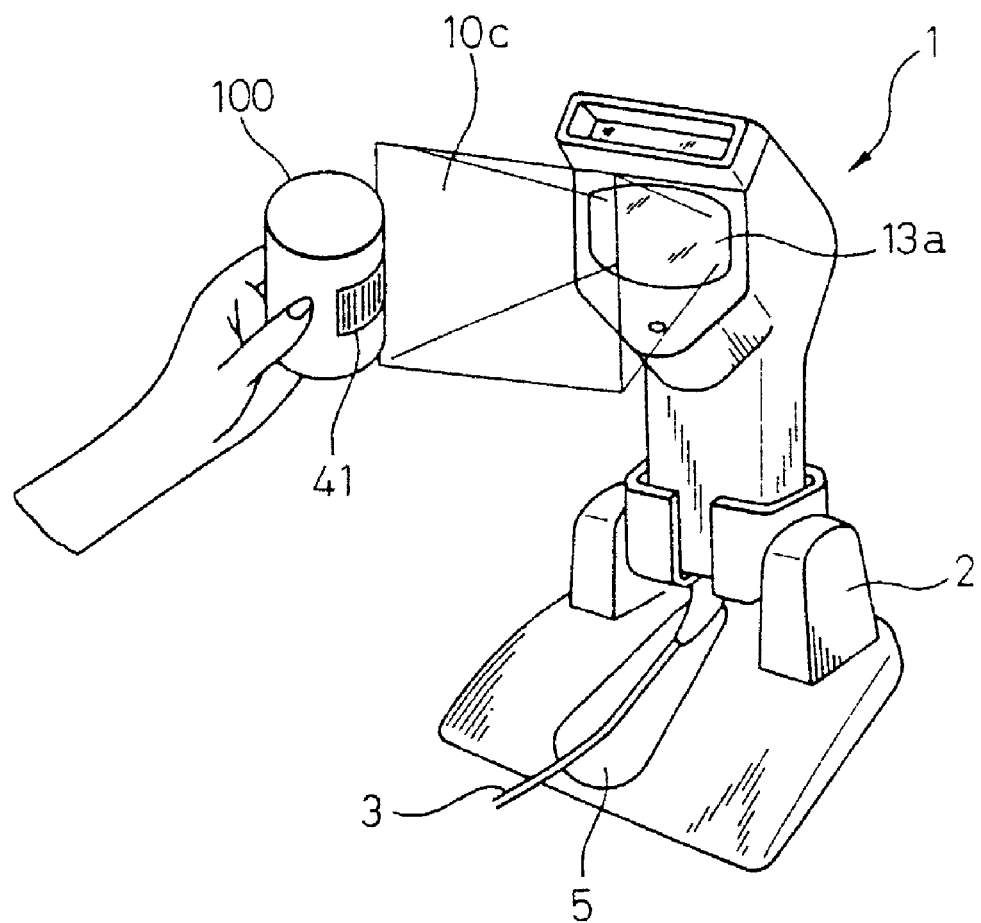
FIG. 16 is a view showing a state in which the reader shown in FIG. 14 is mounted on a stand.

FIG. 16 is a view showing a state in which the reader shown in FIG. 14 is mounted on the stand and used as a stationary reader. When the reader is used as a stationary reader, a scanning pattern (A multi-scanning pattern. Scanning using the multi-scanning pattern is referred to as multi-scanning.) being supplied through the first read window and permitting scanning in a plurality of directions is used to scan bar codes. In this case, when the reader is placed to have such a positional relation that it is opposed to a user, scanning light is emitted toward the user through the read window. When the reader is thus placed, the maneuver for reading can be achieved readily.

Moreover, since the range scanned using a scanning pattern supplied through the first read window 13*a* 10*c* is wide, when a bar code 4 passes through a scan area 10*c*, the bar code can be read. When a user intends to have a bar code read, he/she need not be so greatly conscious of a position at which an article 100 is passed. The wider the scan area is, the greater is the freedom of setting a position as an article passes.

Incidentally, a dent 5 for guiding the cable 3 coupled with the end of the grip to the forward side of the stand is formed on the base of the stand.

Figure 17:
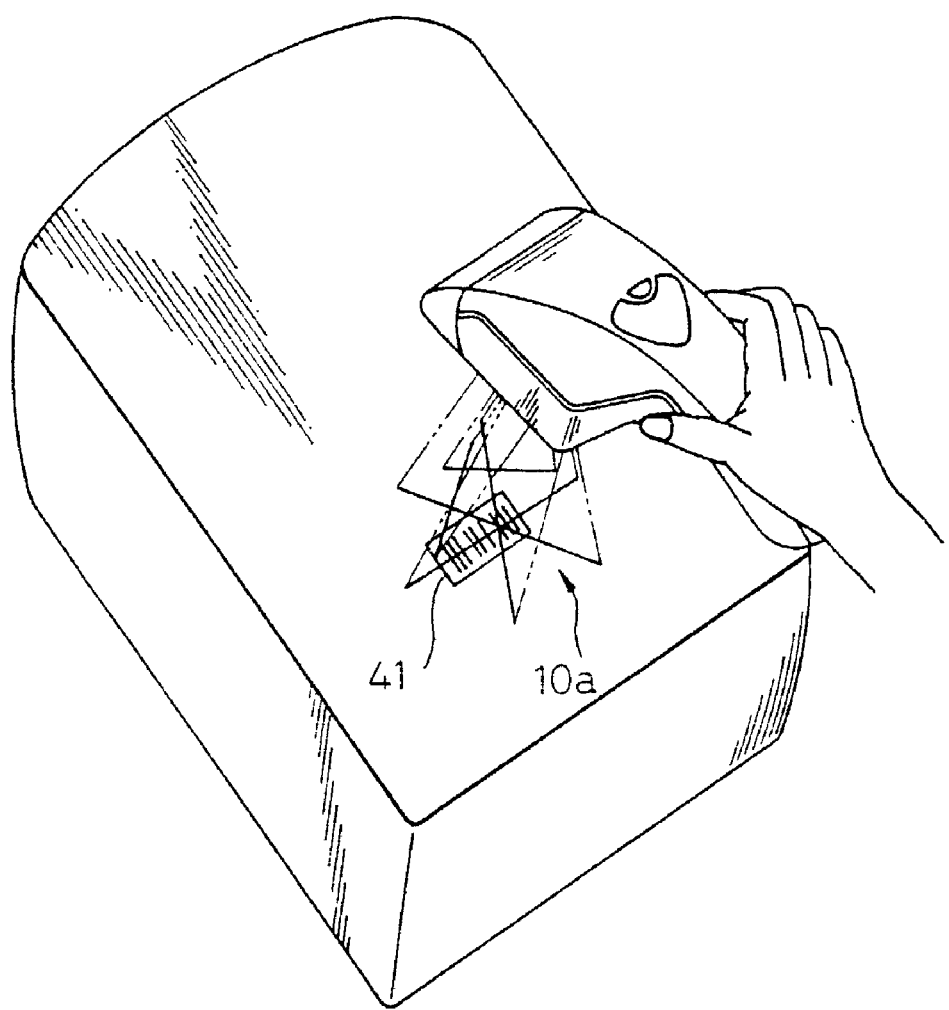
FIG. 17 is a view showing a state in which the reader shown in FIG. 14 is used as a hand-held reader.

FIG. 17 is a view showing an example of using the reader as a gun reader. When the reader is used as a gun reader, a user holds the grip and directs the first read window toward a bar code borne by an article. Even in this case, multi-scanning is performed for reading. This usage is suitable for a case in which it is hard to match the position of a bar code with a specific direction.

Figure 18:
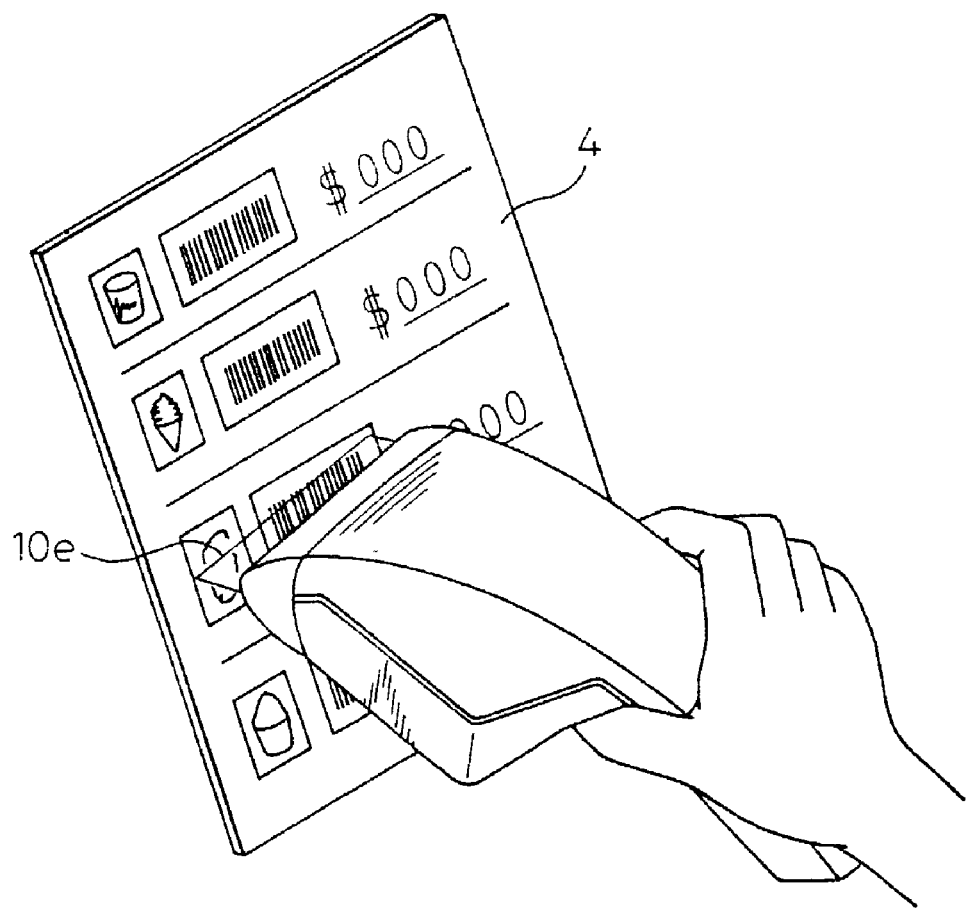
FIG. 18 is a view showing a state in which the reader shown in FIG. 14 is used to read a bar-code menu.

FIG. 18 is a view showing a case in which the reader shown in FIG. 14 is used as a touch reader. In the case shown in FIG. 18, the reader is brought to the position of a specific bar code on a bar-code menu 4. The bar code that is an object of reading is thus approached to the second read window. The reader shown in FIG. 14 has the second read window slightly inclined relative to the first read window. The second read window faces slightly up. For reading a bar code, the bar-code menu is often placed on a desk or the like for reading. The reader is held over the bar-code menu. When the second read window is inclined as shown in FIG. 14, and when the second read window approaches a bar code, the second read window can be bought into contact with the bar code in a natural manner.

As already described, the reader is provided with indicators, such as LEDs, that, when reading a bar code has completed normally, notify a user of the fact. When the reader is used as a stationary reader, the user is opposed to the read window. For the use of the reader as a stationary reader, therefore, an indicator should be formed on a read window so that it can be discerned easily.

When the reader is used as a hand-held reader, a user cannot discern the read window but can merely see the back side of the reader. If an indicator were located only on a read window, the user using the reader as a hand-held reader would have difficulty in discerning the indicator. However, since another indicator is located on the back side of the reader, the user can discern the indicator even when using the reader as a hand-held reader.

In the reader shown in FIG. 14, an indicator is located on each of the read window and the back side of the reader, so that the lit state of an indicator can be checked from either the front or back side of the reader. As for the indicators, different indicators may be placed on the front and back side of the reader respectively. A light source (LED or the like) for indication may be shared by the indicators. Light emanating from the LED may be guided to the front and back sides so that the plurality of indicators can be lit simultaneously. For reducing the number of parts, the same light source should preferably be shared.

Figure 19:
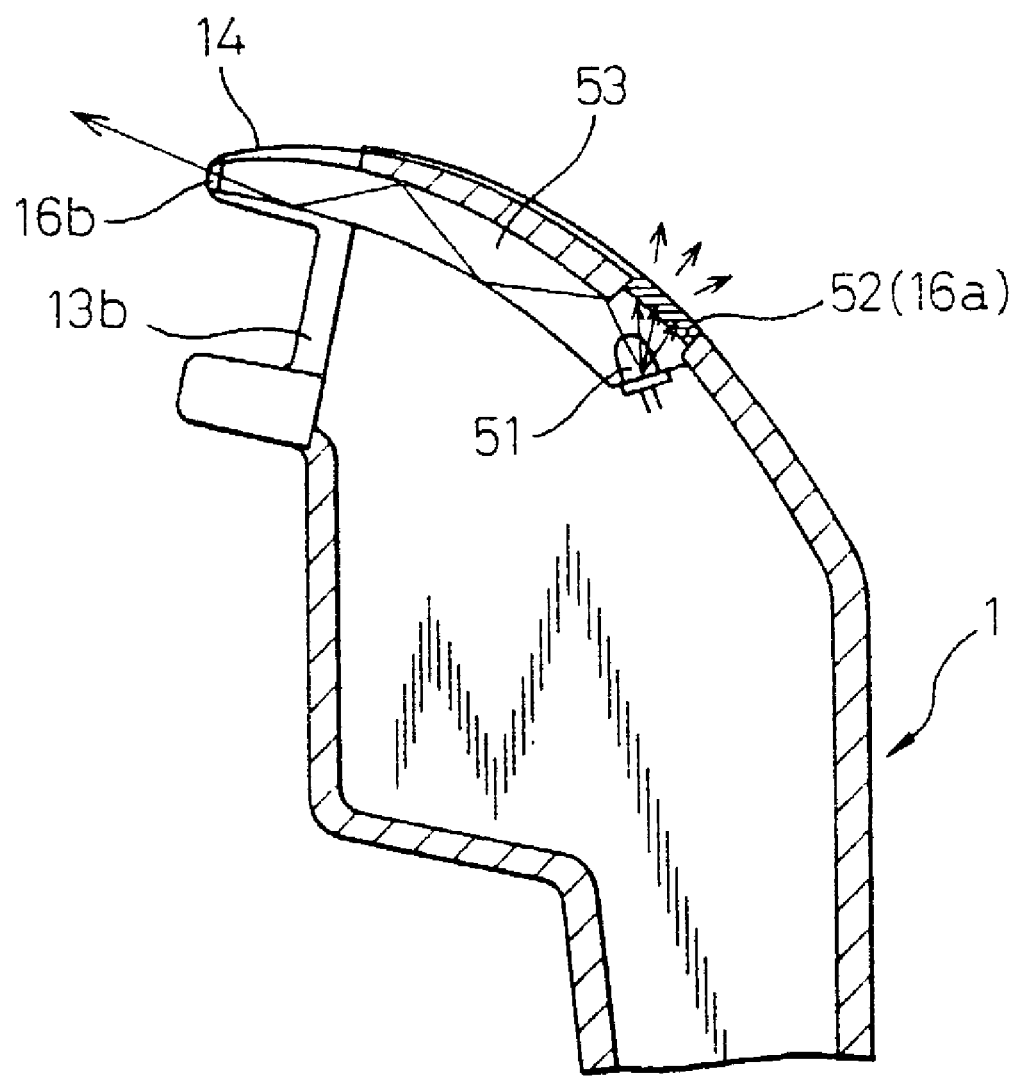
FIG. 19 is a diagram showing a structure for lighting a plurality of indicators using a single light source.

FIG. 19 is a diagram showing the structure of the indicators sharing the same LED light source. In the case shown in FIG. 19, an LED light source 5 is placed on the back side of the reader. A clear member 53 made of a resin or the like is located ahead of the LED light source.

When light is passed through a transparent member, if the angle of incidence of the light incident to a wall of the member is equal to or smaller than a critical angle, the incident light is reflected fully. If the angle of incidence of the light is larger than the critical angle, the incident light is emitted outside from the wall of the member.

The indicators shown in FIG. 19 are realized by making the most of the foregoing nature of light.

One end of the clear member is, as mentioned above, provided with the LED light source 51, and the other end thereof serves as the indicator 16b located on the second read window 13b. An opalescent member 52 is placed at an end of the clear member 53 in the vicinity of the LED light source 51, whereby the indicator 16a on the back side of the reader is materialized.

Light emanating from the LED light source enters the clear member 53. Light entering the wall of the clear member at an angle equal to or smaller than the critical angle is guided to the indicator 16b located on the second read window 13b. Thus, the indicator on the second read window is illuminated.

By contrast, light emanating from the LED light source 51 and entering the wall of the clear member at an angle equal to or larger than the critical angle passes through the clear member and is emitted outside. The opalescent member is located at a position at which light emanating from the LED light source is emitted outside. Light emanating from the LED light source is therefore emitted directly through the opalescent member, whereby the indicator on the back side of the reader is illuminated. The opalescent member acts as a plane of diffusion and scatters light emanating from the LED light source. A user can therefore discern the contents of indication made by the indicators in a wide range.

Owing to the foregoing structure, the common LED light source 51 is used to allow the indicators 16b and 16a located on the front and back sides of the reader to make indication for notifying a bar-code reading situation.

Figure 20A:
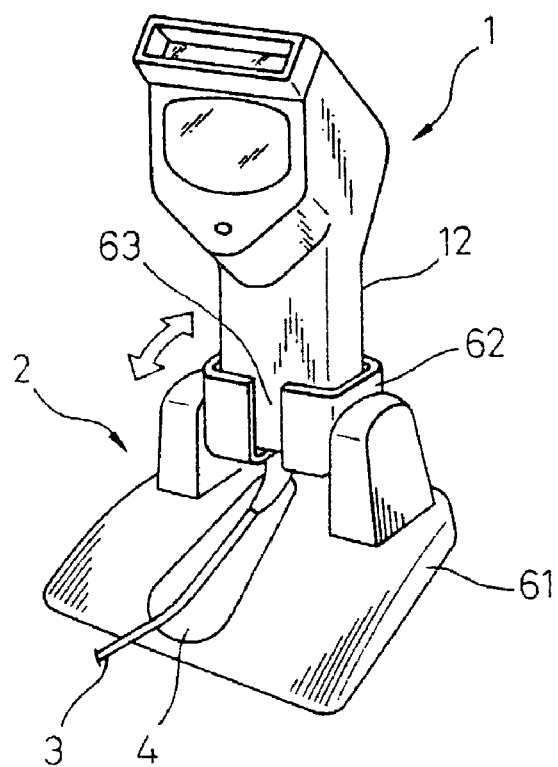
FIGS. 20A and 20B are views showing a stand on which a reader is mounted.
Figure 20B:
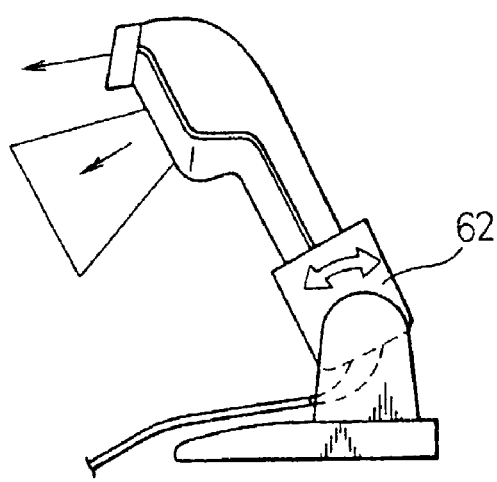

FIGS. 20A and 20B are views showing the stand on which the reader is mounted. The reader is the same as the reader shown in FIG. 16. FIG. 20A is an oblique view and FIG. 20B is a side view.

As already described, the grip 12 of the reader is inserted into the holder section 62 of the stand. Thus, the reader 1 is fixed to the stand 2. Since the cable 3 is extending from the bottom of the reader, a notch 63 is formed on the front side of the holder section for fear the cable 3 may interfere with mounting or dismounting of the reader on or from the stand 2.

For using the reader as a stationary reader, the reader is positioned so that the read window thereof will be opposed to a user with a counter or the like between them and scanning light will be emitted toward the user. This layout facilitates the work of bar-code reading. By contrast, for using the reader as a hand-held reader, the reader must be dismounted from the stand and drawn close to the user.

In consideration of the foregoing usages, it is required to form a notch, through which the cable of the reader can be led out, on the holder section of the stand for fear the cable may interfere with mounting or dismounting of the reader on or from the stand. From the viewpoints of the position of the reader used as a stationary reader and of the work of mounting or dismounting the reader on or from the stand, the notch should preferably be formed on the front side of the holder section facing a user.

Moreover, a dent 4 is formed on the base of the stand so that it will extend from under the holder section of the stand toward the user side. When the reader is mounted on the stand, the cable lies in the dent. The cable can thus be led into the user side. The cable coupled with the end of the grip cannot be bent very sharply. Forming the dent on the base of the stand is therefore effective in the sense of protecting the cable.

The holder section is pivotable in arrow directions in FIGS. 20A and 20B relative to the base of the stand. The read window employed of the reader and the emission direction of scanning light emitted through the read window can be set at a desired angle. As shown in FIG. 20B, the emission direction of scanning light emitted through the read window employed can be adjusted freely within the pivotable range of the holder section.

FIG. 21 is a three-side view of the stand on which the reader of this embodiment is mounted. In FIG. 21, a top view is seen in the left upper area, a front view is seen in the left lower area, and a side sectional view is seen in the right upper area. The holder section of the stand is supported at two points by the base. The points serve as fulcrums. The dent formed on the base has a shape spreading toward the edge of the base. The tip of the holder section is made wider so that the end of the grip of the reader can be introduced readily.

The stand shown in FIG. 21 is made of, for example, a resin.

A spring is located at one of the fulcrums of the holder section. A locking member 624 is attached to the other end of the spring. A plate such as a metallic plate is screwed to the bottom of the base. These components will be described in detail later.

FIG. 22 is a four-side view showing a state in which the reader is mounted on the stand. In FIG. 22, a back view is seen in the left upper area, a side view is seen in the left lower area, a front view is seen in the right lower area, and a top view is seen in the right upper area. As shown in FIG. 22, when the reader 1 is mounted on the stand 2, the read windows (especially the first read window) can be placed at a proper heights and fixed in desired directions. The reader is merely inserted into the holder section of the stand and locked in the holder section owing to its own weight. The work of mounting or dismounting the reader on or from the stand (especially dismounting) can be achieved readily.

Figure 23:
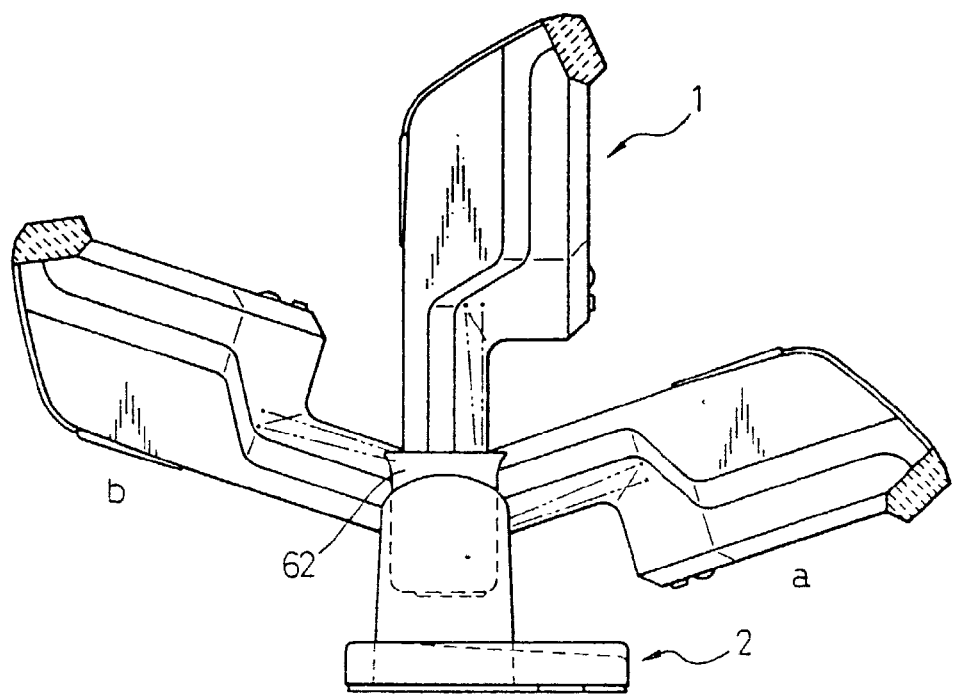
FIG. 23 is a view showing a pivotable range of a holder section of the stand.

FIG. 23 is a view showing adjustment of an angle at which the holder section of the stand is set. In the case shown in FIG. 23, the right hand of the drawing is the user side. FIG.

23 shows three states; a state in which the reader is mounted upright, a state (a) in which the reader is tilted toward the user side to the greatest extend and the first read window faces down, and a state (b) in which the reader is tilted toward the side opposite to the user side to the greatest extent and the first read window faces fully up.

As shown in FIG. 23, the angle of the reader can be adjusted freely within a range from a position a to b. The reader can be set at an optimal angle according to the installation site of the reader or the usage of the reader.

The stand can not only be placed on a counter but also, for example, by hung on a wall. When the stand is hung on a wall, the reader is immobilized at the position b in FIG. 23.

In case the wall has a metallic surface, a magnet or the like may be attached to the bottom of the stand so that the stand can be attracted to the wall. When the wall does not have the metallic surface, the stand is hung as described below.

As shown in FIG. 21, a screw hole 601 is formed around the center of the stand base. The screw hole is used to screw the stand 2 to a wall. The stand can thus be hung on the wall. However, when the stand is supported at only one point, there is a possibility that the stand rotates with the screwed point as a center. The stand cannot therefore be fixed to the wall on a stable basis.

A method of preventing the rotation of the stand is a method in which a plurality of screw holes are formed in the stand. If this method were adopted, since the stand is fixed at the plurality of points, the stand will not rotate. However, since numerous holes are bored in the stand, the appearance is not good.

A plate 611 such as a metallic plate is therefore, as shown in FIG. 19, attached to the bottom of the stand base of this embodiment. The plate may have, for example, a round shape. The shape of the plate is not limited to the one shown in FIG. 24. Supposing the plate is a metallic plate, since the plate has weight, it fills the role of a weight. When the reader is mounted on the stand, since the center of gravity of the stand can be lowered, the stand becomes stable.

A part A of the plate 611 is molded in line with the shape of the base 61 of the stand 2. Normally, the plate 611 will not come out of the stand 2. The plate 611 and stand 2 are secured with two screws. A screw hole used to fix the plate and bored in the stand is shown even in the front sectional view of FIG. 21.

The plate has three holes along the same line. In the state shown in FIG. 24, that is, in a normal state, a hole c in the center of the plate coincides with the position of a screw hole 601 in the stand base. Two screw holes are formed intermediately between the center hole c and a hole a in the plate.

Figure 24:
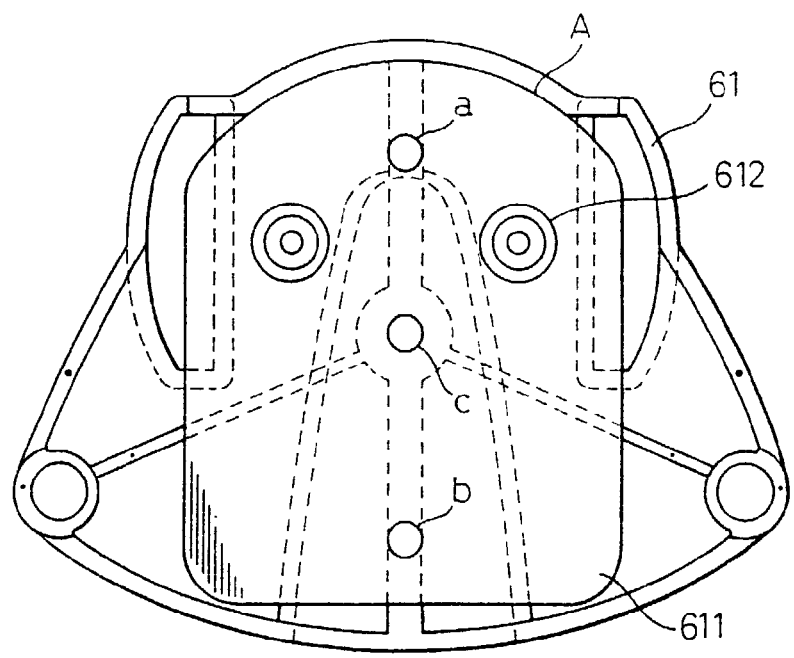
FIG. 24 is a diagram showing a plate attached to the bottom of a base of the stand.

For hanging the stand on a wall, as shown in FIG. 25, the plate is turned upside down relative to the state shown in FIG. 24. An upper view in FIG. 25 is a view of the back side of the plate, and a lower view therein is a view of the lateral side thereof. In this state, the hole a of the plate coincides with the screw hole of the stand base. The hole b of the plate comes out of the stand.

Figure 26:
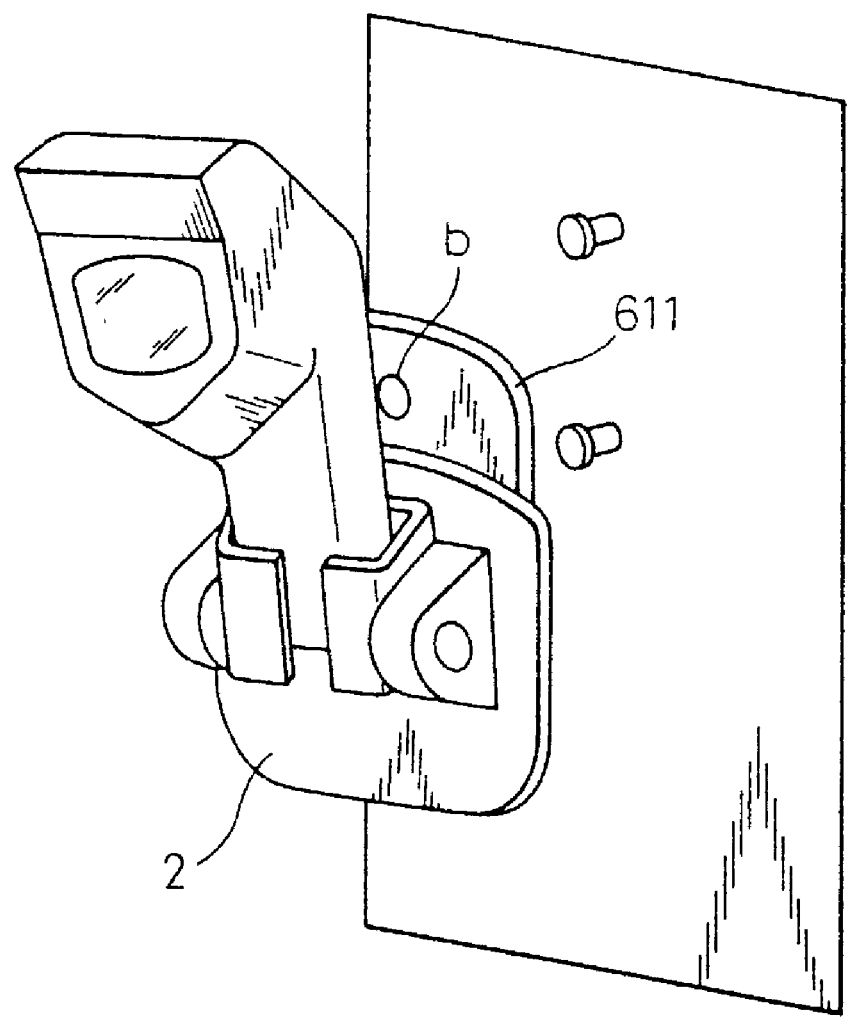
FIG. 26 is a view showing a state in which the stand is hung on the wall.
Figure 27:
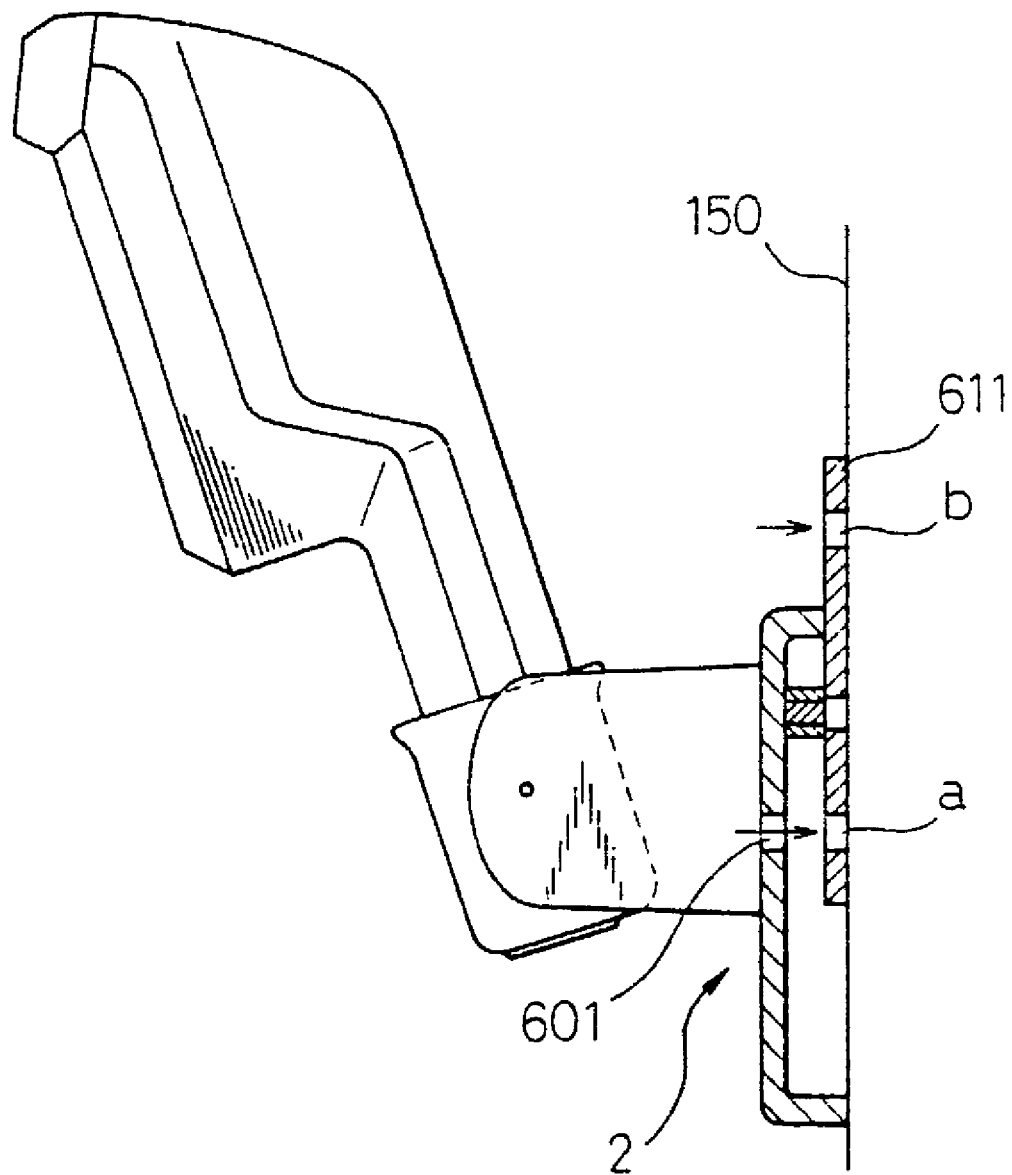
FIG. 27 is a side sectional view of the stand hung on the wall.

For hanging the stand on a wall, the hole b of the plate and the hole of the stand base (hole a of the plate) are used to attach screws. The stand is thus fixed to the wall. FIG. 26 is an oblique view showing the work of attachment. FIG. 27 is a side sectional view showing the stand 2 in a state in which the stand 2 is hung on a wall 150. As shown in these drawings, in this embodiment, the stand is screwed at two points. The stand will not rotate when hung on a wall. Moreover, the work of screwing the plate can proceed smoothly.

Without a mechanism for stopping the pivoting of the holder section, there is a possibility that when the reader is angled even slightly, it is turned to the position a in FIG. 23 because of the weight of the reader and other factors. The stand in this embodiment is therefore provided with a mechanism for controlling the pivoting of the holder section in a multistage fashion and for stopping the pivoting of the holder section.

Figure 28:
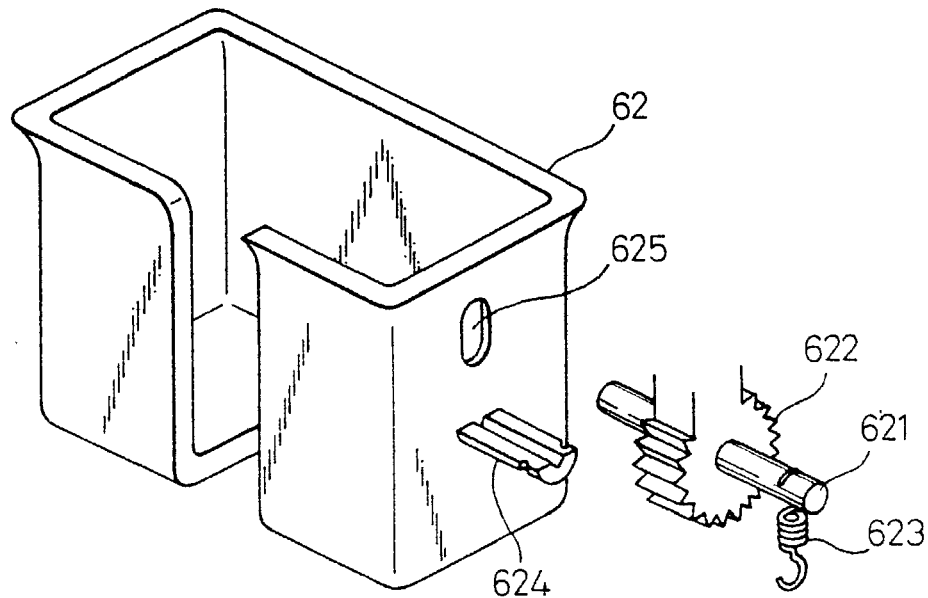
FIG. 28 is an explanatory diagram concerning a stand tilt mechanism.
Figure 29:
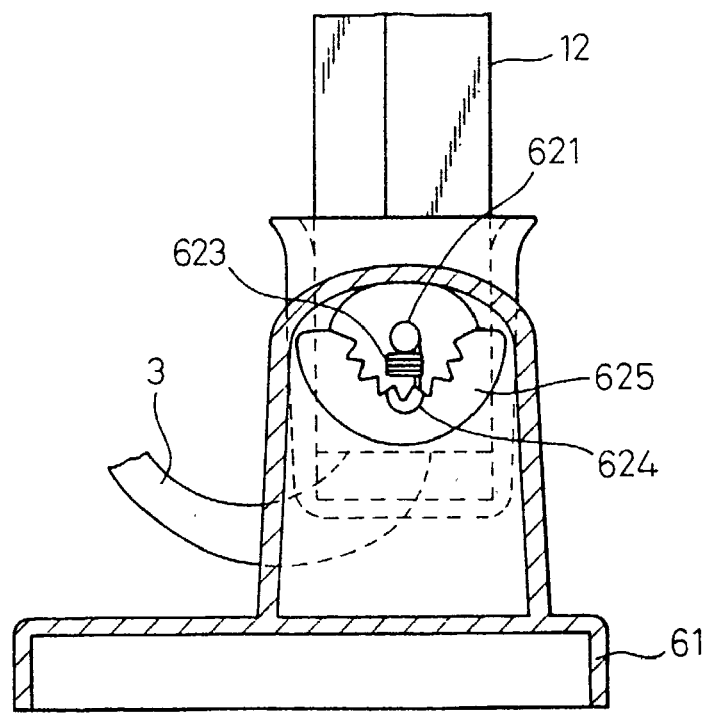
FIG. 29 is a side view of the tilt mechanism.
Figure 30:
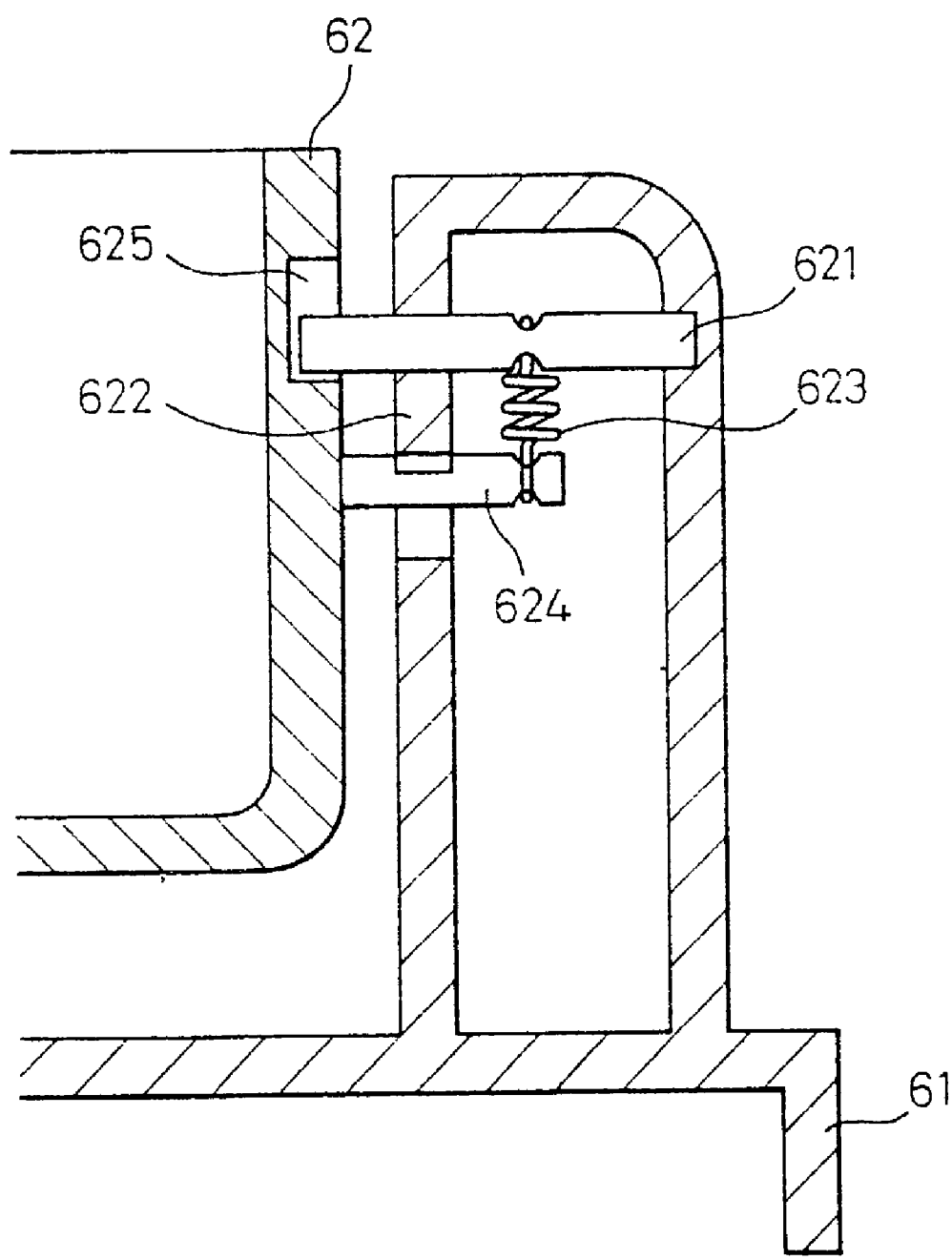
FIG. 30 is a front view of the tilt mechanism.

FIG. 28 is an explanatory view concerning a tilt mechanism. FIG. 29 is a side perspective view showing the major portion of the stand having the tilt mechanism in enlarged form. FIG. 30 is a front view of the major portion. A supporting member 622 having a plurality of teeth in an arc form is fixed to the base of the stand. A spring 623 is located at one of the fulcrums of the holder section. The other end of the spring is attached to a locking member 624 that is shaped to mesh with the teeth of the supporting member fixed to the base. The locking member is constrained to go toward the fulcrum because of the elasticity of the spring.

Since the tilt mechanism is employed in the stand, when the holder section is pivoted, the teeth of the supporting member are meshed with the teeth of the locking member. The supporting member is constrained to go toward the fulcrum due to the elasticity of the spring. The holder section 62 can therefore be locked in a pivoted state. Consequently, a multi-stage angle adjustment can be realized.

FIG. 29 shows the cable 3 led out from the bottom of the reader. The cable is bent toward the read-window side of the reader so that the cable can be led out to the user side without fail when the reader is mounted on the stand.

As mentioned above, when the reader is mounted on the stand, the reader can be used as a stationary reader. If necessary, the reader can be dismounted from the stand and used as a hand-held reader.

For using the reader as a hand-held reader, a user holds the grip 12. When the reader is mounted on the stand, the grip of the reader is inserted into the holder section. For dismounting the reader from the stand, it is impossible to hold the grip and dismount the reader. Unless hands are changed, the grip cannot be held. For dismounting the reader from the stand, the head must be held. The head is larger than the grip and hard to hold with a hand. Especially, a user having small hands may not be able to raise the head with one hand. Thus, there is a problem that the work of dismounting the reader from the stand is troublesome.

In order to solve this problem, the grip is designed to be held with the reader mounted on the stand.

Figure 31:
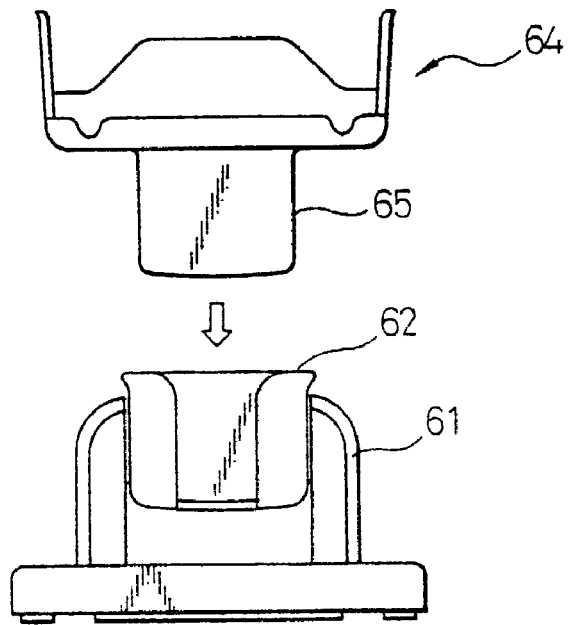
FIG. 31 is a view showing a laying stand and a stand body.

FIG. 31 shows a stand proposed to solve the problem. In FIG. 31, a laying stand 64 is attached to the stand that has been described so far. The laying stand has a tongue 64 on the bottom thereof. The tongue is inserted into the holder section. The laying stand 64 is attachable and detachable to and from the stand body. When needed (for laying the reader), the laying stand is attached to the stand body. When not needed (for erecting the reader), the laying stand is detached from the stand body.

Figure 32:
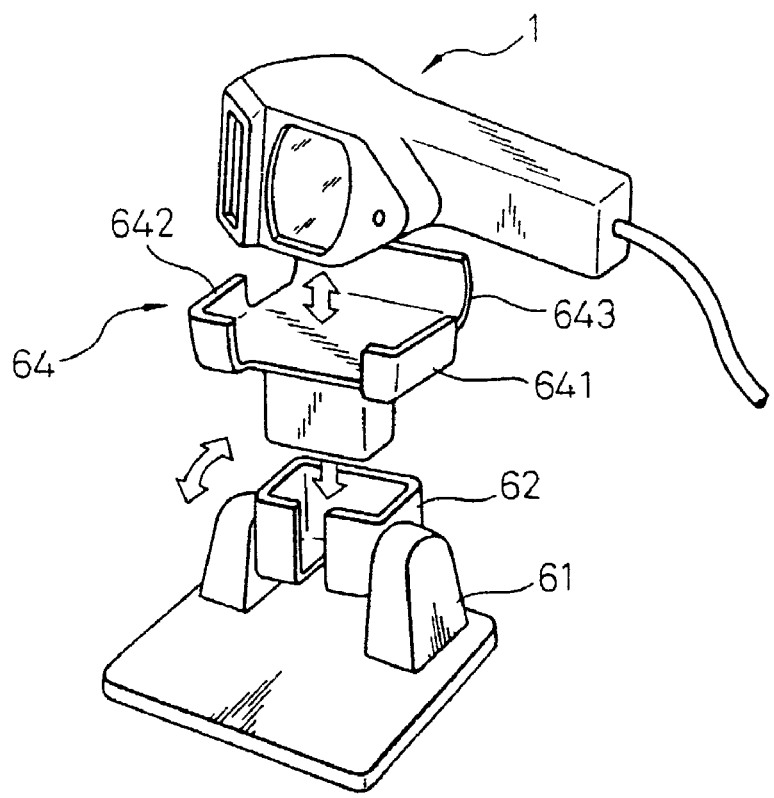
FIG. 32 is a view showing the laying stand on which the reader is mounted.

FIG. 32 is a view showing a state in which the reader is mounted on the laying stand. The reader 1 is laid on the laying stand shown in FIGS. 31 and 32. Specifically, the head 11 of the reader 1 is placed on the laying stand. Even in this case, no special mechanism is needed in order to fix the head of the reader to the laying stand. The reader 1 is merely locked on the laying stand owing to its own weight.

However, when the reader is laid, the grip comes out sideways. The reader cannot be laid on the laying stand on a stable manner when no measure is taken. The laying stand is therefore provided with three walls 641, 642, and 643 for supporting the head. The right and left walls 641 and 642 of the laying stand support the lateral side of the head 11 of the reader and part of the front side of the head 11. The wall 643 formed at the deep end of the laying stand supports the back side of the head 11 of the reader. Owing to these walls, the orientation of the first read window 13a of the reader is defined. The first read window can be directed toward the user side. Furthermore, it can be prevented that the reader falls off the laying stand.

In FIG. 32, the grip of the reader is located on the right hand. Thus, the grip is not inserted into the stand but comes out of the stand. A user can therefore hold the grip readily. The reader can be dismounted from the stand with the grip thereof held.

The laying stand has a symmetric shape. As shown in FIGS. 33A and 33B, the grip can be placed on either the right or left hand. FIG. 33A shows a state in which the grip is placed on the left hand (relative to a user). FIG. 33B shows a state in which the grip is placed on the right hand (relative to a user). FIG. 33B shows the walls supporting the front side of the head, while FIG. 33A does not show the walls for better understanding of the state of the head on the laying stand.

As shown in FIGS. 33A and 33B, the grip 12 of the reader 1 can be placed on either the right or left hand. Depending on whether a user is right-handed or left-handed, the orientation of the grip of the reader that is laid on the stand can be selected freely.

When intending to have a bar code read, a user tends to pass the bar code intentionally horizontally or vertically by the read window employed. Moreover, a bar code is printed lengthwise on, for example, a can. Thus, in many cases, the width or length direction of an article bearing a bar code agrees with the longitudinal direction of the bar code. It may be a matter of course in terms of the user's way of maneuvering the reader that the probability that the orientation of a bar code passing the read window is a horizontal or vertical direction is high.

When the reader is used as a stationary reader in order to read a bar code, although the angle of the bar code need not concern the user, it is preferable in consideration of the aforesaid point that the scanning pattern supplied from the read window employed includes a substantially horizontal or vertical scanning ray.

When the reader is mounted on the laying stand, it angled so that at least one scanning ray constituting the scanning pattern supplied from the first read window scans horizontally. More particularly, as shown in FIGS. 33A and 33B, the reader is placed so that the grip 12 of the reader 1 slightly slants down. When the reader is angled this way, one of scanning rays constituting the scanning pattern is scanned horizontally.

Likewise, the reader is placed so that one of the scanning rays constituting the scanning pattern supplied through the first read window 13a is scanned vertically.

Since the scanning pattern thus includes horizontal and vertical scanning rays, the horizontal or vertical orientations of bar codes, with which the bar codes are passed at a high probability, agree with the scan directions of the scanning rays. Reading bar codes can be achieved more reliably.

Figure 34:
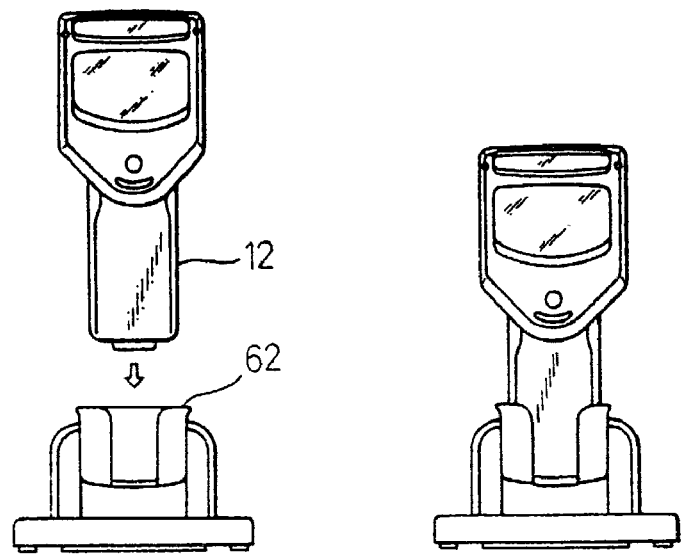
FIG. 34 is a view showing an erecting stand.
Figure 35:
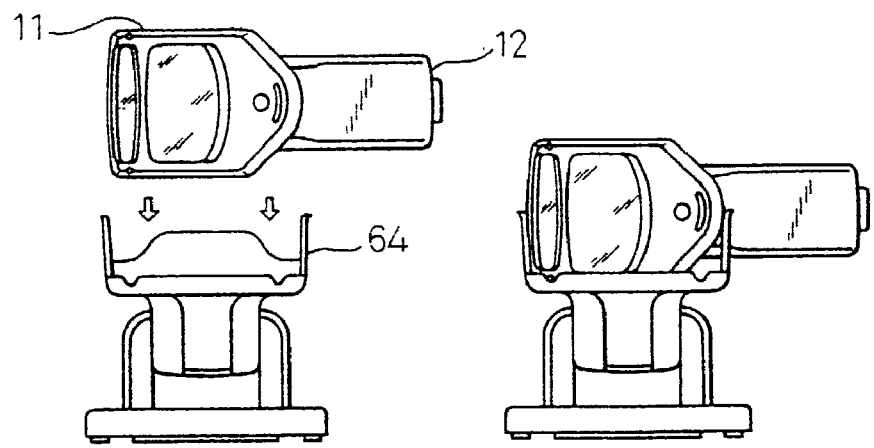
FIG. 35 is a view showing a laying stand.

FIGS. 34 and 35 are views showing the reader erected on the stand in comparison with the reader laid on the stand. FIG. 34 shows an erecting stand, while the FIG. 35 shows a laying stand.

As shown in FIG. 34, when the erecting stand is used, the grip 12 is inserted into the holder section. The reader mounted on the stand is stable. However, it is hard to dismount the reader from the stand by holding the grip. The work of mounting or dismounting the reader is rather hard to do.

As shown in FIG. 35, when the laying stand is used, since the grip of the reader is easy to hold, the work of mounting or dismounting the reader can be carried out efficiently. In particular, when the reader is used as a hand-held reader, it becomes unnecessary to change hands. However, since the grip is coming out sideways, it is hard to balance the weight of the reader. The reader mounted on the stand does not become stable immediately.

A user is therefore requested to select the erecting stand or laying stand by taking account of the usage of the reader and the merits and demerits of the stands.

When the reader is used as a stationary reader or gun reader, the scanning pattern supplied through the first read window 13a is used to perform multi-scan. The scanning light emitted through the second read window 13b is not directly involved in reading of bar codes.

As shown in FIGS. 9 and 14, the supply direction of the scanning pattern through the first read window 13a is different (has a different angle) from the emission direction of the scanning light through the second read window 13b. If scanning light is emitted through both the first and second read windows, in case the reader is used as a stationary or gun reader, when the scanning pattern supplied through the first read window is directed toward a bar code that is an object of reading, the scanning light emitted through the second read window travels in a direction completely different from the direction toward the bar code that is an object of reading, and therefore scans something that has no relation to the bar code.

There is a possibility that light reflected from anything other than a bar code that is an object of reading, which has been scanned by the scanning ray emitted through the second read window, may be detected by the reader. This results in noise or incorrect recognition by the reader. In this case, the reader causes a read error.

By contrast, when the reader is used as a touch reader, the scanning pattern supplied through the first read window is not used for bar-code reading. However, as shown in FIG. 13C, even when the scanning ray emitted through the second read window is used to read a bar code on a bar-code menu, if scanning rays are still emitted through the first read window, a bar code that is not an object of reading is scanned by the scanning rays emitted through the first read window. The reader then detects both reflected light of the scanning rays emitted through the first read window and reflected light of the scanning rays emitted through the second read window.

In case the both kinds of reflected light contain bar-code data that is valid data, the reader cannot distinguish which is wanted data. In particular, since all bar codes recorded on a bar-code menu are valid data irrespective of whether the data is or is not required to be input, two different bar codes coexist. This leads to a problem that double bar-code read occurs. In this case, since it is impossible to input the required information alone, the input information must be erased or data must be input again.

In order to solve the foregoing problem, according to a read form of the reader, it is required to substantially invalidate bar-code reading based on scanning light emitted through a read window not associated with the read form during, for example, a period during which the scanning light is emitted through the read window not associated with the read form.

Figure 36:
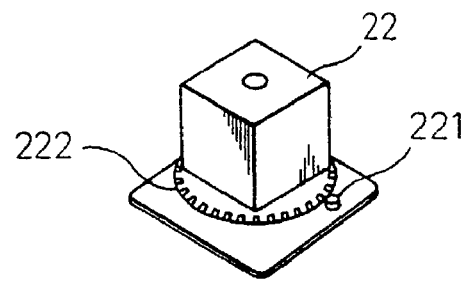
FIG. 36 is a view showing a polygon mirror having a mechanism for checking a scan position.

FIG. 36 is a view showing part of a polygon mirror. A structure for use in locating a position scanned by a scanning ray is shown. A disk-like member 222 having a plurality of slits is placed on the base of the polygon mirror 22. A sensor 221 for detecting the passage of a slit is mounted on the base on which the polygon mirror is placed. When detecting passage of a slit, the sensor 221 outputs a mirror position detection signal.

One of the slits formed on the disk member 222 has a larger width in order to indicate a reference polygon position. The sensor is used to detect the slit indicating the positional reference, whereby a control unit of the reader, which is not shown, recognizes that a specific surface of the polygon mirror has passed the sensor position. Thus, the control unit grasps the rotated state of the polygon mirror, and judges to which floor mirror scanning light is incident.

When the reference position is set to a specific position of the polygon mirror, it can be recognized that the specific position of the polygon mirror has passed the sensor position. By counting the number of slits passed after the detection of the reference position, it can be checked readily which surface of the polygon mirror has passed the sensor position.

Figure 37:
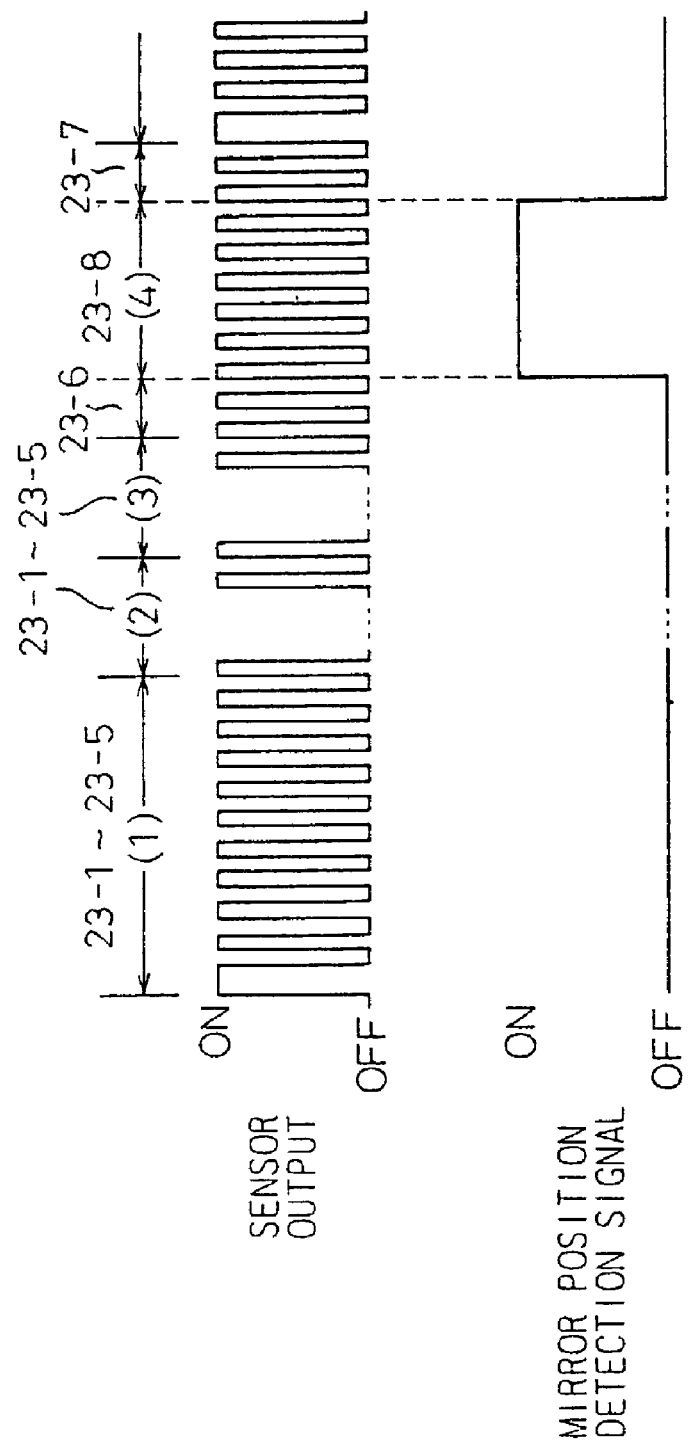
FIG. 37 is a diagram showing the relationship between a sensor output and mirror position detection signal.

FIG. 37 shows the waveform of an output of the sensor shown in FIG. 36 and the waveform of a mirror position detection signal based on the output. FIG. 37 shows the sensor output and mirror position detection signal. In FIG. 37, (1) is associated with the first reflection surface, (2) is associated with the second reflection surface, (3) is associated with the third reflection surface, and (4) is associated with the fourth reflection surface.

Furthermore, in FIG. 37, reference numerals 23-1 to 23-8 denote the floor mirrors to which scanning light reflected from the respective reflection surfaces is incident and which correspond to the floor mirrors shown in FIG. 7A. Herein, although "23-1 to 23-5" is written in FIG. 37, when the polygon mirror is rotating clockwise in FIG. 7A, the actual scanning order is the floor mirrors 23-3, 23-2, 23-1, 23-5, and 23-4.

The sensor output shown in FIG. 37 is driven on every time a slit is detected, and driven off for the other things. The duration during which the output is on is comparable to the width of a slit. As shown in FIG. 37, the wide slit serving as a positional reference is formed so that it will be detected when scanning light reflected from the first reflection surface starts scanning the floor mirrors 23-1 to 23-5 (actually the floor mirror 23-3).

When the wide slit is detected, the on duration of the sensor output is long. The control unit of the reader which is not shown recognizes that the scanning light reflected from the first reflection surface of the polygon mirror has started scanning the floor mirror 23-3.

The number of slits formed on the disk member is predetermined. It is also predetermined which slit is associated with which position of which reflection surface of the polygon mirror. Once the positional relationships of the reference slit passing the sensor with the reflection surfaces of the polygon mirror are pre-set in the control unit or the like, the control unit can readily grasp which reflection surface of the polygon mirror is reflecting light and which floor mirror is being scanned by the reflected light by counting the number of slits that have passed the sensor after the detection of the reference slit. The control unit then recognizes the period during which scanning light reflecting from the fourth reflection surface of the polygon mirror is scanning the floor mirror E8, and, as shown in FIG. 37, retains the mirror position detection signal in the on state during the period.

Figure 38:
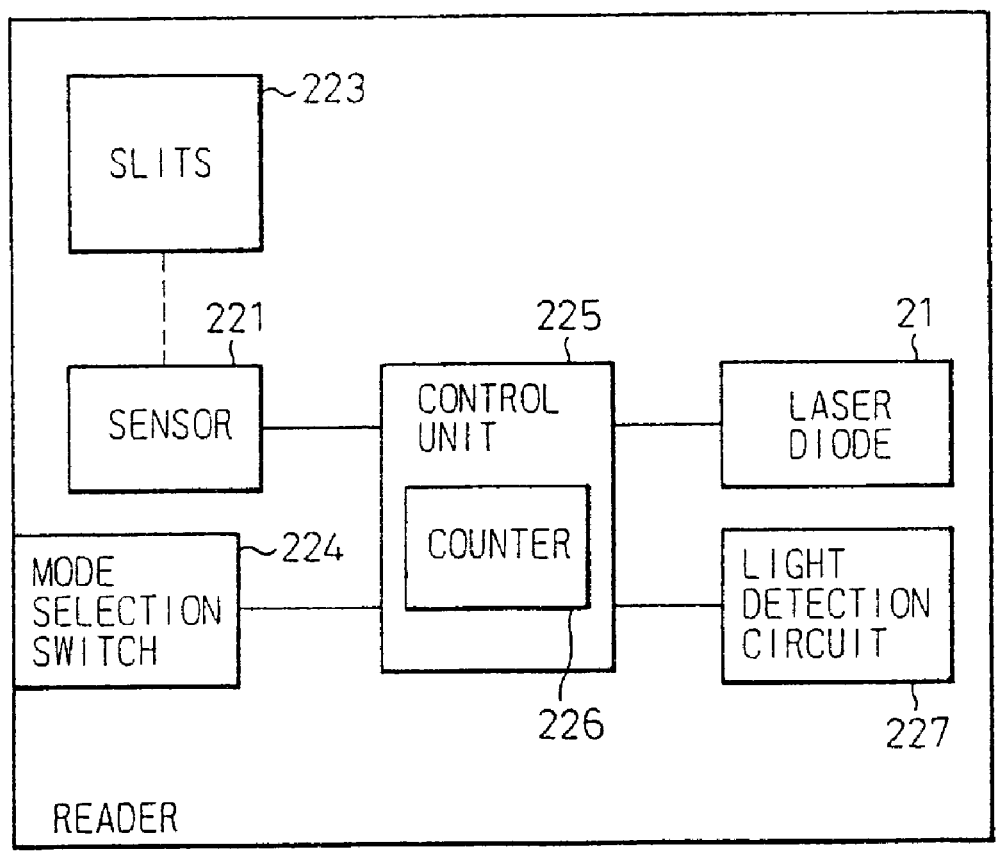
FIG. 38 is a block diagram of a reader.

FIG. 38 is a functional block diagram of the reader. In FIG. 38, reference numeral 221 denotes a sensor mounted on the base of the polygon mirror. The sensor 221 detects a slit 223. 225 denotes a control unit for controlling the operations of the reader. 226 denotes a counter for counting the number of outputs of the sensor 221. 21 denotes a laser diode serving as a light source. 227 denotes a light detection circuit for detecting light reflected from a bar code. The operations of the laser diode 21 and the light detection circuit 227 are controlled by the control unit 225.

Furthermore, reference numeral 224 denotes a mode selection switch. The reader has two read modes: a first read mode (multi-scanning mode) in which a scanning pattern composed of a plurality of scanning rays emitted through the first read window is supplied, and a second read mode (signal-scanning mode) in which one scanning ray is emitted through the second read window. A user manipulates the mode selection switch when he/she needs it, whereby the first read mode and second read mode can be changed. Thus, the user can designate a desired read mode.

Figure 39:
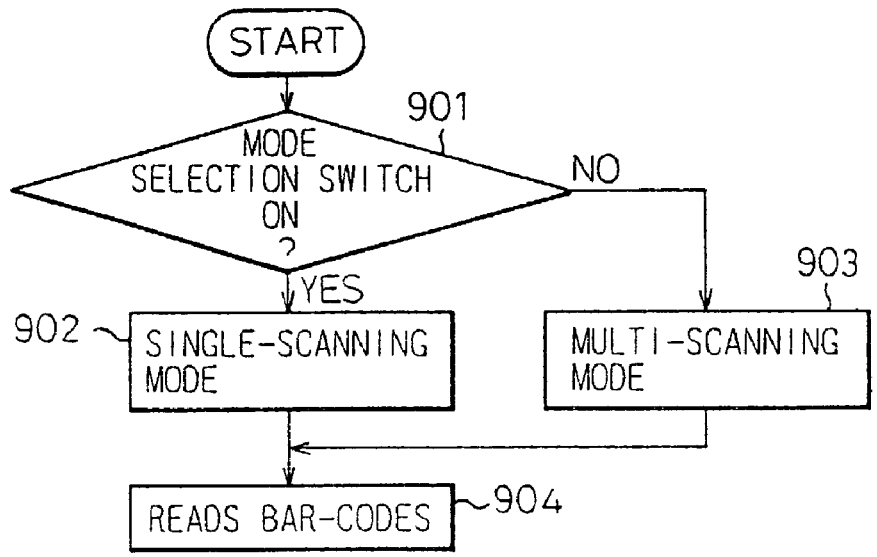
FIG. 39 is a flowchart describing a procedure of read mode change.

FIG. 39 is a flowchart describing read mode change achieved by manipulating the mode selection switch. The control unit always monitors if the mode selection switch has been manipulated (step 901). When the mode selection switch is not manipulated, the read mode is regarded as the multi-scanning mode (step 903) and the light source is controlled so that scanning light will be emitted through the first read window.

In contrast, when it is detected that the mode selection switch has been manipulated, the control unit changes the read mode into the single-scanning mode and controls lighting of the light source so that scanning light will be emitted through the second read window alone (step 902).

Based on the thus-selected read mode, bar-code reading is executed.

Figure 40:
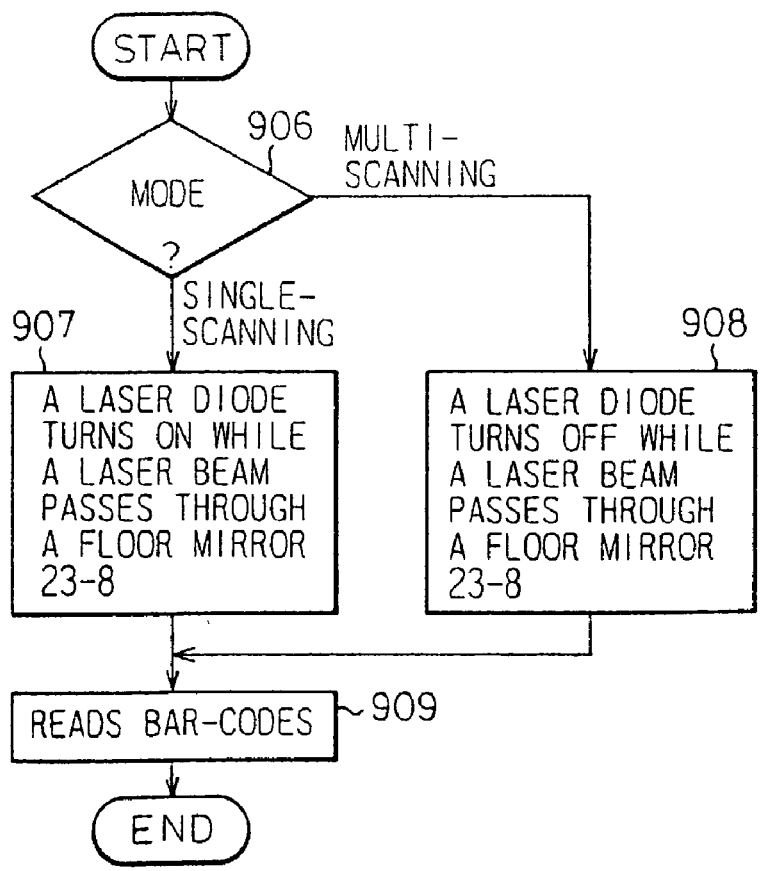
FIG. 40 is a flowchart describing light source lighting control to be performed according to a floor mirror over which scanning light is scanned (read mode change)

FIG. 40 is a flowchart describing how to control lighting of the light source more particularly.

What is needed in multi-scanning mode is scanning light emitted through the first read window 13a. Scanning light reflected from the floor mirror 23-8 is not needed to read bar codes. By contrast, what is needed in single-scanning mode is only the scanning light emitted through the second read window 13b. Only the scanning light reflected from the floor mirror 23-8 is needed and the other scanning light is not needed.

When the read mode is set to single-scanning, the control unit operates the laser light source only during a period during which light reflected from the polygon mirror is scanning the floor mirror 23-8 (step 907), and reads a bar code. By contrast, when the read mode is set to the multi-scanning mode, the control unit does not operate and laser light source during a period during which the floor mirror 23-8 is scanned (step 908), and reads a bar code.

Owing to the foregoing lighting control, scanning light can be emitted only through the read window associated with each read mode.

Figure 41:
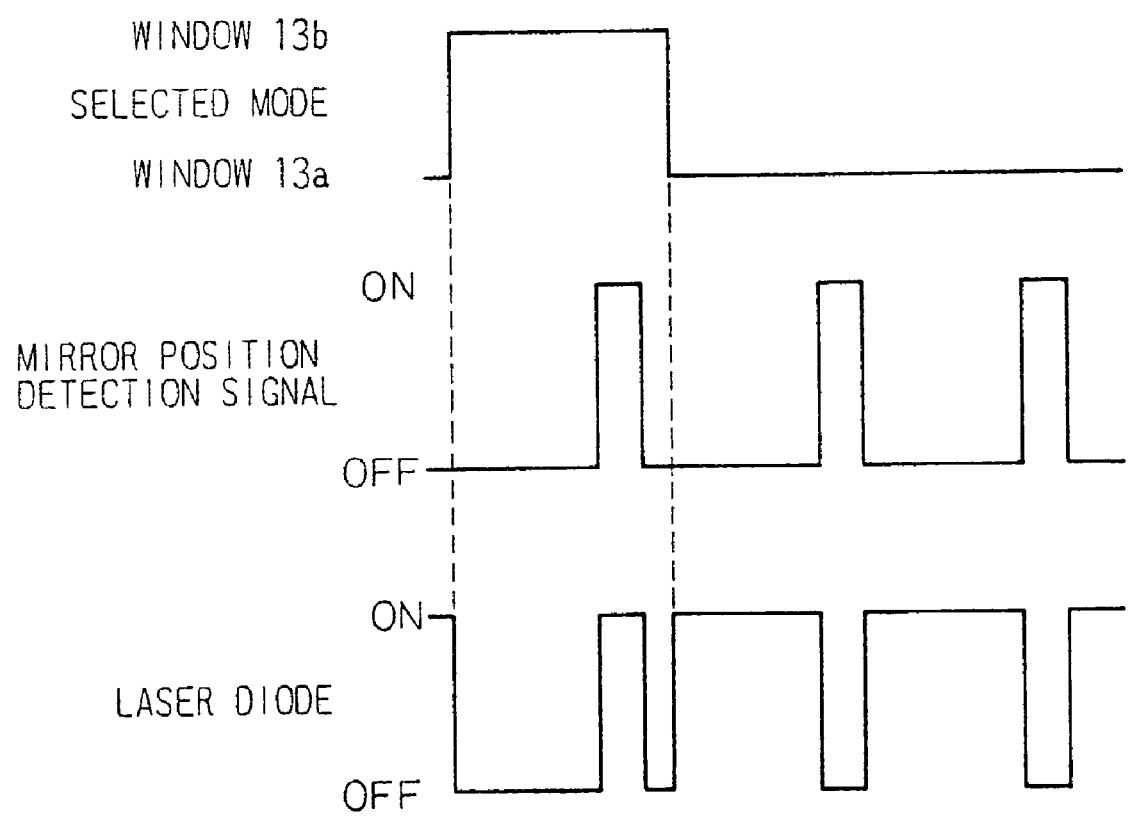
FIG. 41 is a timing chart showing waveforms of output signals provided by the components of a reader during light source lighting control.

FIG. 41 shows the waveforms of outputs of the components shown in FIG. 38.

An output from the mode selection switch is fed to the control unit. For selecting the first read mode (for emitting scanning light through the first read window 13a), the output is driven off. For selecting the second read mode (for emitting scanning light through the second read window 13b), the output is driven on. The control unit checks the output of the mode selection switch to see which read mode is selected. Depending on the result, the control unit controls lighting of the laser diode.

The mirror position detecting signal is identical to the one shown in FIG. 37, and remains on during a period during which light reflected from the fourth surface of the polygon mirror is scanning the floor mirror 23-8.

During a period during which the mode selection switch remains on because a user intends to use the reader in second read mode or as a touch reader, scanning light is emitted through the second read window 13b but scanning light must not be emitted through the first read window 13a. For a period during which the mirror position detection signal remains on, the control unit gives control so as to light the laser light source. For a period during which the mirror position detection signal remains off (the floor mirrors 23-1 to 23-7 are being scanned), the control unit gives control so as not to operate the laser light source. Thus, laser light is emitted only through the second read window 13b. When the reader is used as a touch reader in order to read a bar-code menu, it can be prevented that scanning light emitted through the first read window scans an unrelated bar code to cause a double read.

When a user uses the reader as a stationary or gun reader, the output of the mode selection switch is driven off. Based on this fact, for a period during which the mirror position detection signal remains off, the control unit operates the laser light source. For a period during which the mirror position detection signal remains on (scanning light reflected from the fourth reflection surface of the polygon mirror is scanning the floor mirror 23-8), the control unit does not operate the laser light source.

Owing to the foregoing control, even when the reader is used as a stationary or gun reader, it can be prevented that scanning light is emitted through the second read window 13b. It can be prevented that any unrelated thing other than a bar code is scanned.

Figure 42:
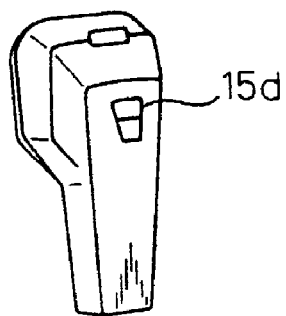
FIG. 42 is a view showing a mode selection switch formed on the back side of a reader.

FIG. 42 is a view showing an example of a mode selection switch. FIG. 42 shows the back side of the reader. The reader of the embodiment shown in FIG. 42 has a mode selection switch 15d on the back side thereof. The mode selection switch 15d is manipulated by the index finger or thumb of a user's hand holding the grip.

It is required to form the mode selection switch at a position permitting easy manipulation by a finger of a hand holding the grip. In particular, either a person having large hands or a person having small hands must be able to manipulate the mode selection switch in the same manner.

The mode selection switch is formed even on, for example, the reader shown in FIG. 15. In the case shown FIG. 15, the mode selection switch 15b is shaped like a letter V. Owing to the shape like a letter V, the mode selection switch can be made long and wide.

The position on the switch at which the finger is rested varies depending on whether the switch is manipulated by an index finger or by a thumb. However, since the mode selection switch is made long, either the index finger or thumb can press the mode selection switch. Since the mode selection switch is made wide, either a person having long fingers or a person having short fingers can manipulate the mode selection switch in the same manner.

Figure 43:
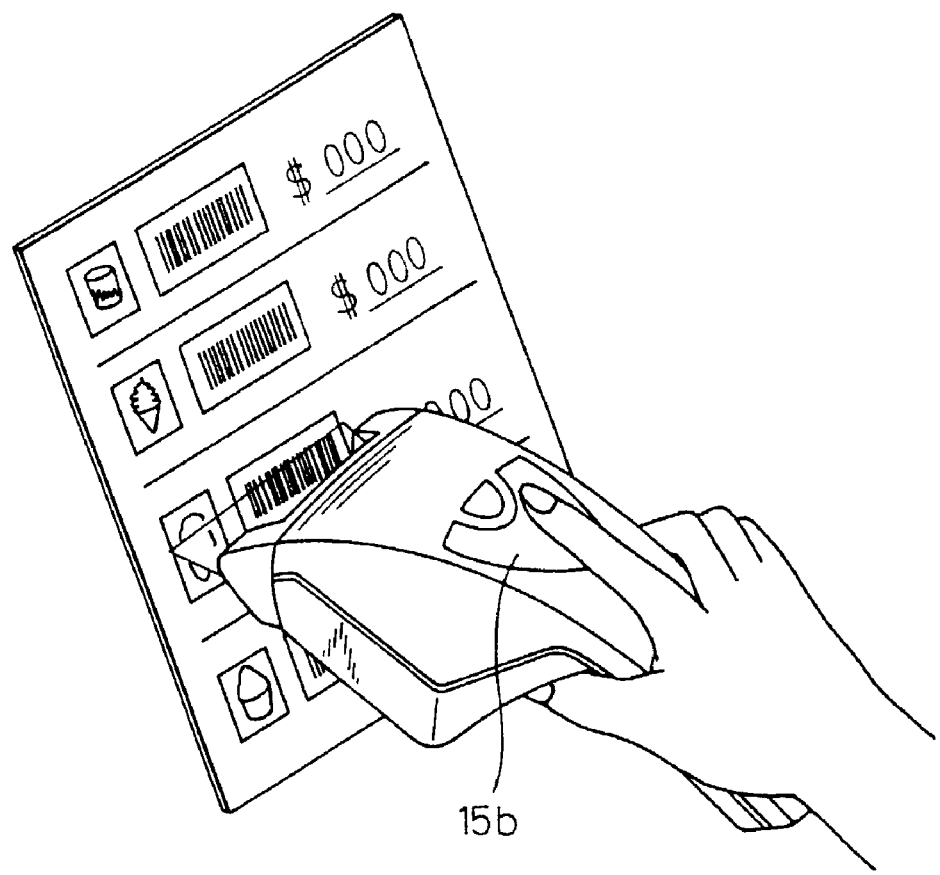
FIG. 43 is a view showing a state in which the mode selection switch is manipulated by an index finger.

FIG. 43 is a view showing a state in which the mode selection switch (function change switch) is pressed by an index finger. In this case, a user holds the grip with all his/her fingers except the index finger and stretches the index finger. The mode selection switch is located at a position at which the stretched index finger lies.

When the grip is held as shown in FIG. 43, the index finger and thumb of a maneuvering person is spaced like a letter V, though it depends on the person. When the grip is held by a right hand, the index finger lies on the right-hand part of the mode selection switch. When the grip is held by a left hand, the index finger lies on the left-hand part of the mode selection switch. Since the mode selection switch is made wide, as shown in FIG. 43, when the grip is held, the index finger can be rested on the mode selection switch in a natural manner. Furthermore, whichever of a right hand and left hand is used, the mode selection switch can be manipulated in the same manner.

Figure 44:
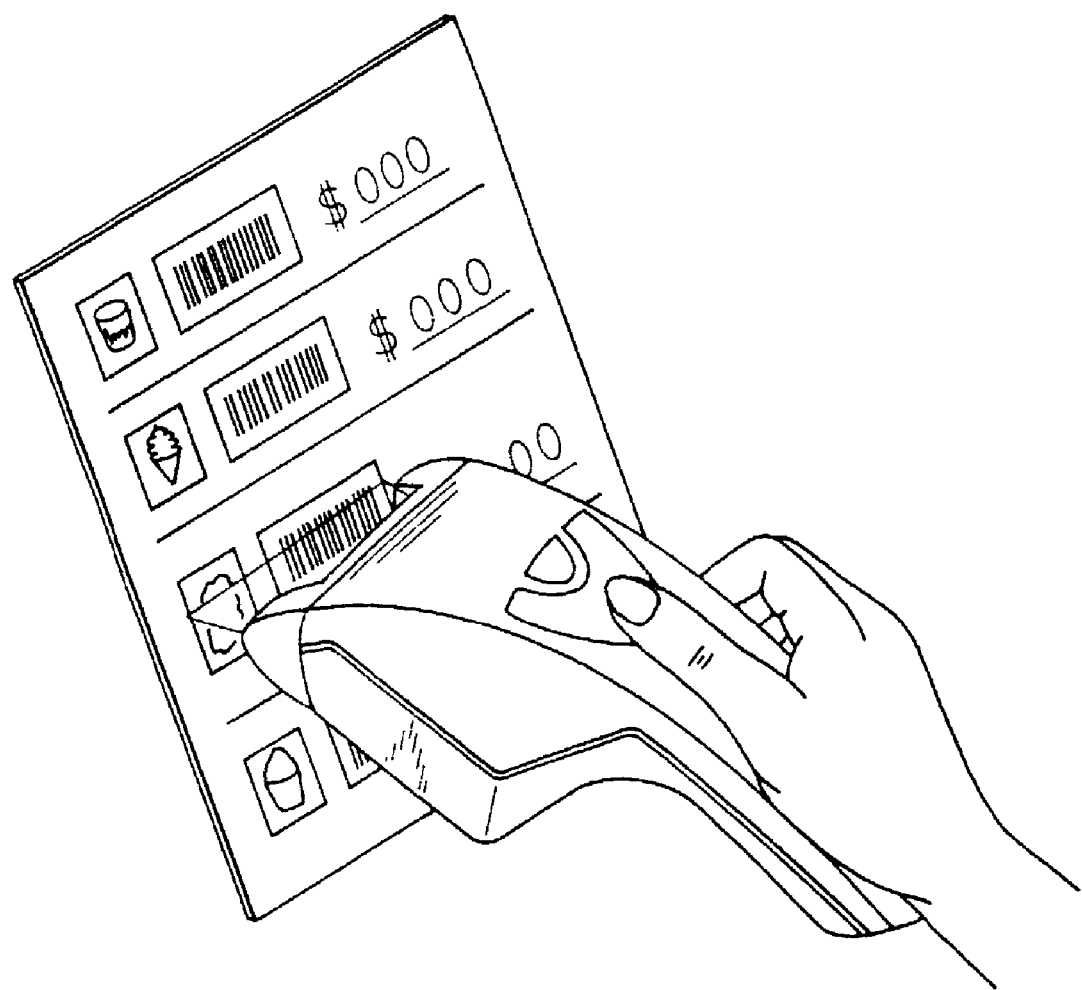
FIG. 44 is a view showing a state in which the mode selection switch is manipulated by a thumb.

FIG. 44 is a view showing a state in which the mode selection switch (function change switch) is manipulated by a thumb. In this case, the grip is held by all the fingers except the thumb and the root of the thumb.

When a thumb is used to manipulate the mode selection switch, the thumb manipulates the root of the mode selection switch mainly.

As mentioned above, the position of the finger varies depending on whether an index finger is used to manipulate the mode selection switch or a thumb is used thereto. Since the mode selection switch is made long, the switch can be used for switching by an index finger or by a thumb. Since the mode selection switch is shaped like a letter V, the switch can be pressed reliably in whatever manner it is manipulated.

Figure 45A:
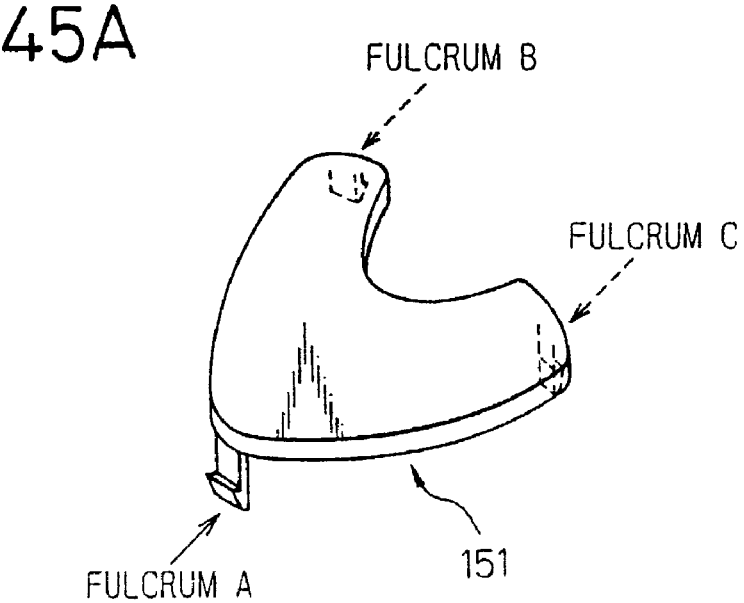
FIGS. 45A and 45B are views showing a switch plate and a switch.
Figure 45B:
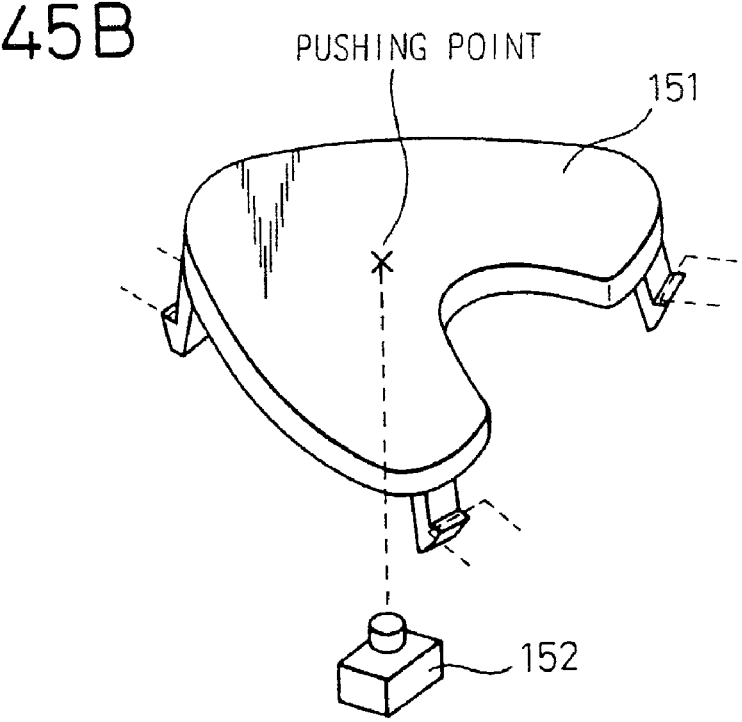

FIGS. 45A and 45B are views showing a V-shaped switch plate. The switch plate shown in FIGS. 45A and 45B is supported at three points. Three fulcrums; fulcrums A, B, and C are set at the apices of the switch plate. The apices serving as the fulcrums are inserted into openings, which are not shown, formed in the back side of the reader, and then supported by juts in the openings. A claw is formed at the tip of each apex serving as a fulcrum. The claws prevent floating of each apex serving as a fulcrum.

A switch is incorporated in an area of the reader body coincident with the center of the switch plate. When the switch plate is manipulated, the switch is depressed. Whichever position of the switch plate is manipulated, the depressing section of the switch incorporated in the reader body can be depressed. Unlike a structure in which a switch lies at only one point, even a person having small hands will find it easy to manipulate the switch. The switch plate is constrained to go slightly upward by means of a spring or the like within the switch.

Figure 46A:
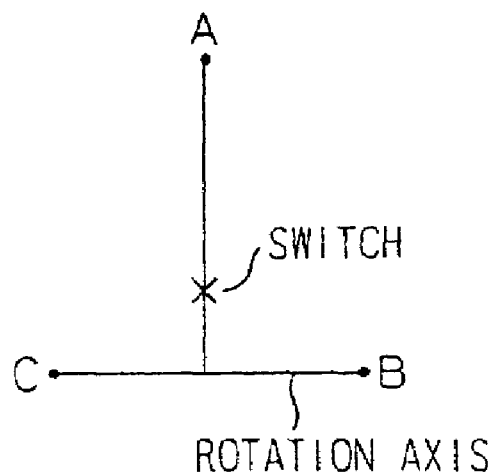
FIGS. 46A and 46B are digrams showing a pressed position of the switch plate and fulcrums.
Figure 46B:
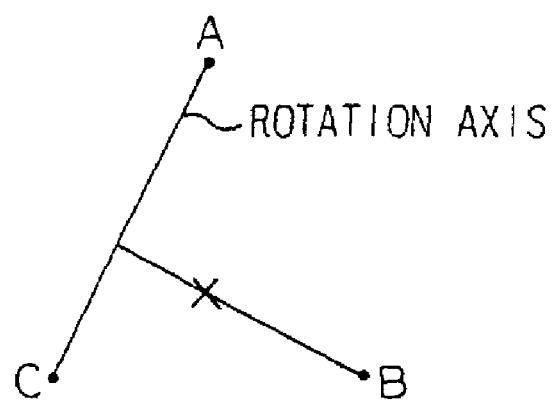

FIGS. 46A and 46B are diagrams for explaining the operation of the switch plate. Herein, letters A, B, and C denote fulcrums shown in FIGS. 45A and 45B. The outline of the switch plate is not shown.

FIG. 46A shows a state in which a portion of the switch plate in the vicinity of fulcrum A is manipulated, and FIG. 46B shows a state in which a portion of the switch plate in the vicinity of fulcrum B is manipulated. When the portion of the switch plate in the vicinity of fulcrum A is manipulated, the apices serving as fulcrums B and C are fixed. A straight line linking the apices of fulcrums B and C acts as a pivot of the switching plate. When the portion of the switch plate in the vicinity of fulcrum A is manipulated, the switch plate is pressed down with the line linking the apices of fulcrums B and C as a pivot. Thus, the switch is depressed.

Likewise, when the portion of the switch plate in the vicinity of fulcrum B is manipulated, the apices of fulcrums A and C are fixed. The straight like linking the apices of fulcrums A and C acts as a pivot of the switch plate. The switch plate is pressed down, and the switch is thus depressed.

As mentioned above, since the switch plate is attached, whichever portion of the switch plate is manipulated, the switch can be depressed. The mode selection switch can be manipulated in a stable manner irrespective of the size of a user's hand. The number of fulcrums need not be three. However, when three fulcrums are set, a pivot (rotation axis) relative to a pressed point can be determined uniquely. For actuating the switch most reliably, the structure of the switch plate having three fulcrums is most effective.

The switch plate is attached to the reader so that it will not come out of the back side of the reader. If the switch plate jutted out of the back side of the reader, there would arise a possibility that when the reader is placed on a tabletop with the back side thereof facing down, the read mode of the reader is changed to one not intended by a user.

Figure 47:
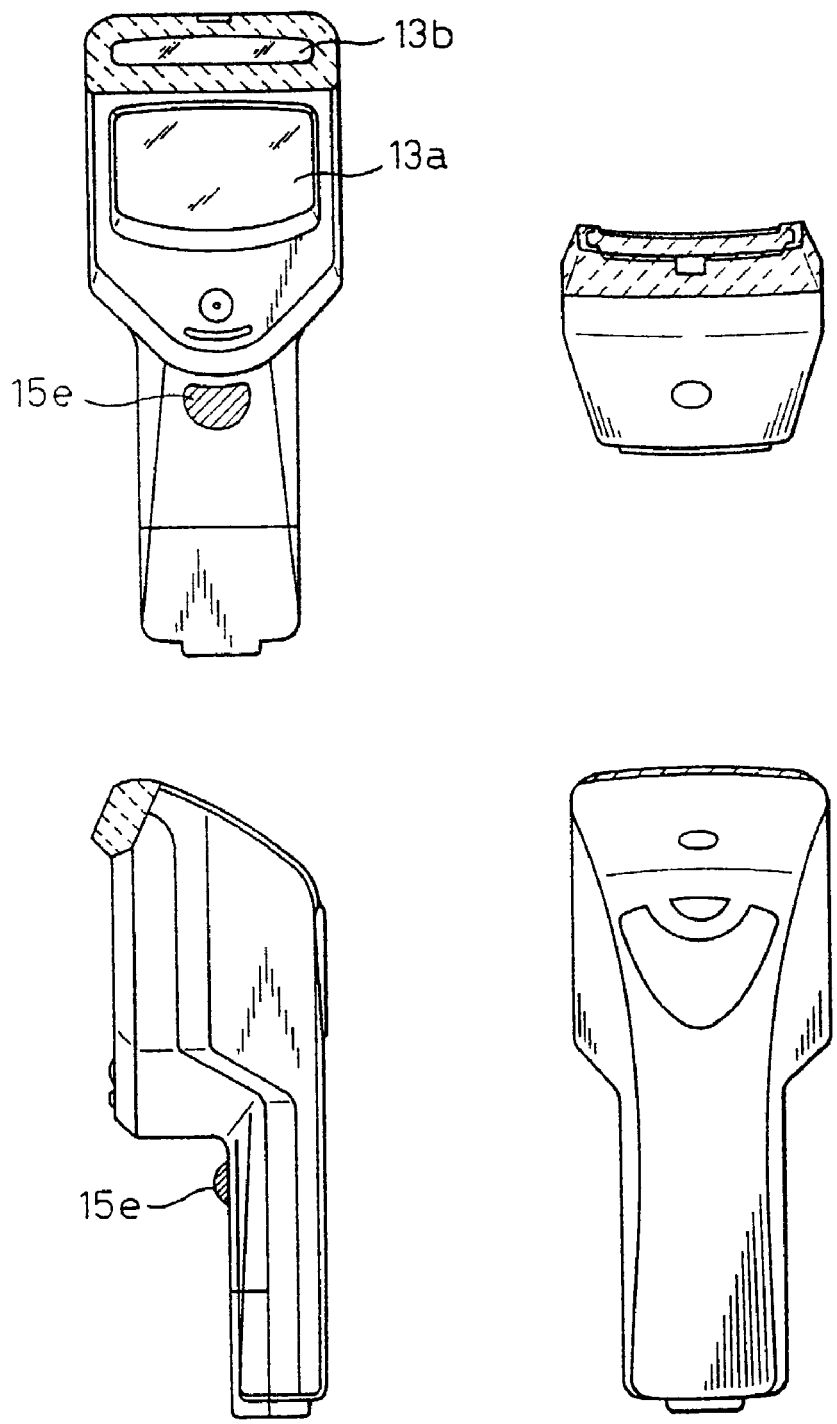
FIG. 47 is a view showing a reader having a switch on the front side of a grip thereof.

FIG. 47 is a view showing another function change switch. In the case shown in FIG. 47, a change switch 15e for front-side manipulation is located in the vicinity of the root of the grip. The position of the switch is a position at which an index finger lies when the grip is held by a hand. The front-side change switch can therefore be manipulated by the index finger. In particular, the shape of the switch makes it possible to form the switch at almost the same position as the trigger switch 15a of the gun reader shown in FIG. 3. The change switch can be manipulated easily.

In the case shown in FIG. 47, the mode selection switch on the back side of the read may be omitted. However, the mode selection switch may of course be formed on each of the back side and front side of the reader.

FIG. 48 is a view showing yet another example of a change switch. In the case shown in FIG. 48, side switches are formed on the lateral sides of the head of the reader. The side switches are a side switch 15f located on the left-hand side of the reader and a side switch 15g located on the right-hand side thereof.

When the grip is held by a hand, the thumb and index finger can be rested on the side switches. When the grip is held by a right hand, the thumb is used to manipulate the side switch 15f and the index finger is used to manipulate the side switch 15g. The grip is held by the remaining fingers. When the grip is held by a left hand, the thumb and index finger are used to manipulate the opposite switches. Thus, in consideration of the uses of both the right and left hands for manipulation of a switch, the side switches are located on the lateral sides of the reader respectively. Owing to this layout, the two switches can be manipulated simultaneously with ease. Needless to say, only one of the side switches may be manipulated.

In the case of the reader shown in FIG. 48, since the side switches are located on both the lateral sides of the reader. In an effort to make the most of this structure, the functions of the side switches may be varied depending on whether one of the side switches is manipulated or both thereof are manipulated simultaneously.

When one of the side switches is manipulated, the side switch acts as a mode selection switch. In this case, it does not count whichever of the side switches is manipulated.

When both the side switches are manipulated simultaneously, the side switches do not act as mode selection switches but are assigned completely different functions.

For example, when one of the right and left side switches is manipulated (it does not count whichever of the side switches is manipulated), the read mode is changed from one to the other. When the right and left side switches are manipulated simultaneously, special reading, for example, repetitive input of a product to be read is executed.

The control unit of the reader always monitors the manipulation situations of the right and left side switches, judges whether both the right and left side switches are manipulated simultaneously or one of the side switches is manipulated, and selects processing to be executed on the basis of the result of the judgment.

In case a plurality of bar codes representing the same kind of contents are read, for example, when a plurality of articles are registered at a time, it is time-consuming to read the bar codes one by one. A reader having a repetitive input function is known.

For using the repetitive input function, first, a bar code is read. In principle, a repeat input key is manipulated by the number of articles of which bar codes must be input. The repeat input key acts as a counter key. The frequency of manipulating the key is counted by the reader, whereby it is judged how many articles are of the same product.

Using the foregoing repetitive input function, bar codes borne by articles of the same product need not be read one by one.

In this embodiment, two kinds of functions can be assigned to the side switches by distinguishing simultaneous manipulation of two side switches from manipulation of one of the side switches. That is to say, the functions of the side switches are varied depending on whether one of the side switches is manipulate or both thereof are manipulated simultaneously. Thus, the functions of switches such as the capabilities of the repeat input key and mode selection switch can be changed according to the number of the switches that have been manipulated. This leads to a reduction in number of switches or keys.

For executing reading according to a read mode, herein, read modes are changed by controlling lighting of the laser light source in such a manner that when scanning light is emitted through the first read window 13a, scanning light is not emitted through the second read window 13b, and that when scanning light is emitted through the second read window 13b, scanning light is not emitted through the first read window 13a. However, read mode change is not limited to this method.

Figure 49:
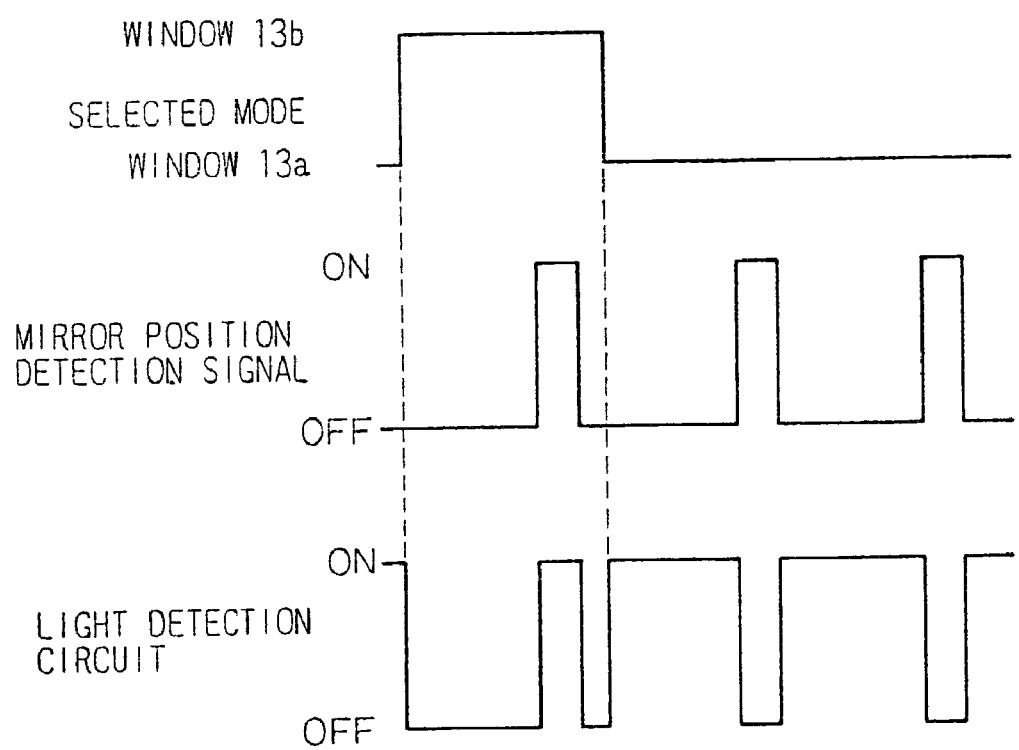
FIG. 49 is a timing chart concerning control of a light detection circuit according to the position of a floor mirror scanned by scanning light.

FIG. 49 is a diagram for explaining read mode change according to another method. FIG. 49 shows an output of the mode selection switch, a mirror position detection signal, and a light detection circuit control signal used to control the light detection circuit and sent from the control unit. Even in the case shown in FIG. 49, the internal components of the reader are identical to those shown in FIG. 38. Locating a scan position is carried out by means of the structure shown in FIGS. 36 and 37; that is, by counting the number of slits formed on the disk member.

The light detection circuit control signal is a signal used to control whether the light detection circuit should be actuated or halted. During a period during which the light detection circuit control signal remains on, the light detection circuit operates. During a period during which the light detection circuit control signal remains off, the light detection circuit does not operate.

In the case shown in FIG. 49, when the mode selection switch is used to select the window 13b; that is, the single-scanning mode, the control unit drives the light detection circuit control signal on for a period during which the mirror position detection signal remains on, and drives the light detection circuit control signal off for a period during which the mirror position detection signal remains off. When the single-scanning mode is selected, therefore, the operation of the light detection circuit is validated only for a period during which scanning light is being emitted through the second read window 13b, and invalidated for the other periods.

In single-scanning mode, therefore, even if scanning light is emitted through the first read window 13a, the light detection circuit does not receive light reflected from a bar code or the like. Even if a bar code other than a specific bar code that is an object of reading is scanned during the period, a reading operation is substantially invalidated. During the period during which scanning light is being emitted through the second read window 13b, the operation of the light detection circuit is valid. Bar-code reading is therefore enabled.

By contrast, in multi-scanning mode, the output of the mode selection switch is off. Based on this fact, the control unit drives the light detection circuit control signal on for a period during which the mirror position detection signal remains off, and thus validates the operation of the light detection circuit. For a period during which the mirror position detection signal remains on, the control unit drives the light detection circuit control signal off and thus invalidates the operation of the light detection circuit.

For a period during which scanning light is emitted through the first read window, therefore, the operation of the light detection circuit is validated and bar-code reading is enabled. For a period during which scanning light is being emitted through the second read window, the operation of the light detection circuit is invalidated. Although the scanning light is emitted through the second read window, the light detection circuit does not receive reflected light.

Figure 50:
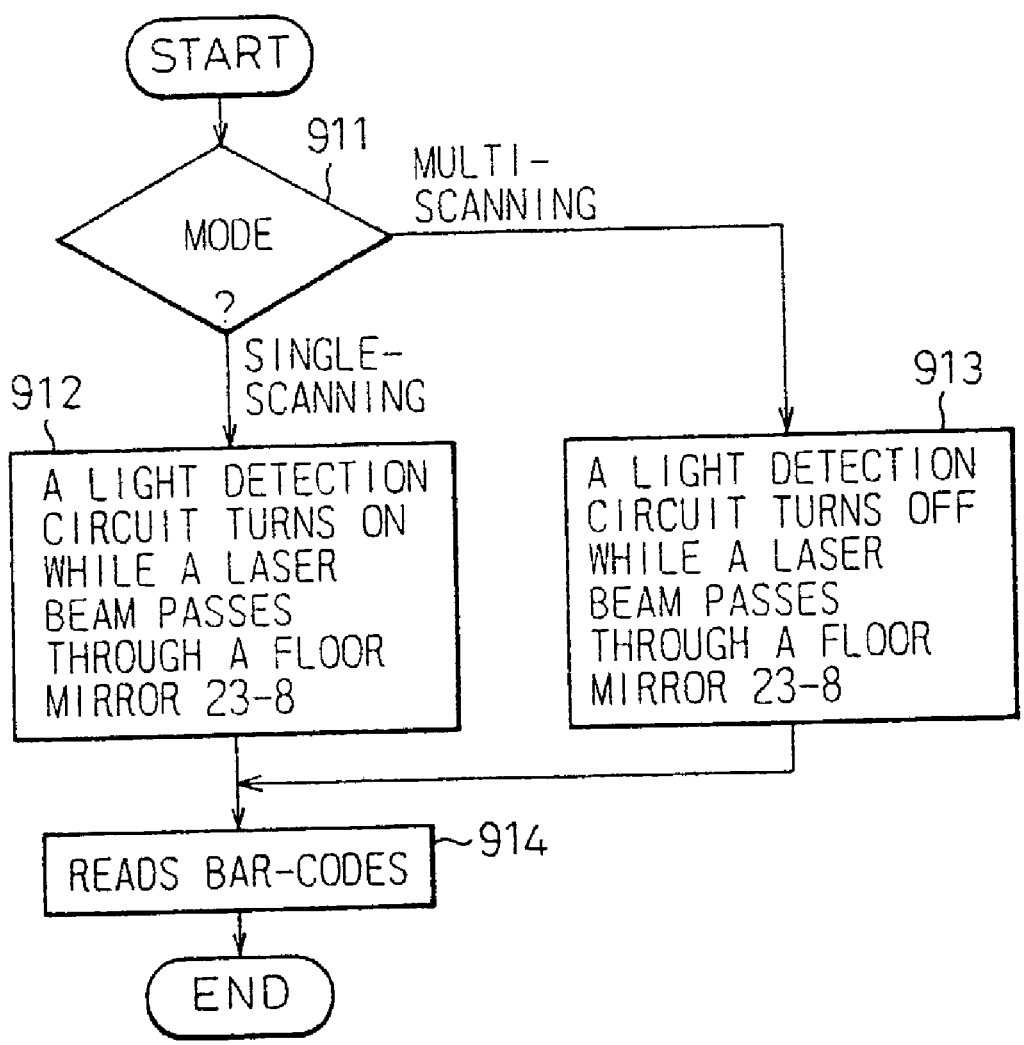
FIG. 50 is a flowchart describing a procedure of light detection circuit control.

FIG. 50 is a diagram describing the foregoing control in the form of a flowchart. The control unit first judges a designated read mode (step 911). When the single-scanning mode is selected, the light detection circuit is allowed to operated during a period during which the floor mirror 23-8 is being scanned. In contrast, when the multi-scanning mode is selected, the control unit does not allow the light detection circuit to operate during the period during which the floor mirror 23-8 is being scanned, but allows the light detection circuit to operate during a period during which any other floor mirror is being scanned (step 913).

As mentioned above, when the control operation described in FIGS. 49 and 50 is carried out, even if control is not given to operating the laser diode, a bar-code reading operation can be substantially invalidated for a period during which scanning light is emitted through a read window not associated with a read mode.

Changing validation of the operation of the light detection circuit into invalidation thereof or vice versa may be achieved by changing the operation of the light receiving device from one to the other or by invalidating the operation of a circuit for processing a signal output from the light receiving device. Incidentally, read data is decoded within the reader. Validation of a decoding operation may be changed into invalidation thereof or vice versa.

Figure 51:
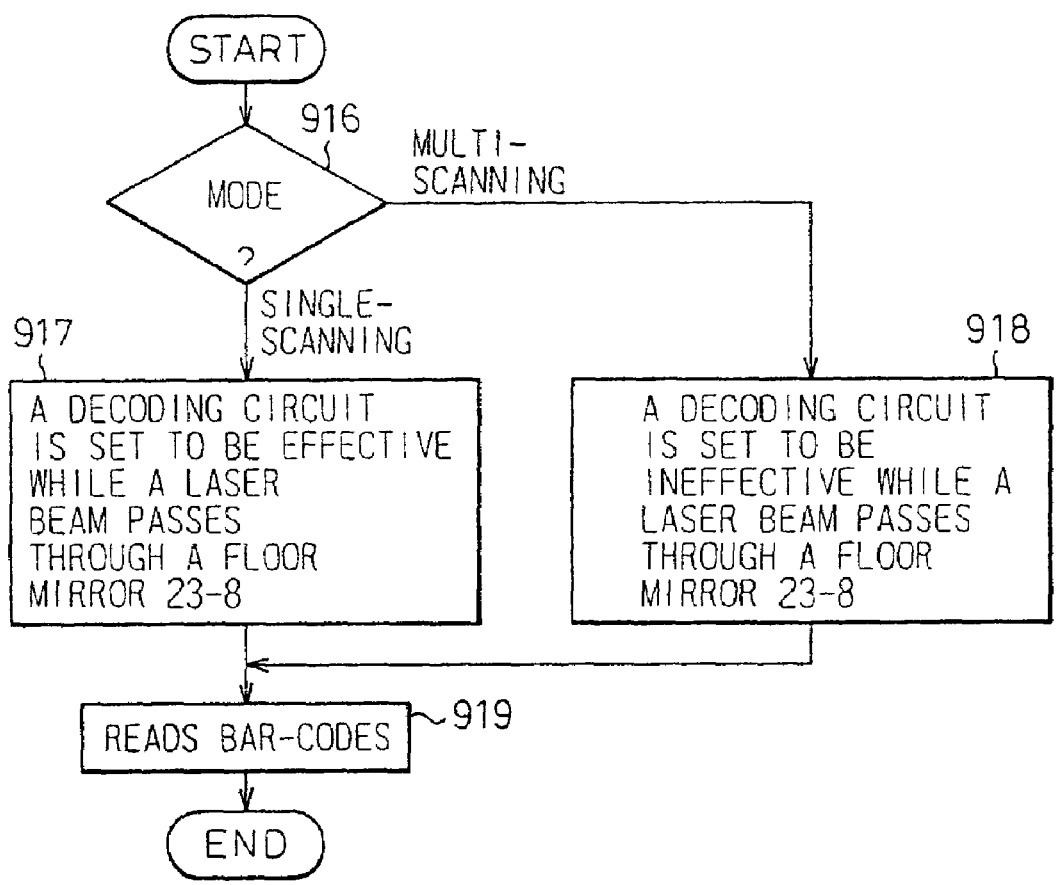
FIG. 51 is a flowchart describing a procedure of decoding circuit.

FIG. 51 is a flowchart describing controlling of the state of a decoding circuit according to a scanning situation. In the case shown in FIG. 51, when determining that the read mode is the single-scanning mode, the control unit allows the decoding circuit to operate during a period during which the floor mirror 23-8 is being scanned and to halt during any other period (step 917).

By contrast, when determining that the multi-scanning mode has been selected, the control unit invalidates the operation of the decoding circuit for the period during which the floor mirror 23-8 is being scanned, and validates it during any other period (step 918).

Alternatively, changing validation of the light detection circuit or the like into invalidation thereof or vice versa and controlling lighting or putting out of the laser diode may be effected in combination. This makes it possible to prevent emission of scanning light through a window not associated with a read mode and to prevent extraneous light entering through a read window during the period from being detected by the light detection circuit. Consequently, a read mode change operation can be carried out more reliably.

Figure 52:
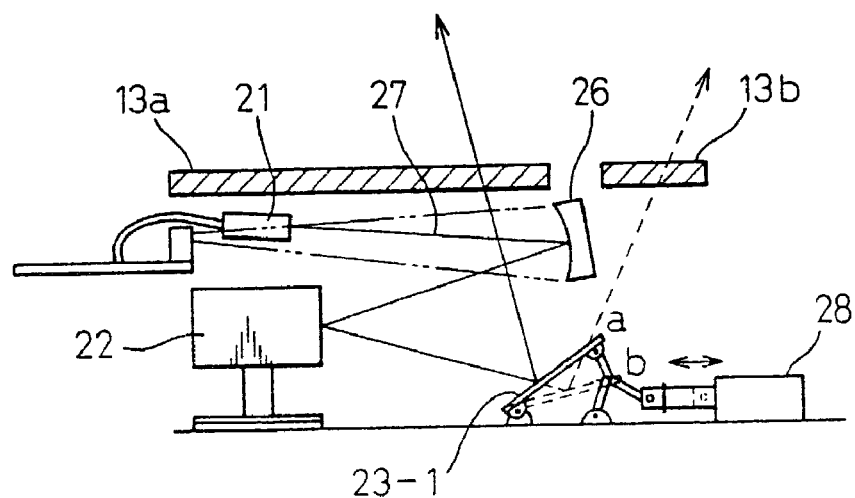
FIG. 52 is a side sectional view of a reader in which a floor mirror E1' is movable.

FIG. 52 is a diagram showing another arrangement for executing read mode change. In the case shown in FIG. 52, a mirror corresponding to the floor mirror 23-8 is not included. The angle of one floor mirror 23-1' (corresponding to the floor mirror 23-1 in FIG. 7) is made variable depending on the operation of a solenoid 28.

The solenoid 28 is movable right and left in FIG. 52, and has an arm at the top thereof. The arm is provided with the floor mirror 23-1'. The angle of the floor mirror 23-1' is therefore varied with the right or left movement of the solenoid 28.

When the floor mirror 23-1' lies at a first position (indicated with solid lines in FIG. 52), scanning light reflected from the floor mirror 23-1' is emitted through the first read window 13a. By contrast, when the floor mirror 23-1' lies at a second position (indicated with dashed lines in FIG. 52), scanning light reflected from the floor mirror 23-1' is emitted through the second read window 13b.

When the reader is used as a stationary or gun reader, the floor mirror is set at the first position. When the reader is used as a touch reader, the floor mirror 23-1' is set at the second position. Controlling positioning of the floor mirror 23-1' is performed with the manipulation of the mode selection switch 13b.

When the output of the mode selection switch is on; that is, when the single-scanning mode is selected, the control unit actuates the solenoid 28 so as to move the floor mirror 23-1' to the second position. When the output of the mode selection switch is off; that is, when the multi-scanning mode is selected, the control unit actuates the solenoid accordingly so as to move the floor mirror 23-1' to the first position.

Owing to the foregoing arrangement, in multi-scanning mode, scanning light is not emitted through the second read window 13b. However, in single-scanning mode, scanning light is emitted through now only the second read window 13b but also the first read window 13a. When the single-scanning mode is selected, therefore, it is required to invalidate a bar-code reading operation for a period during which scanning light is being emitted through the first read window.

Figure 53:
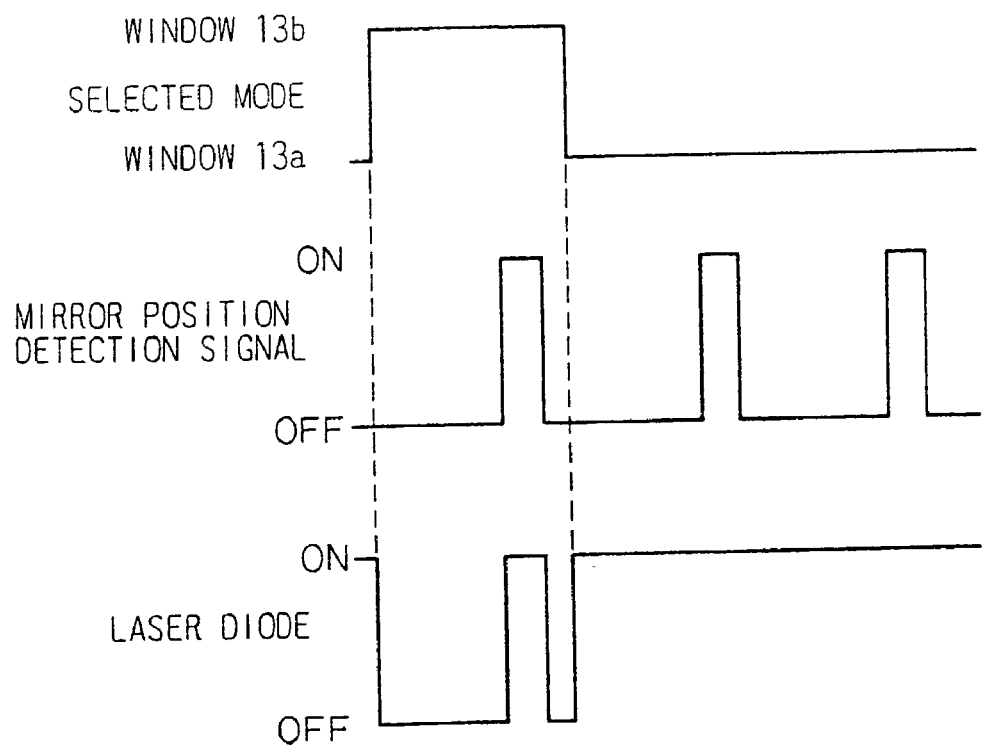
FIG. 53 is a diagram concerning light source control performed by the reader shown in FIG. 52.

FIG. 53 is a diagram showing the waveforms of signals used for the above control. In FIG. 53, an output of the mode selection switch is identical to the one shown in FIG. 41 or 49. A mirror position detection signal remains on during a period during which light reflected from a reflection surface of the polygon mirror is scanning the floor mirror 23-1', and remains off during any other period during which any other floor mirror is being scanned. In this case, the period during which the mirror position detection signal remains on may be limited to a period associated with any specific reflection surface or may be any of periods associated with a plurality of reflection surfaces. In the case shown in FIG. 53, the mirror position detection signal remains on only while light reflected from one specific reflection surface of the polygon mirror is scanning the floor mirror 23-1'.

A light source control signal is used to control lighting of the laser light source. When the signal is driven on, the laser light source is lit. When it is driven off, the laser light source is put out.

In the case shown in FIG. 53, when the multi-scanning mode is selected (the output of the mode selection switch is driven off), the laser light source is lit irrespective of the scan position of light reflected from the polygon mirror. In contrast, when the single-scanning mode is selected, the light source control signal is driven on for a period during which the mirror position detection signal remains on; that is, the floor mirror 23-1' is being scanned. The laser light source is thus lit. For any other period, the light source control signal is driven off, and thus the laser light source is put out.

Figure 54:
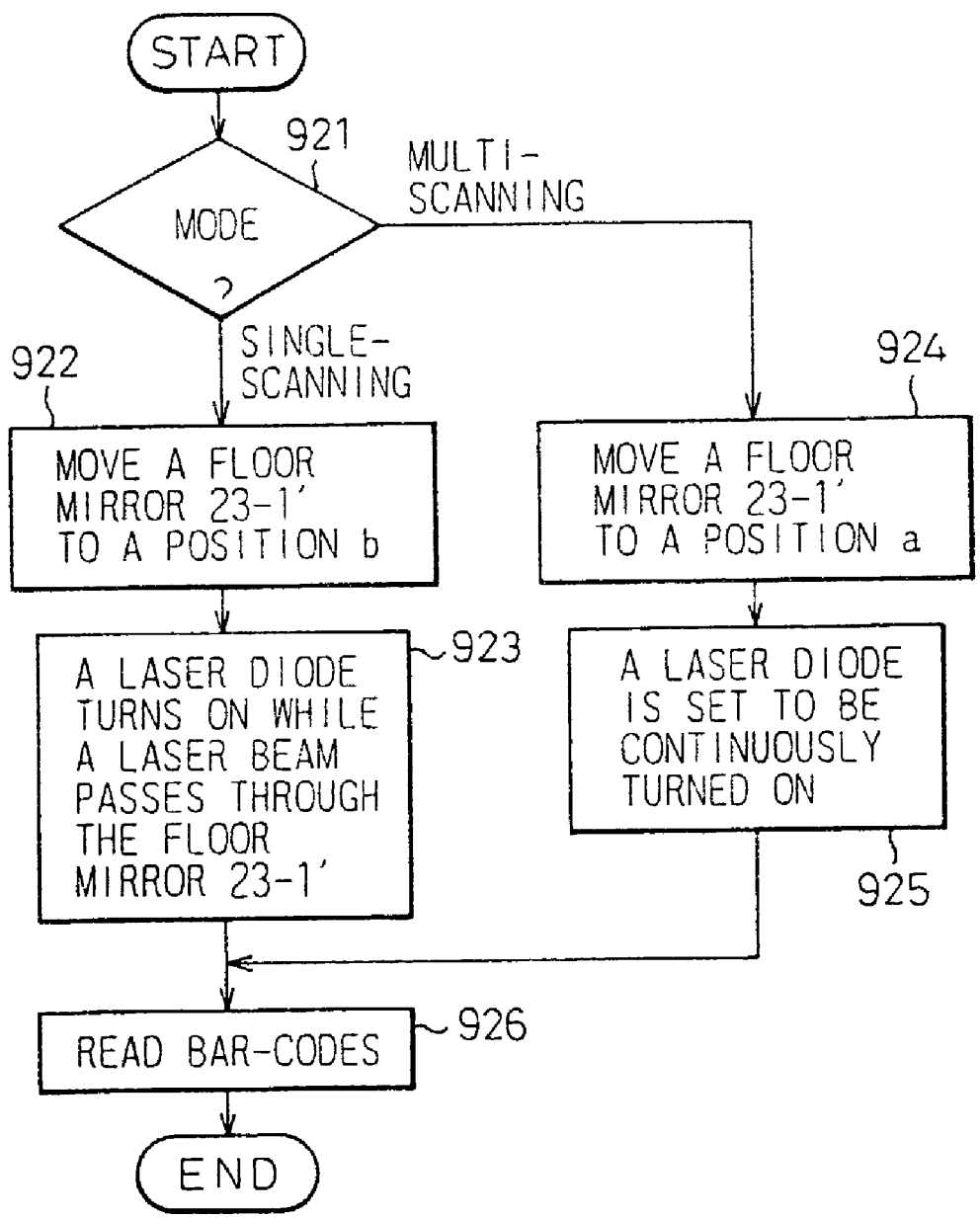
FIG. 54 is a flowchart describing a procedure of read mode change performed by the reader having the movable floor mirror.

FIG. 54 is a flowchart describing the foregoing control. When a designated read mode is the single-scanning mode, the control unit drives the solenoid so as to move the floor mirror 23-1' to position b (step 922). For only the period during which the floor mirror 23-1' is being scanned, is the laser light source lit (step 923).

By contrast, when the multi-scanning mode is selected, the control unit drives the solenoid so as to move the floor mirror 23-1' to position a (step 924). Thus, the laser light source is lit all the time (step 925).

As mentioned above, the arrangement shown in FIG. 52 is used to give the control described in FIGS. 53 and 54. In multi-scanning mode, therefore, scanning light is emitted only through the first read window 13a. In single-scanning mode, scanning light is emitted only through the second read window 13b. Only for a period during which scanning light is being emitted through a read window associated with a read mode, is a reading operation validated. Consequently, incorrect detection of noise or double reading can be prevented.

In the case shown in FIG. 52, operation of the light source is controlled. In the reader having the arrangement shown in FIG. 52, validation and invalidation of the light detection circuit or of decoding may be changed.

Figure 55:
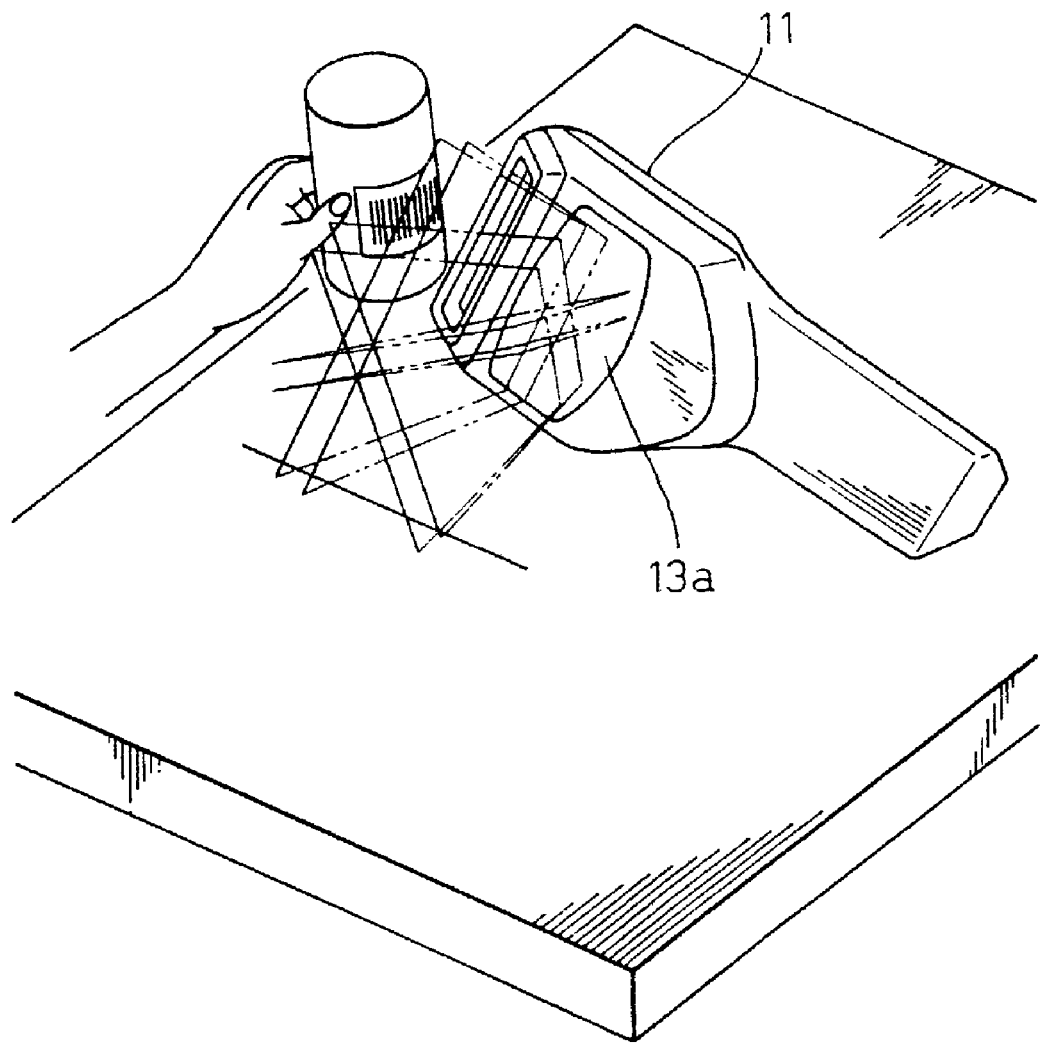
FIG. 55 is a view showing a reader laid on a tabletop.

FIG. 55 is a view showing a state in which the reader is placed directly on a tabletop (without the use of the stand). In FIG. 55, the reader is laid on the tabletop. As seen from the top view in FIG. 15, the lateral sides of the head of the reader are chamfered obliquely. When the reader is placed on a tabletop, the read window employed faces obliquely up by an angle corresponding to the angulation of the lateral sides of the reader. A bar-code read area is therefore located obliquely above the reader.

When the reader is placed on a tabletop, articles bearing bar codes that are objects of reading pass above the reader. The read window employed is therefore directed upward so that a read area will be located obliquely above the reader. Thus, the read area is set in the vicinity of the positions of passing articles. Thus, the maneuver for bar-code reading can be achieved easily.

By contrast, if the read window faces substantially horizontally, part of a scan range covered by scanning light would be intercepted by the tabletop. This poses a problem that the scan range becomes substantially narrow. Moreover, since bar codes must be passed a position very close to the tabletop, the maneuverability for reading deteriorates.

As mentioned above, when the reader is placed on a tabletop without the use of the stand or the like, the read window employed is directed obliquely upward so that scanning light will be emitted upward. Thus, the maneuverability for reading can be improved.

When the reader shown in FIG. 55 is used as a hand-held reader, similarly to when the laying stand shown in FIGS. 33A and 33B is used, the grip of the reader can be held readily. Hands need not be changed in order to grasp the reader. In the case of the reader shown in FIG. 55, especially, since the stand is unnecessary, both the capabilities of a stationary reader and hand-held reader can be realized using the one reader.

When the reader is placed on a tabletop like the reader shown in FIG. 55, the multi-scanning mode is executed in principle. When the reader is placed on a tabletop, one of the lateral sides of the reader is in contact with the tabletop. This nature of the reader is utilized in order to change read modes automatically.

FIG. 56 is a view showing a reader having mode detection sensors on the lateral sides thereof. As shown in FIG. 56, the mode detection sensors are placed one by one of the lateral sides of the reader. The mode detection sensors may be, for example, optical sensors for detecting a quantity of incident light.

Figure 57:
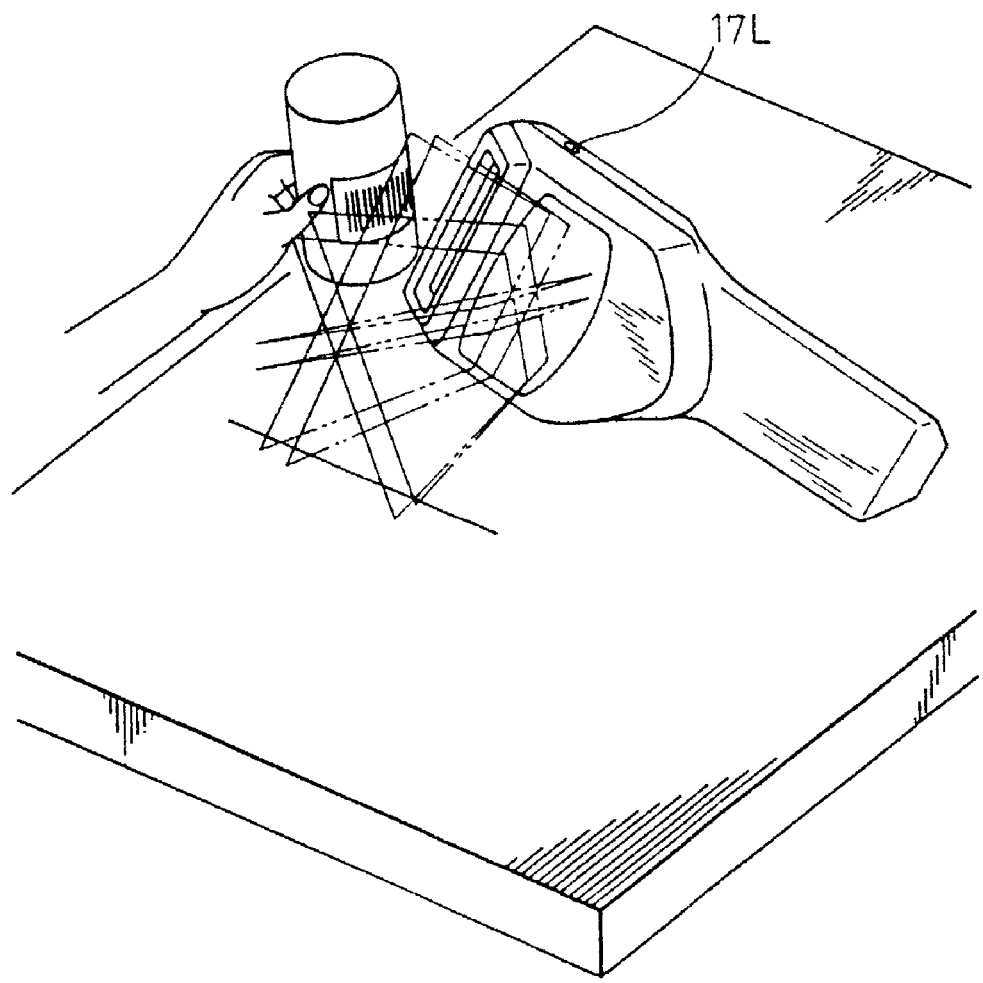
FIG. 57 is a view showing a state in which the reader having the mode detection sensors is laid on a tabletop.

FIG. 57 shows a state in which the reader having the mode detection sensors which is shown in FIG. 56 is placed on a tabletop. The reader is fundamentally identical to the one shown in FIG. 55 except the presence of the mode detection sensors. In the case of the reader shown in FIG. 57, the reader is placed on the tabletop so that the right-hand side (on the side of the mode detection sensor 17L) of the reader with respect to the front side of the reader will be the top side.

In the state shown in FIG. 57, extraneous light enters the mode detection sensor L. The quantity of light incident to the mode detection sensor 17L does not decrease. By contrast, the mode detection sensor 17R (not shown) is in contact with the tabletop. The quantity of light incident to the mode detection sensor 17R decreases compared with that incident to the mode detection sensor L. By utilizing the relationship between the state of the reader and the quantities of light incident to the mode detection sensors, the read mode is changed into a read mode suitable for the state of the reader on the basis of the quantities of light incident to the mode detection sensors.

Figure 58:
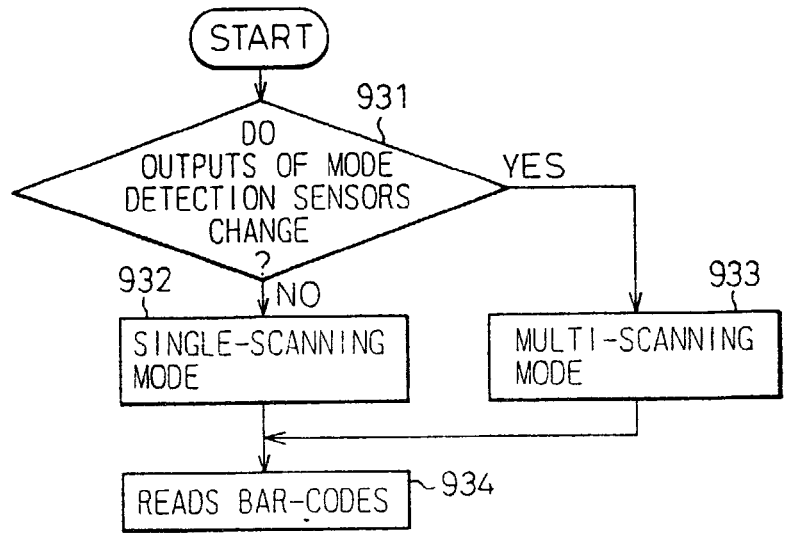
FIG. 58 is a flowchart describing a procedure of read mode change based on the mode detection sensors.

FIG. 58 is a flowchart describing control of read mode change using the mode detection sensors.

The control unit judges on the basis of the quantities of light incident to two mode detection sensors if the reader is placed on a tabletop (step 931). When it is judged that the reader has been placed on the tabletop (the quantity of light incident to one of the light detection sensors decreases), the reader is changed into the multi-scanning mode (step 933). When the quantities of light incident to the mode detection sensors remain unchanged, the control unit changes the reader into the single-scanning mode (step 932).

As mentioned above, read modes are changed automatically according to whether the reader is placed on a tabletop or it is not placed thereon (used as a hand-held reader). This obviates the necessity of forming the mode selection switch on the reader.

When bar-code reading is carried out with the mode selection switch held down, there is a possibility that a user may release the mode selection switch carelessly. In this case, read modes are changed, though a user does not intend it. In particular, when the switch is released in the course of the single-scanning mode that has been set in order to read a bar code on a bar-code menu, if the single-scanning mode is changed into the multi-scanning mode, there arises a fear that a bar code other than the bar code that is an object of reading may be read. Since the incorrectly-read bar code is proper data, the reader recognizes that a correct bar code has been read, and reports the result to the user. When the user remains unaware of the fact that read modes have been changed, if the user continues processing, incorrectly-input data is finalized as input data.

However, owing to the operation of the mode detection sensors, since read modes are automatically changed according to the placed state of the reader, it can be prevented that a read mode is changed into another read mode that is not intended by a user. Consequently, incorrect input of data can be reduced to the greatest extent.

When the reader is not placed on a tabletop, a read mode may be either the multi-scanning mode or single-scanning mode. A read mode desired by a user may be selected. For example, even when the reader is used as a hand-held reader, a suitable read mode is varied depending on whether the reader is used as a touch reader or a gun reader. When the aforesaid mode selection switch is included in the reader having the mode detection sensors, if the reader is used as a hand-held reader, read modes can be changed using the mode selection switch.

Figure 59:
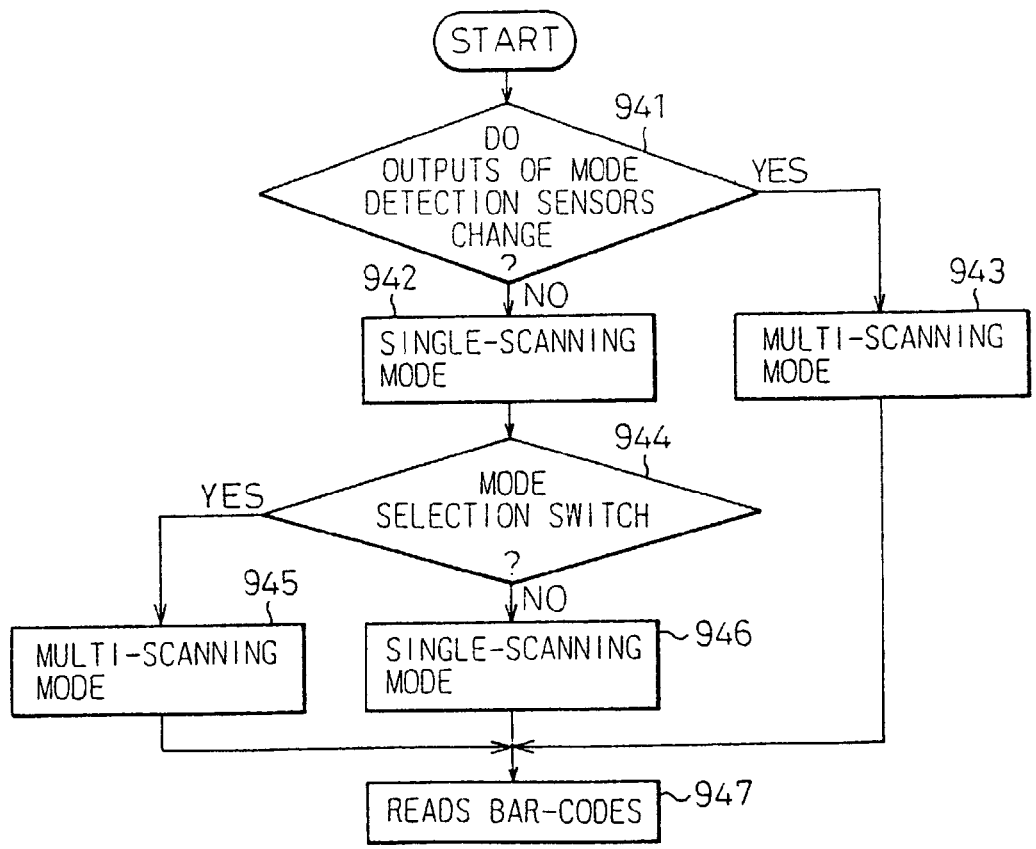
FIG. 59 is a flowchart showing a procedure of read mode change in which the mode selection switch and mode detection sensors are used in combination.

FIG. 59 is a flowchart describing an example of control of read mode change to be employed in the foregoing situation. When the control unit detects that the quantities of light incident to the mode detection sensors remain unchanged, it sets the read mode to the single-scanning mode for hand-held reading (step 942). Thereafter, the control unit monitors if the mode selection switch has been manipulated (step 944). When the mode selection switch is not manipulated, the single-scanning mode is retained (step 946). By contrast, when a user intends to use the reader as a gun reader, if it is detected that the mode selection switch has been manipulated, the control unit changes the read mode into the multi-scanning mode (step 945). Bar-code reading is then executed.

FIG. 60 shows a variant of the reader shown in FIG. 56. The reader shown in FIG. 60 has detection switches, which may be microswitches, in place of the optical mode detection sensors. When the reader shown in FIG. 60 is placed on a tabletop as shown in FIG. 57, the detection switch on the side of the reader in contact with the tabletop is pressed by the tabletop.

Figure 61:
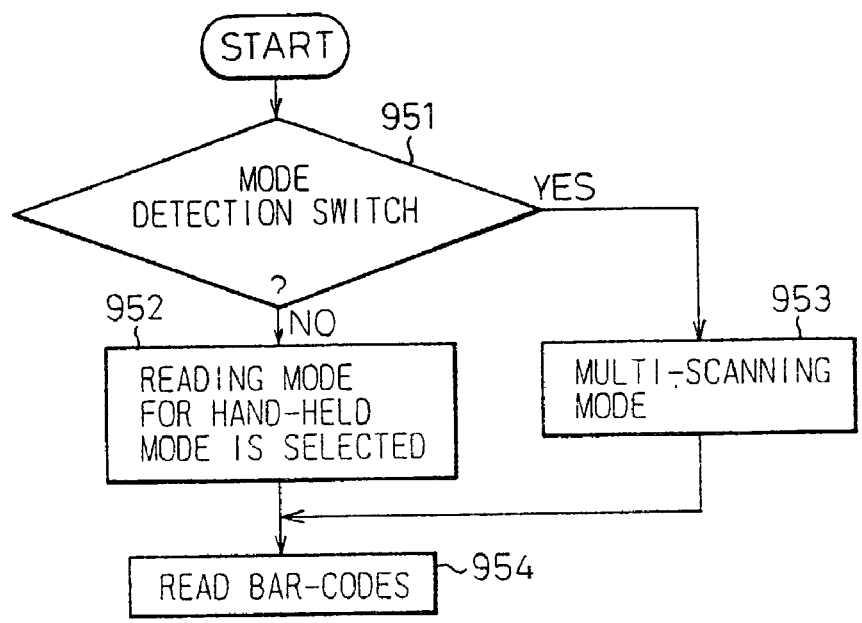
FIG. 61 is a flowchart describing a procedure of read mode change using the mode detection switches.

FIG. 61 is a flowchart describing control of read mode selection to be performed in the reader shown in FIG. 60.

The control unit monitors if the mode detection switches have been depressed (step 951). When it is judged that either of the detection switches has been depressed and that the reader has been placed on a tabletop, the read mode is changed into the multi-scanning mode (step 953).

When is has not been detected that either of the detection switches has been detected, the read mode may be set to a read mode desired by a user (for example, the multi-scanning mode is retained) in the same manner as that in the reader shown in FIG. 51). When the multi-scanning mode is retained, it can be changed into the single-scanning mode by, for example, manipulating the mode selection switch.

Alternatively, a microswitch may be formed by the second read window 13b as described below. When the second read window 13b is brought into contact with a menu sheet or the like, the microswitch is turned on in order to select the single-scanning mode.

Figure 62:
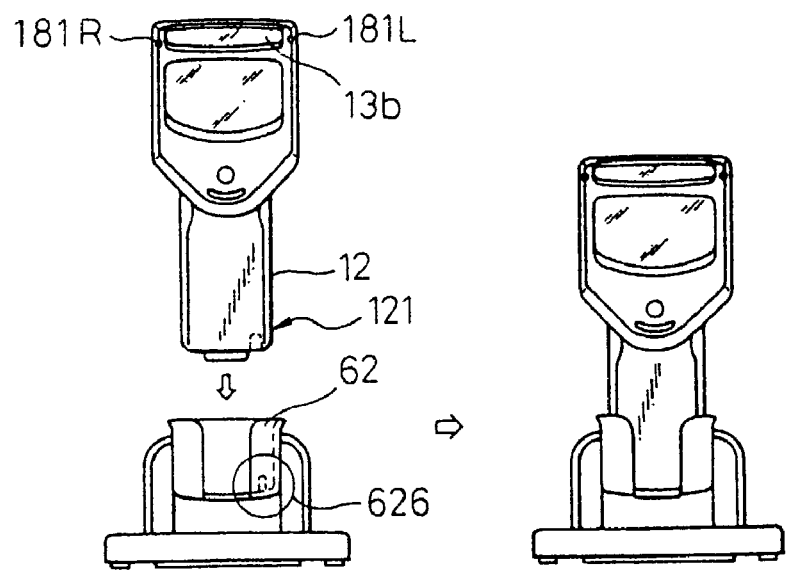
FIG. 62 is a view showing a reader of which stand has a detection jut on the base thereof and which has a detector in the grip thereof.
Figure 63:
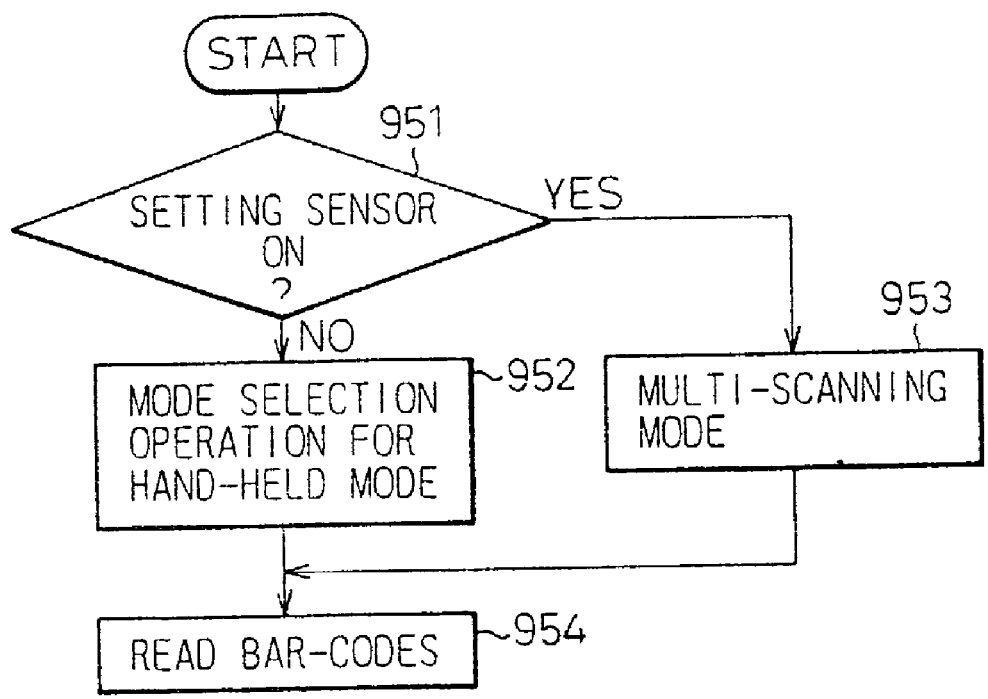
FIG. 63 is a flowchart describing a procedure of read mode change performed by the reader shown in FIG. 62.

FIG. 62 is a view for explaining a mechanism for changing the read mode into the multi-scanning mode when the reader is erected on the stand. FIG. 63 is a flowchart describing control of read mode selection to be performed in the reader shown in FIG. 62.

A detector (setting sensor) 121 that is a microswitch is placed on the base of the reader. A detection jut is formed on the base of the holder section of the stand. The position of the detection jut coincides with the position of the detector inside the reader when the reader is mounted on the stand.

When the reader is mounted on the stand, the detector in the reader is pressed by the detection jut. The control unit of the reader monitors the state of the detector 121 (step 951). When detecting that the detector has been pressed, the control unit judges that the reader has been mounted on the stand and changes the read mode into the multi-scanning mode (step 952).

When the detector has not been pressed, it is thought that the reader is used as a hand-held reader. In this case, the read mode may be set to the single-scanning mode or multi-scanning mode. Whichever of the modes is selected depends on in which form a user uses the hand-held reader. A read mode is set accordingly.

In case the reader is used as a gun reader frequently, although the reader is used as a hand-held reader, the read mode should be set to the multi-scanning mode. Changing into the single-scanning mode should be performed with the manipulation of the mode selection switch.

On the contrary, in case the reader is used as a touch reader more frequently, since the reader is used as a hand-held reader, the read mode should be set to the single-scanning mode. For using the reader as a gun reader, the mode selection switch is manipulated. In this case, unlike the aforesaid system design in which the read mode is changed into the single-scanning mode with the manipulation of the mode selection switch, the control unit changes the read mode from the single-scanning mode to the multi-scanning mode. When the mode selection switch is manipulated, the control unit changes the read mode into the multi-scanning mode. When the mode selection switch is not manipulated (the reader is used as a hand-held reader), the single-scanning mode is set.

In a state in which the reader is set to the single-scanning mode, for reading a bar code on a menu sheet or the like, all bar codes located close to the second read window 13b are read. This poses a problem that when the second read window 13b approaches an intended bar code, another bar code located close by may be read. For preventing occurrence of such a problem, as shown in FIG. 62, microswitches (window switches) 181R and 181L are arranged by both edges of the second read window 13b so that when the second read window 13b is used to read a bar code on a menu sheet or the like, the switches 181R and 181L will be turned on.

FIG. 64 is a flowchart describing control of read mode selection to be performed when the foregoing window switches are arranged.

If it is judged at step 961 that the single-scanning mode has been designated, the laser diode is turned off (step 962). It is then judged if the window switches 181L and 181R are on (step 963). If the switches are on, the laser diode is turned on only when the laser beam scans the floor mirror 23-8 (step 964). A bar code is then read (step 965).

Figure 65A:
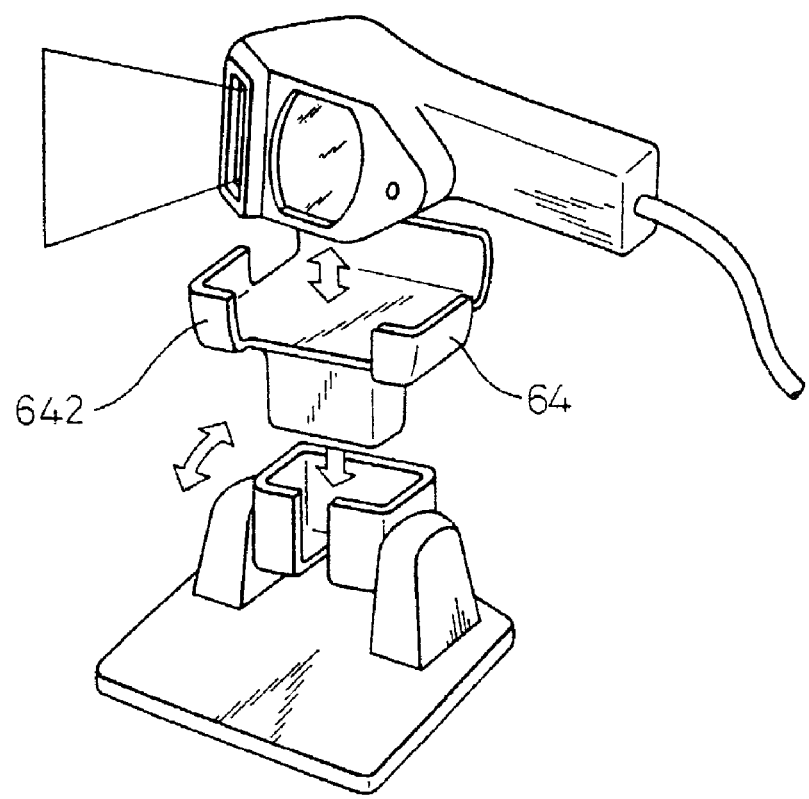
FIGS. 65A and 65B are views showing a read mode change mark inscribed on a laying stand.
Figure 65B:
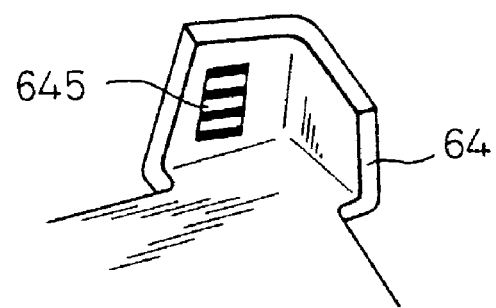
Figure 66:
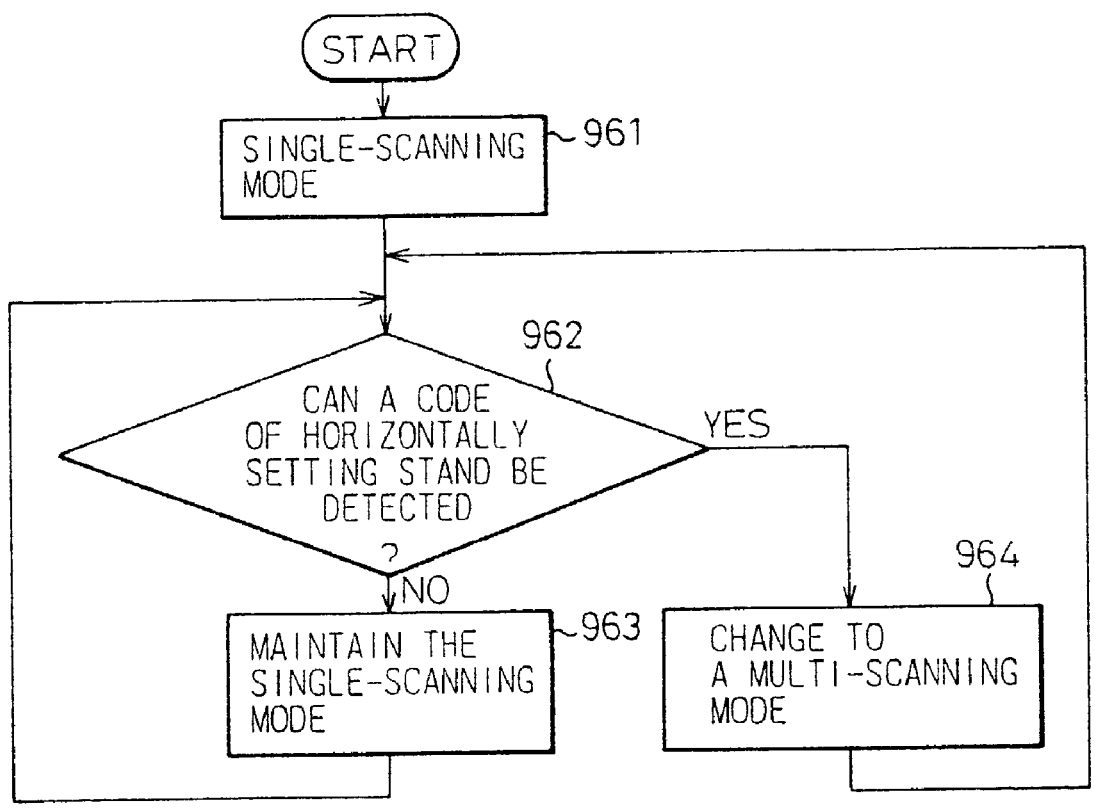
FIG. 66 is a flowchart describing a procedure of read mode change based on the mark.

FIGS. 65A and 65B are views for explaining an arrangement for changing read modes when the reader is laid on the laying stand. FIG. 66 is a flowchart for describing read mode selection control to be given in the reader shown in FIGS. 65A and 65B.

In FIGS. 65A and 65B, an optical mark such as a bar code for instructing read mode change is formed on the inner surface of a wall 642 of all the walls of a laying stand 64 which is opposed to the second read window.

When the reader is used as a hand-held reader, if it is presumably used as a touch reader, it is set to the single-scanning mode. In this state, the operation of the reader is substantially invalidated for a period during which scanning light is emitted through the first read window. Bar-code reading is enabled only for a period during which scanning light is emitted through the second rear window.

In this state, when the reader is mounted on the laying stand, scanning light emitted through the second read window 13*b* scans a bar code 645 formed inside the stand. Thus, the bar code for instructing read mode change is read.

The control unit of the reader monitors if the bar code has been detected by light emitted through the second read window. When identifying the read bar code, the control unit judges that the read bar code instructs read mode change (step 962). The control unit then changes the read mode from the single-scanning mode to the multi-scanning mode (step 964). Control is thus given so that bar-code reading will be valid even during the period during which scanning light is emitted through the first read window 13*a*.

When the bar code on the laying stand is not detected, the control unit retains the single-scanning mode as the read mode (step 963). Even after the read mode is changed into the multi-scanning mode, bar-code reading using scanning light emitted through the second read window is still valid. In the state in which the reader is mounted on the laying stand, scanning light emitted through the second read window continues scanning the bar code for instructing read mode change which is formed inside the stand.

When the reader is dismounted from the laying stand, the bar code for instructing read mode change which is formed inside the stand is not longer detected. Based on this fact, the control unit changes the read mode from the multi-scanning mode to the single-scanning mode.

Thus, read modes can be changed automatically according to whether the reader is mounted on or dismounted from the laying stand. For changing the read mode into the multi-scanning mode despite the use of the reader as a hand-held reader, for example, the mode selection switch is manipulated.

Figure 67:
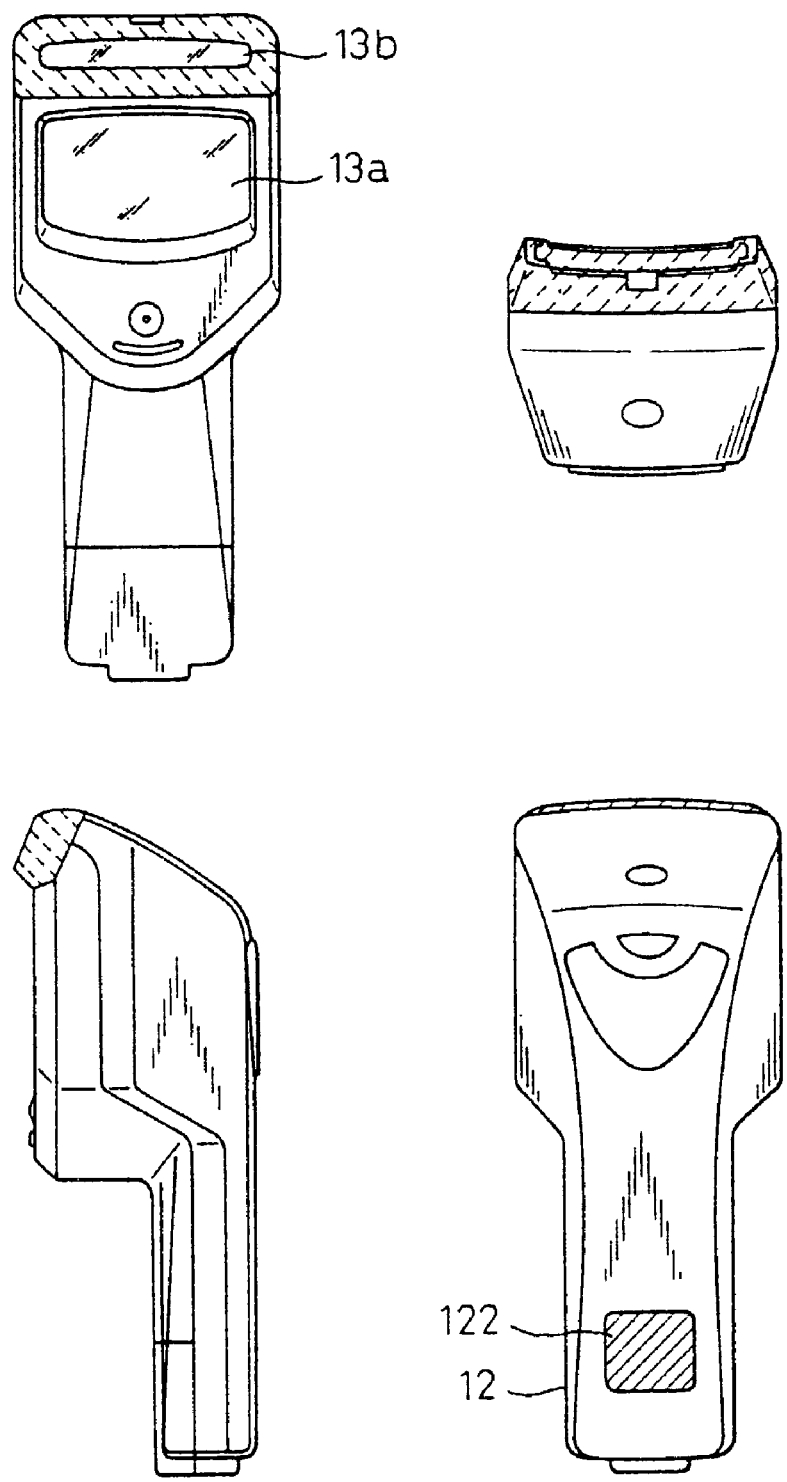
FIG. 67 is a view showing a reader having a grip sensor.

FIG. 67 is a view for explaining another mechanism for mode change. In FIG. 67, a grip sensor 122 is formed on the back side of the grip. When a user holds the grip 12, the fact is detected by the grip sensor 122. The result of the detection is reported to the control unit. For example, an electrostatic sensor is used as the grip sensor 122. When a person holds the grip, since the electrostatic capacity of the grip sensor varies, read modes are changed. Even when the grip sensor 122 comes into contact with the holder section of the stand, since the electrostatic capacity of the grip sensor does not vary, read modes are not changed.

Figure 68:
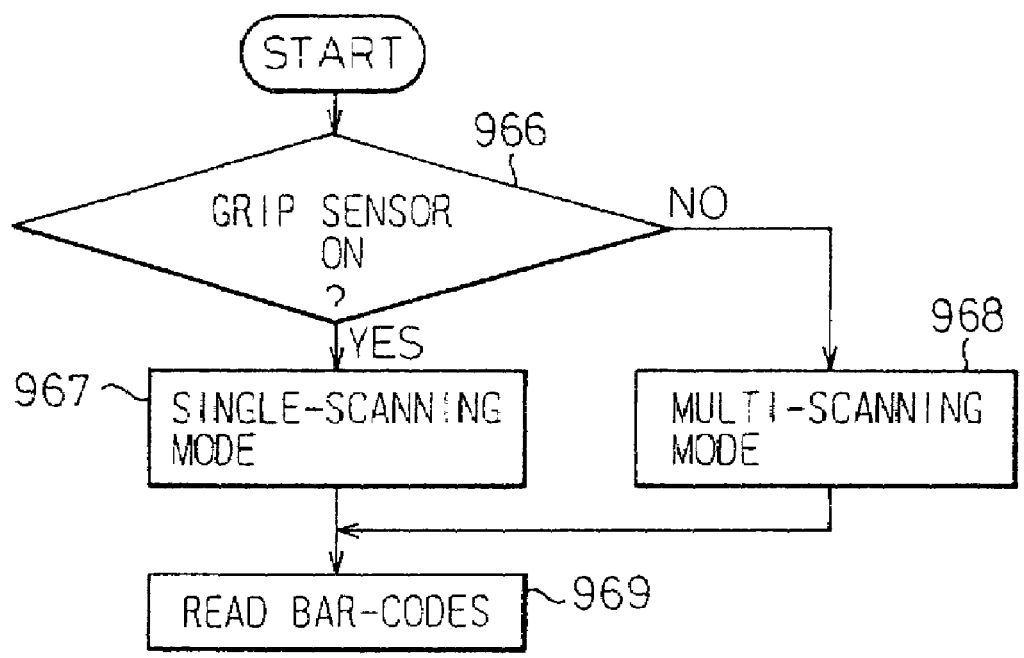
FIG. 68 is a flowchart describing a procedure of read mode change based on the grip sensor.

FIG. 68 is a flowchart describing read mode selection control to be given in the reader shown in FIG. 67.

When it is detected owing to the grip sensor 122 that the grip 12 has been held (step 966), the control unit changes read modes. In this case, the reader is thought to be used as a hand-held reader. The control unit therefore changes the read mode into the single-scanning mode on the basis of the result of the detection (step 967).

The position of the grip sensor 122 is not limited to the back side of the grip. However, since it is the back side of the grip where holding can be checked most reliably, it is most effective to form the grip sensor at the position.

Most preferably, the aforesaid switches or sensors used to change read modes should be formed at positions not interfering with mounting of the reader on the stand. As for the switches or sensors directly manipulated by a user, they should be formed at positions ensuring easy manipulation for the user.

Figure 69:
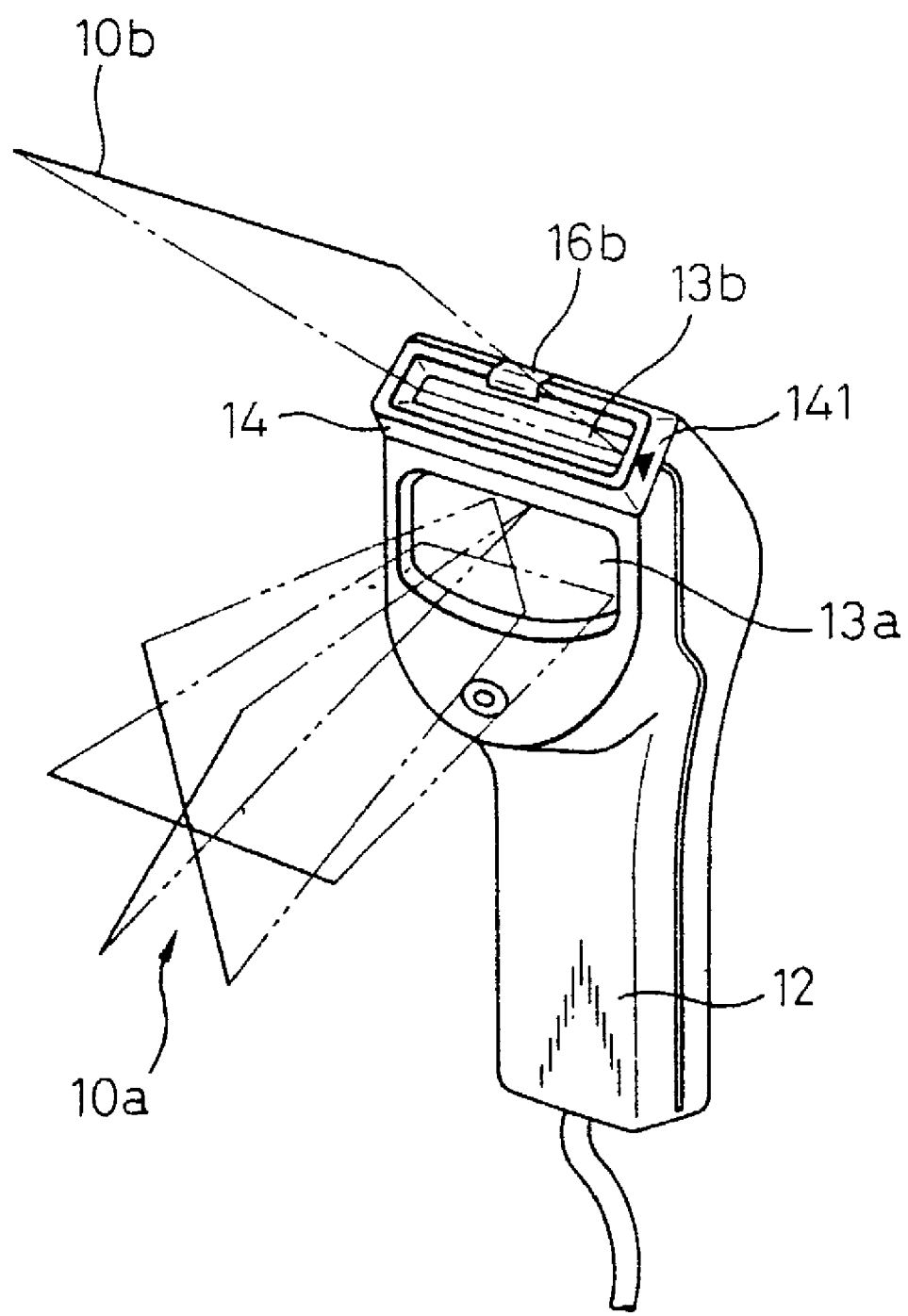
FIG. 69 is a view showing a reader having a scan direction indicator mark.

When the reader is used as a touch reader, it is important for reliable reading to bring a bar code to scanning light emitted through the second read window 13*b*. FIG. 69 is a view showing an example of a reader capable of notifying a user of a position scanned by a scanning ray.

As already described, in a conventional touch reader, an LED is used to illuminate a bar-code surface entirely. The necessity of positioning a read window strictly is therefore low. However, in the case of the reader of this embodiment, even when the reader is used as a touch reader, a bar code is scanned with a scanning ray such as laser light. Unless the bar code is located at a position passed by the scanning light, the bar code cannot be read. The read window employed must therefore be positioned strictly.

The cover 14 is, as already described, attached to the perimeter of the second read window 13*b* of the reader. Scan direction indicator marks 141 indicating the start and end points of a unidirectional scanning pattern are inscribed on the right hand and left hand of the cover. This assists a user in checking with position is scanned by scanning light 10*b* emitted through the second read window. The scanning ray travels along a line linking the apices of the triangular marks.

The touch reader has the read window thereof approached to a bar code for reading. In the case of the reader shown in FIG. 69, in particular, the perimeter of the second read window is shielded with the cover 14. It is hard to directly discern a bar code that is an object of reading. It is also hard to discern which position of the bar code is scanned by scanning light emitted through the second read window 13*b*.

However, since the marks 141 shown in FIG. 69 are inscribed on the cover 141. The scan position of a scanning ray emitted at least through the second read window 13*b* can be judged on the basis of the marks. It can therefore be checked indirectly which part of the bar code is being scanned. Consequently, the bar code to be read can be read reliably.

Figure 70:
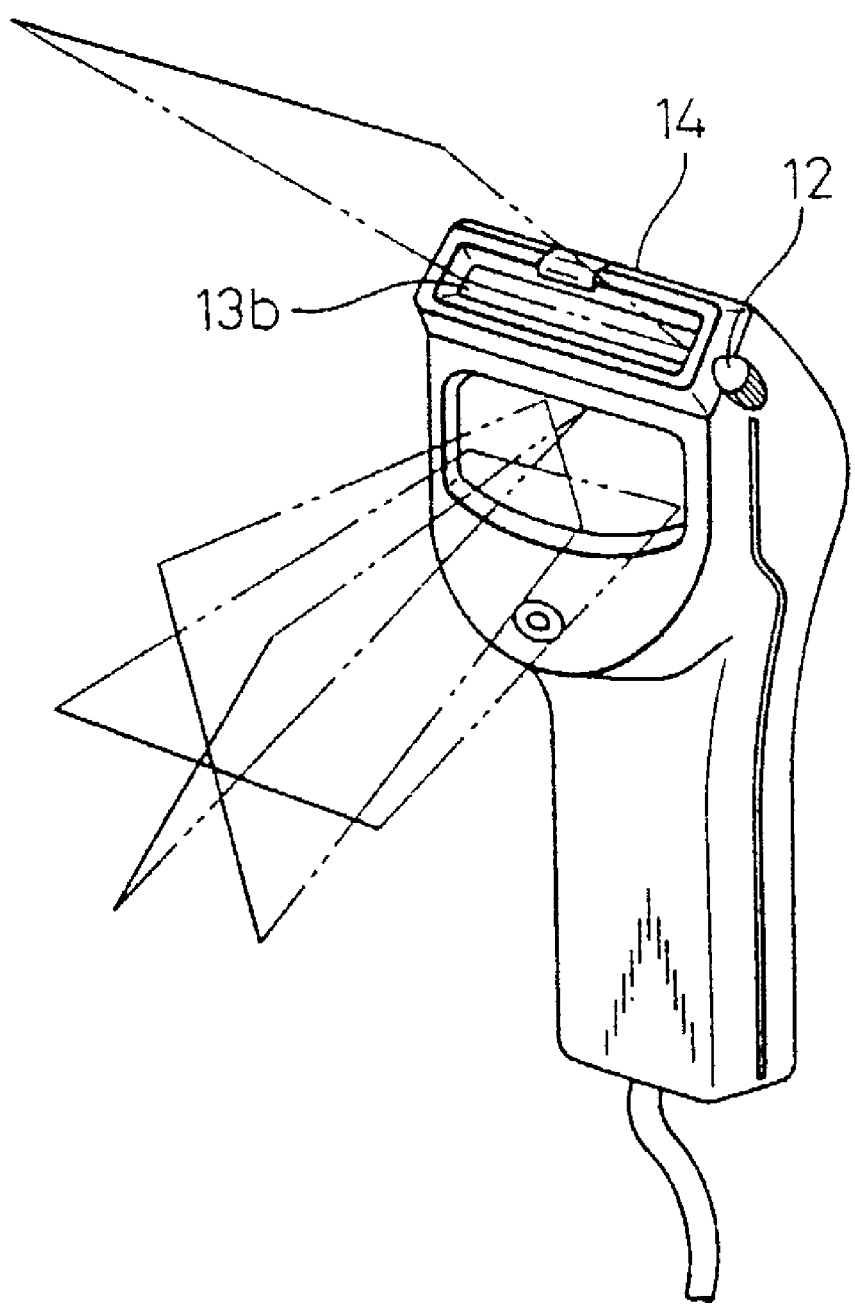
FIG. 70 is a view showing a reader having LED indicators on the lateral sides thereof.

FIG. 70 is a view showing a variant of the reader shown in FIG. 69. In FIG. 70, LED indicators 142 are formed at the positions of the scan direction indicator marks 141 shown in FIG. 69. Compared with the case in which the marks are inscribed, when the LED indicators 142 are formed, a user can discern the marks more easily and check the scan position of scanning light more easily. The reader shown in FIG. 70 will prove effective when a place in which the reader is used is dark.

For reading a bar-code menu, when the menu sheet is placed on a tabletop, the reader approaches a bar code from immediately above the bar code. If the LED indicators were formed on the back side of the reader, the LED indicators would be identified readily. However, when the menu sheet is held by one hand and the reader is held by the other hand, the lateral side of the reader faces a user's face. If the LED indicators were formed on the back side of the reader, the user would find it hard to identify them. Even in this situation, as shown in FIG. 70, since the LED indicators are formed on the lateral sides of the reader, the LED indicators can be discerned readily.

When the indication color of the LED indicators may be varied depending on whether the reader is rested or used to read a bar code, the capability of a read check indicator can be added to the LEDs shown in FIG. 70. This enables a user to check reading and a scan position of scanning light simultaneously.

Figure 71:
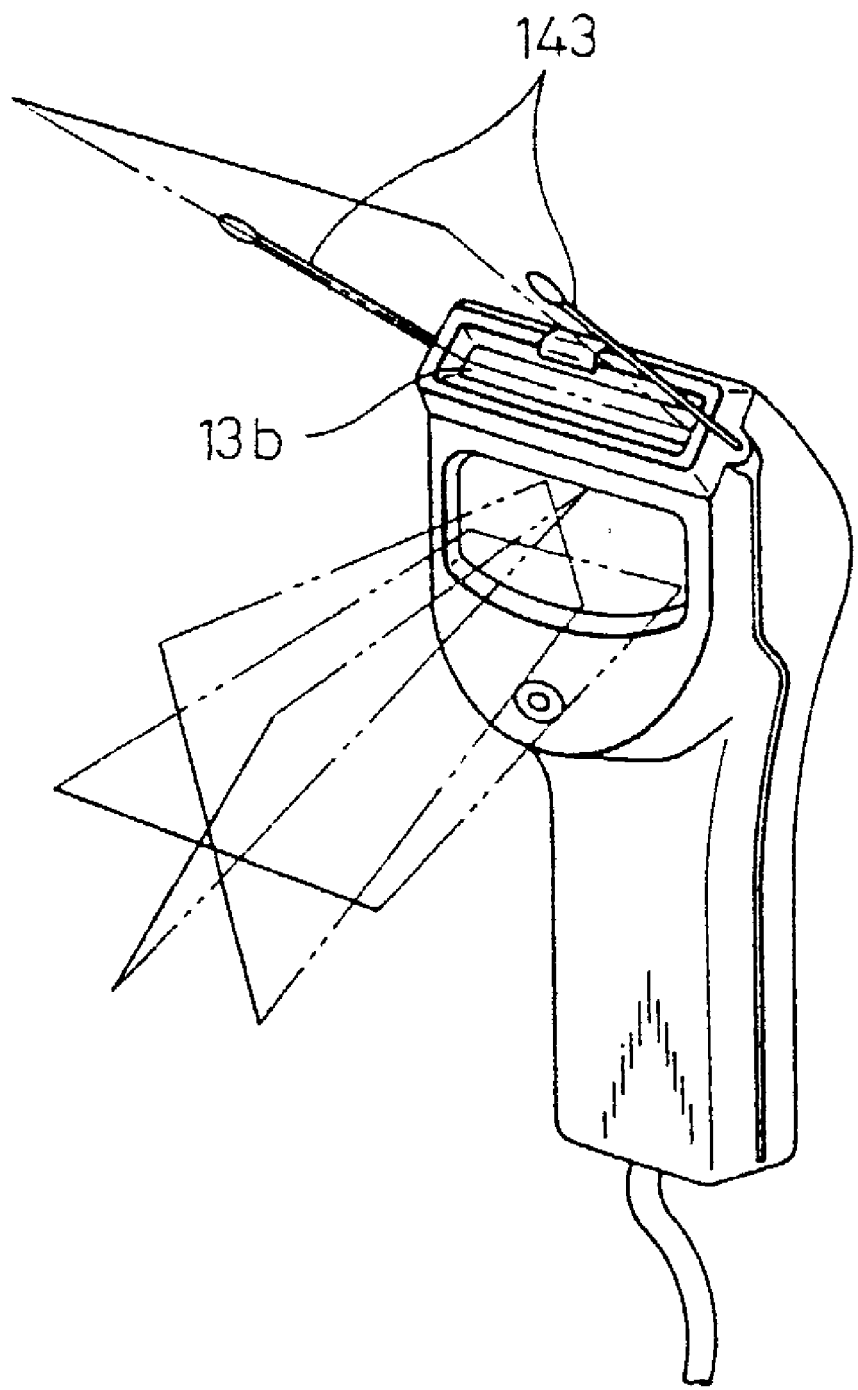
FIG. 71 is a view showing a reader having scan position indicator projections.

FIG. 71 is a view showing an example of another mechanism for enabling a user to recognize a scan position of scanning light emitted through the second read window 13*b*. In the case shown in FIG. 71, projections 143 indicating a position and direction to and in which scanning light is emitted are formed on both edges of the second read window. The projection direction of the projections 143 agrees with a direction in which scanning light is emitted.

The two projections 143 are brought into contact with both edges of a bar code that is an object of reading, whereby scanning light emitted through the second read window 13*b* can accurately scan the bar code that is an object of reading. The use of such projections obviates the necessity of bringing a bar code close to the read window employed. It can therefore be prevented that the bar code is hidden behind the read window. When a bar code is hidden behind the read window, it cannot be checked directly which position of the bar code is scanned by the scanning light. This problem will not occur in the reader shown in FIG. 71. The state of a bar code being scanned can be discerned directly.

In the case of the reader shown in FIG. 71, a bar code that is an object of reading through the second read window 13*b* is located at the tips of the projections 143. Preferably, the focal position of scanning light emitted through the second read window 13*b* should therefore be present in the vicinity of the tips of the projections.

Figure 72:
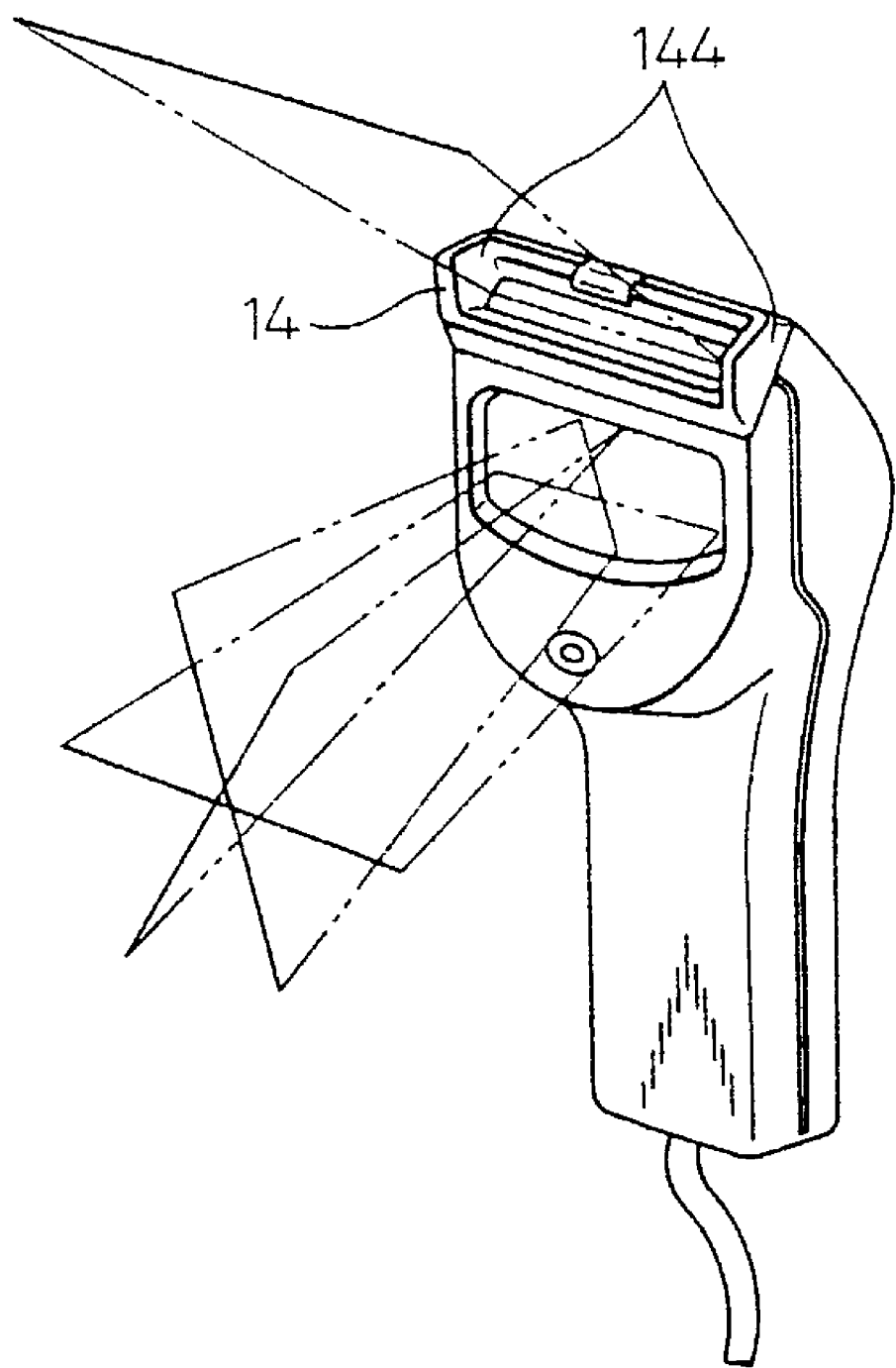
FIG. 72 is a view showing a reader having scan position indicator juts on a cover thereof.

FIG. 72 is a view showing yet another example of a mechanism for enabling a user to identify a scan position of scanning light emitted through the second read window 13*b*.

In the reader shown in FIG. 72, crest juts 144 are formed at both edges of the cover formed on the perimeter of the second read window. The crest just 144 have the same significance as the marks shown in FIG. 69. Both edges of a bar code that is an object of reading are aligned with the positions of the crest juts, whereby scanning light emitted through the second read window 13*b* can scan the bar code reliably. Even in the case shown in FIG. 72, it can be prevented that a bar code that is an object of reading is hidden behind the read window.

Figure 73:
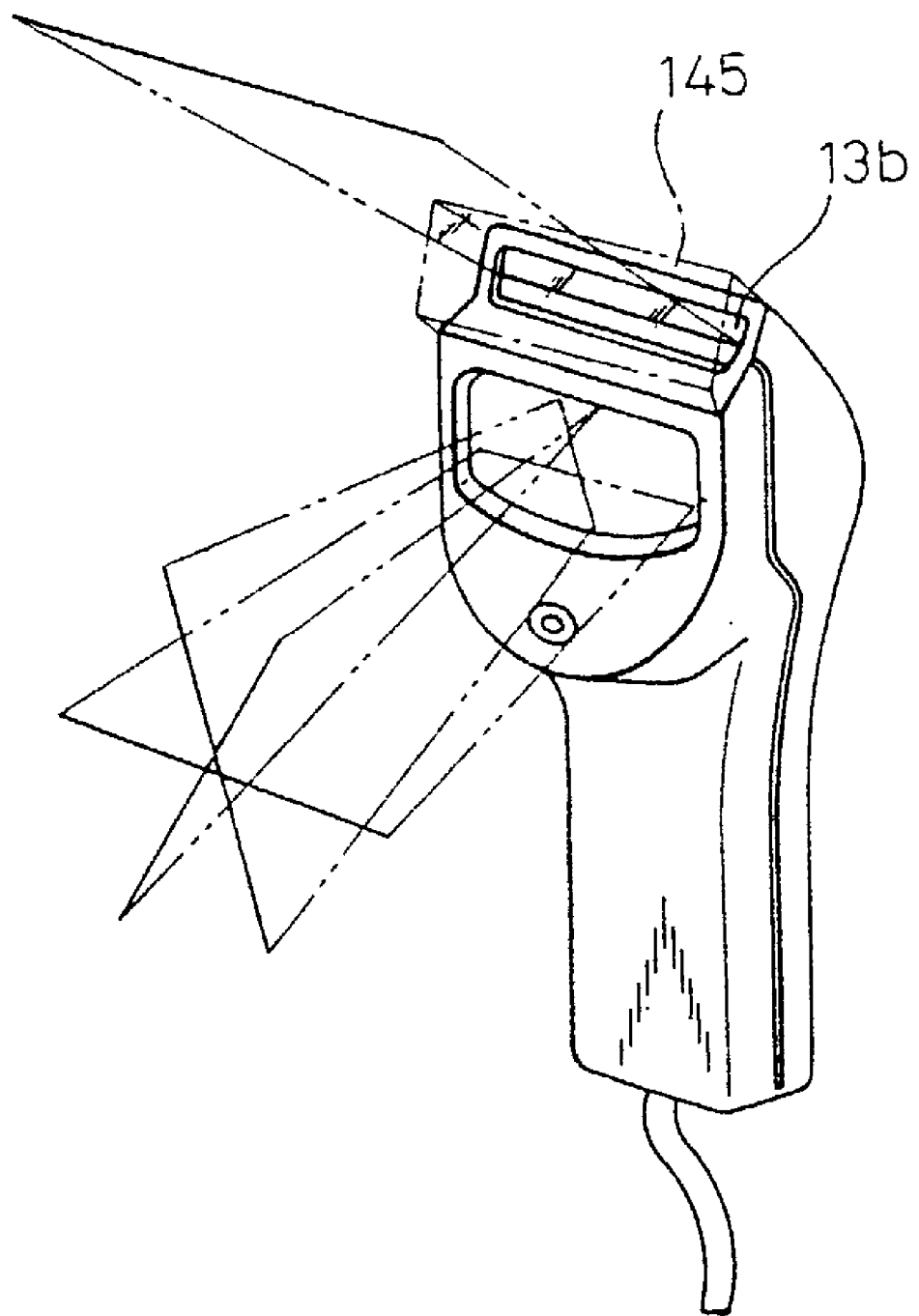
FIG. 73 is a view showing a reader having a transparent cover.

FIG. 73 is a view for explaining a mechanism for preventing a bar code that is an object of reading from being hidden behind the read window employed. In the reader shown in FIG. 73, a position at which the read window 13*b* is formed is lowered by one step from the position shown in FIG. 70. A transparent cover 145 for properly retaining the spacing between the read window and a bar code is attached to the face of the read window 13*b*.

Since the read window is located at a one-step lowered position, even when the reader approaches a bar-code surface, the bar code can be discerned from the back side of the reader. Since a bar code can be discerned directly, it can be checked directly and easily which position of the bar code is being scanned. Moreover, for reading a bar code, the bar code is brought into contact with the face of the transparent cover. Since the transparent cover 145 is attached, the spacing between a bar code and the read window can be retained properly. Consequently, it can be prevented that discerning a bar code and checking a scan position from the back side of the reader are crippled because the reader has approached too closely to the bar code.

When the transparent cover 145 is designed to be detachable and replaceable, if the face of the transparent cover is flawed because it is brought into contact with a bar code, the transparent cover can be replaced with a new one. Thus, the influence of the flaw can be nullified.

Figure 74:
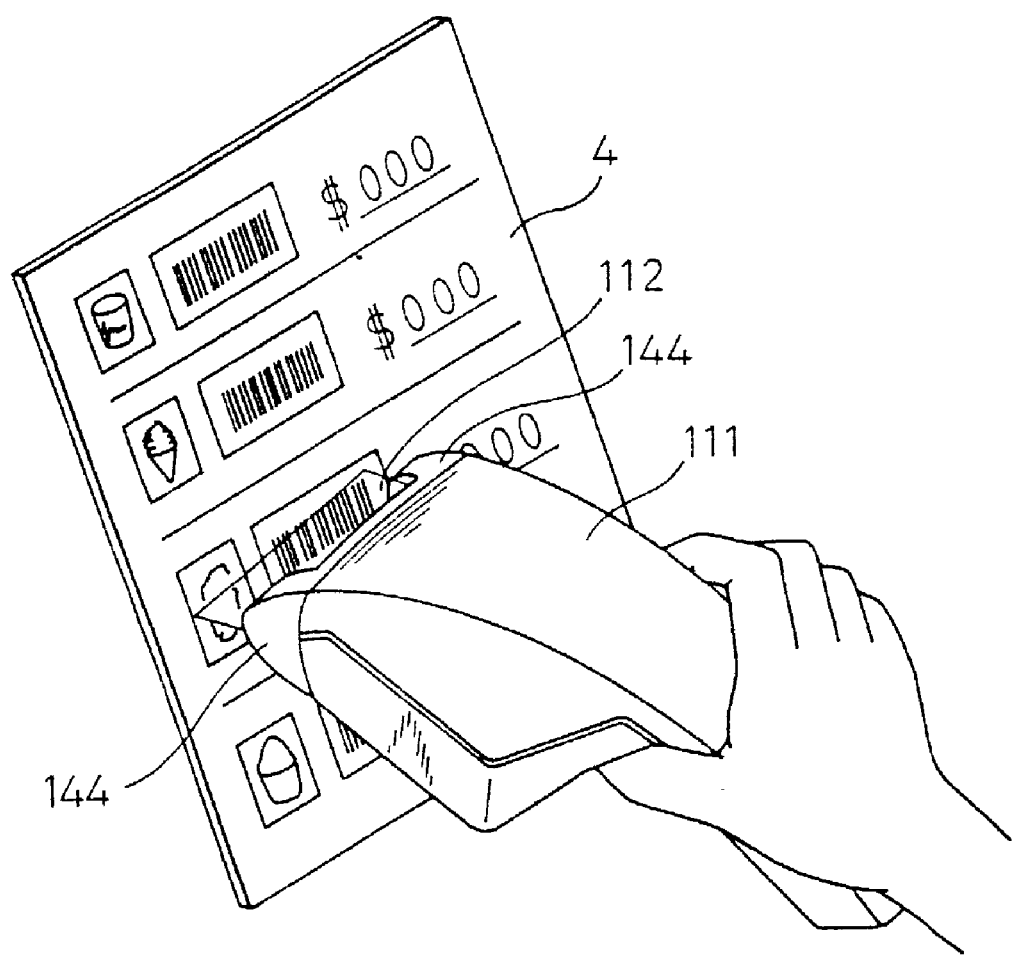
FIG. 74 is a view showing a reader having a notch in a cover thereof.

FIG. 74 is a view showing reading of a bar-code menu. As shown in FIG. 74, the crest juts 144 are formed on the cover on the perimeter of a read window. A proper space is interposed between a bar code and the read window (crest juts). This makes it easy to discern the bar code and a scan position.

Moreover, the back side 111 of the reader is streamlined. If the back side of the reader were angular, the angular part would interfere with discernment of a bar code or scan position. However, as shown in FIG. 74, since the back side 111 of the reader is streamlines, even when the reader is used for hand-held reading, nothing interferes with discernment of a bar code or scan position. A position check can be achieved readily.

Figure 75:
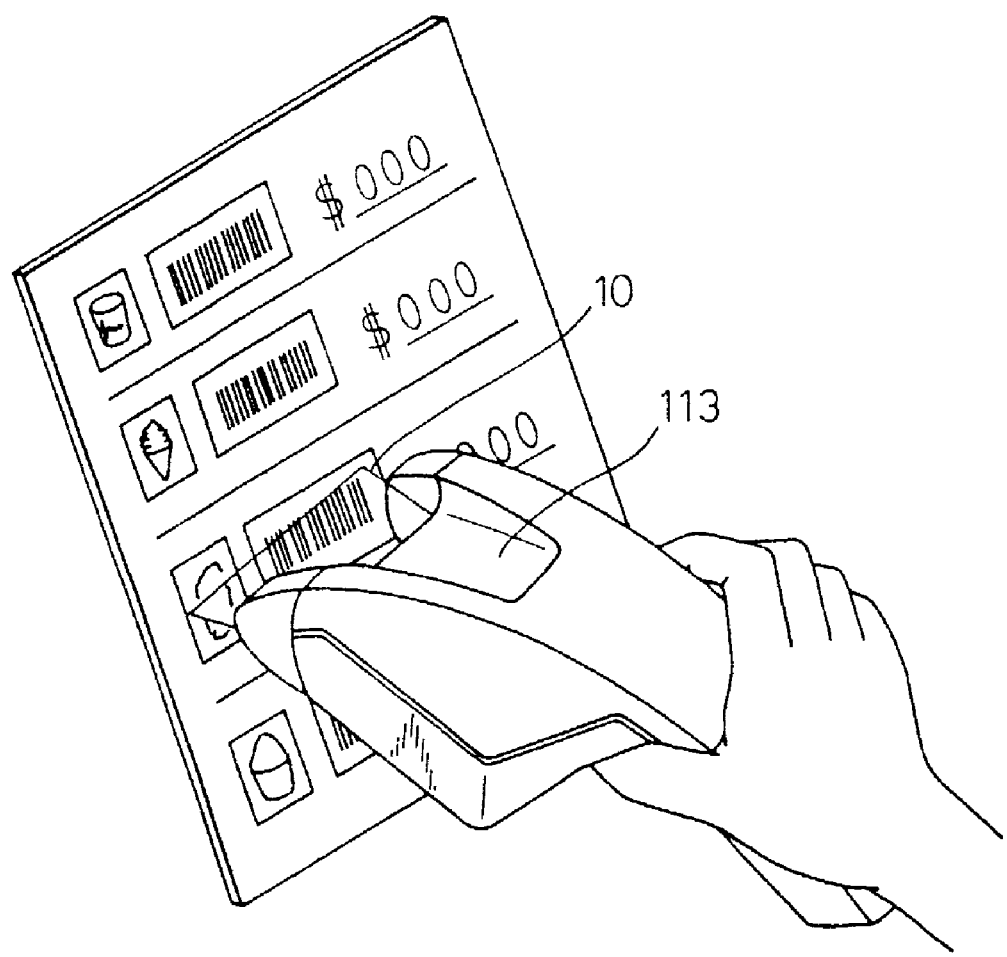
FIG. 75 is a view showing a reader having a concave part on the back side thereof.

FIG. 75 is a view showing a variant of the reader shown in FIG. 74. The back side of the reader shown in FIG. 75 has a concave part 113 formed. The formation of the concave part 113 makes it easy to check a bar code or scan position from the back side of the reader.

Figure 76A:
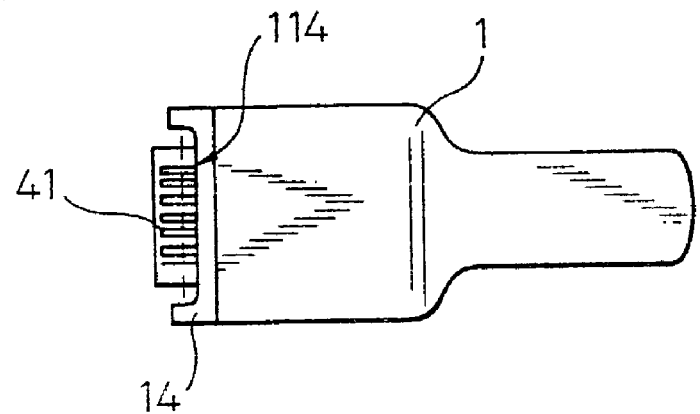
FIGS. 76A and 76B are views showing a scanning ray emission direction and the back side of a reader.
Figure 76B:
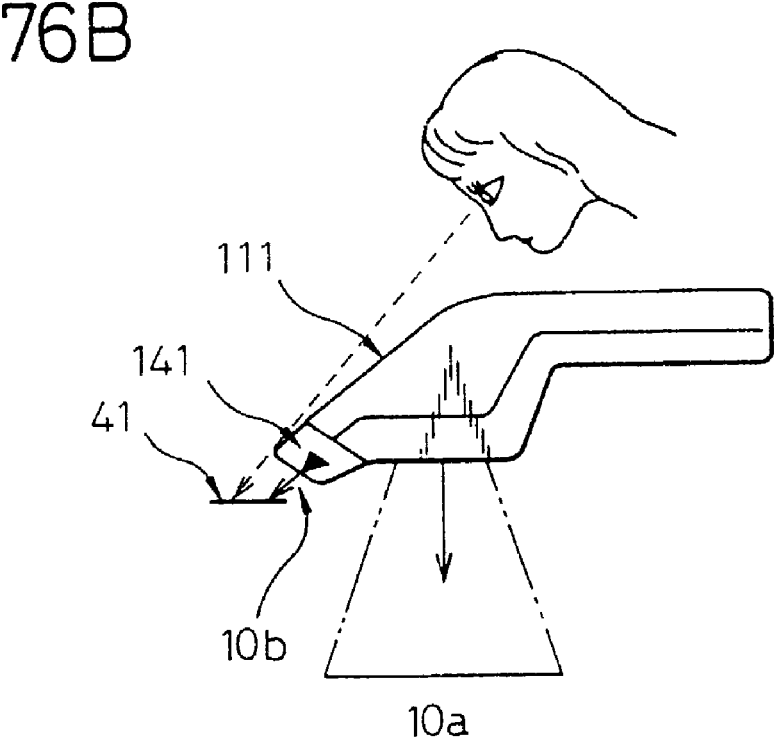

FIGS. 76A and 76B are views for explaining checking of a bar-code position or scan position to be performed in order to read a bar-code menu 4. The back side 111 of the reader shown in FIGS. 76A and 76B has a slope. The slope is set to have substantially the same angle as the angle of emission of scanning light emitted through the second read window 13*b*. Since both edges of the cover 14 of the second read window 13*b* are formed as the juts 114, an operator's line of vision will not be intercepted by the second read window of the reader. Consequently, the bar-code position of scan position can be checked readily by the operator.

Scanning light emitted through the second read window 13*b* travels along a line linking the positions of scan position indicator marks 141 inscribed on the lateral sides of the cover 14. When a bar code is positioned to lie between extensions of the scan position indicator marks 141, the bar code can be scanned reliably.

As apparent from FIG. 76A, a top 114 of the reader is formed linearly so that the reader can readily be aligned with the orientation of a bar code. The orientation of the tip 114 of the reader agrees with the scan direction of a scanning ray emitted through the second read window 13*b*. When the orientation of a bar code is aligned with the linear tip, the bar code can be scanned thoroughly. This leads to more reliable reading.

In FIG. 76B, a scan range permitted by multi-directional scanning light emitted through the first read window 13*a* is illustrated for reference. It is seen that the multi-directional scanning light scans a wider range than the scanning light 10*b* emitted through the second read window 13*b*.

Now, a description will be made of the reason why the scanning light 10*b* emitted through the second read window 13*b* of the reader shown in FIGS. 76A and 76B is not irradiated vertically to a read surface.

Figure 77A:
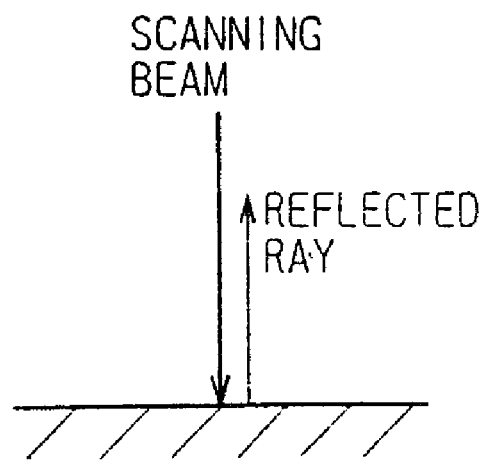
FIGS. 77A and 77B are diagrams showing the relationship between incidence and reflection of scanning light to and from a bar-code surface.

FIG. 77A is a diagram showing a state in which scanning light is irradiated vertically to a bar code. Scanning light falls on the bar code vertically. The scanning light is therefore reflected from the bar-code surface substantially in its entirety. The quantity of light reflected from the bar code and received by the reader is therefore very large. When the reader is used as a touch reader, the distance of the read window employed from a bar code is so short that the quantity of scanning light irradiated to the bar code is great. When scanning light is irradiated vertically to a bar code in this read form, such a problem may occur that it becomes hard to detect the contrast of the bar code because of the too large quantity of reflected light and the bar code cannot therefore be read.

In the conventional touch reader in which an LED is used to illuminate a bar code, the quantity of light used to illuminate a bar code is not so large as to post the foregoing problem. In the reader of this embodiment, however, since laser light is used to scan a bar code, the quantity of light reflected from the bar code is much larger than that in the touch reader using an LED.

Figure 77B:
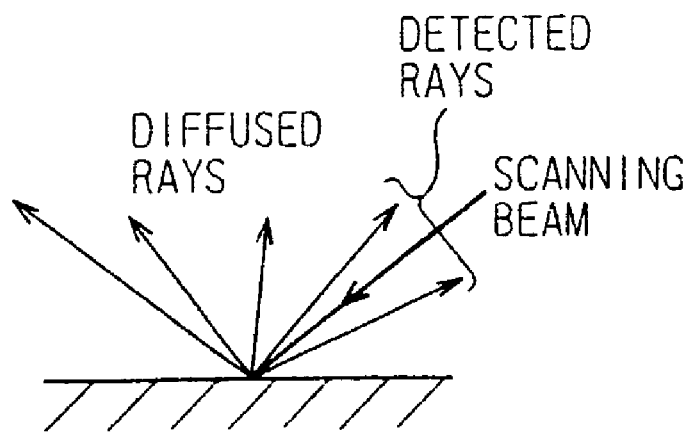

In the reader shown in FIGS. 76A and 76B, it is designed that the emission direction of scanning light emitted through the second read window 13b is not vertical to a bar-code surface. When scanning light is emitted in such an angle, as shown in FIG. 77B, the scanning light is reflected irregularly from the bar-code surface. The quantity of reflected light received by the reader is smaller than the quantity of reflected light of scanning light that is irradiated vertically. Since the distance of a bar code from the reader is very small, this reduction in quantity of reflected light does not adversely affect bar-code reading at all.

As mentioned above, since scanning light emitted through the second read window 13b and used to read a closely-located bar code is irradiated in the direction shown in FIGS. 76A and 76B, it can be prevented that the quantity of light reflected from the bar code becomes too large. Moreover, the quantity of reflected light can be optimized for detection of a bar code.

Figure 78:
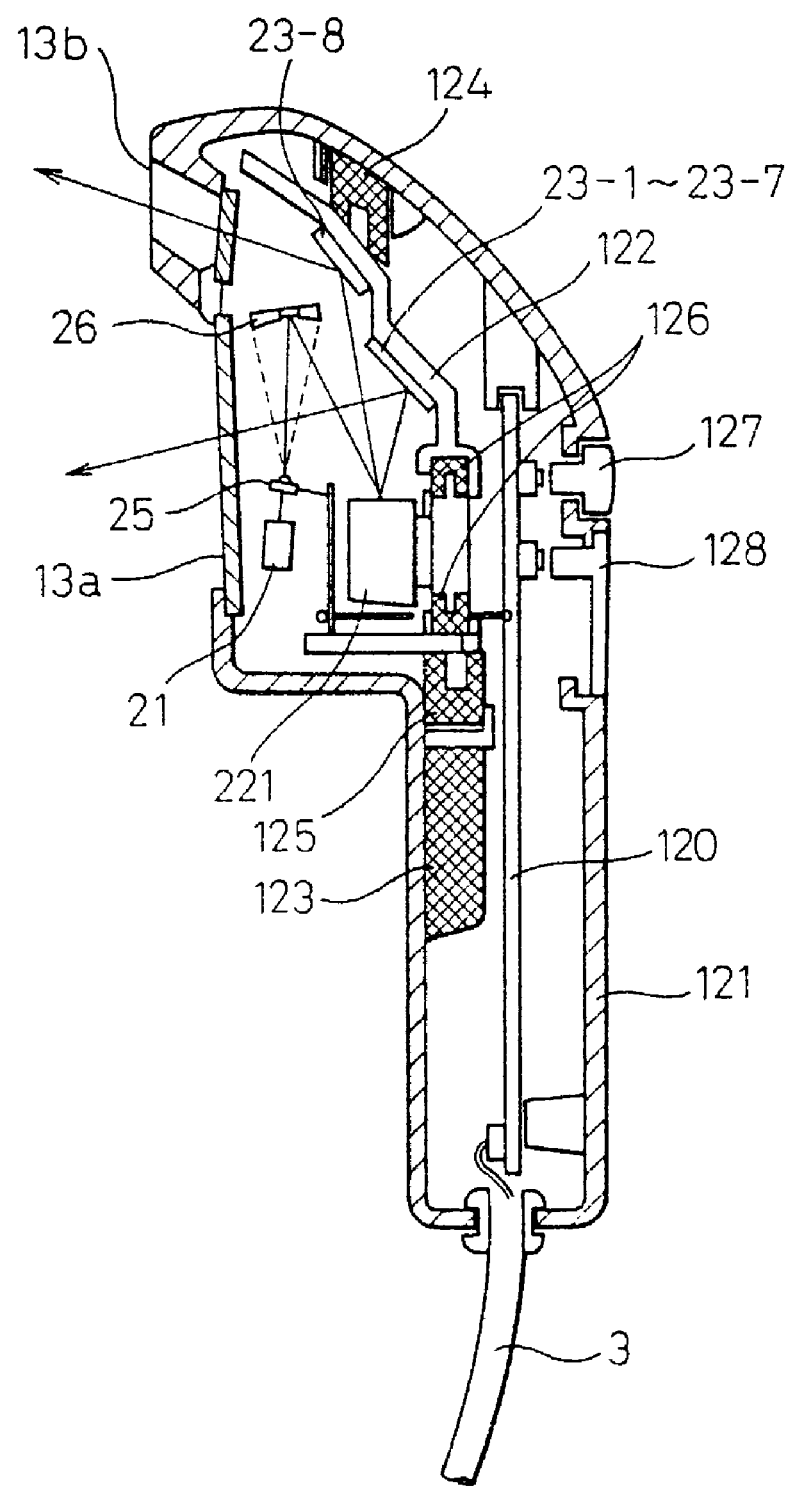
FIG. 78 is a side sectional view of a reader.

FIG. 78 is a side sectional view of the reader of this embodiment.

A printed-circuit board 120 including a control unit for controlling the reader is incorporated in the reader. The printed-circuit board extends from the head to the rear end of the grip. An interface cable 3 to be coupled with an external unit is joined with one end of the printed-circuit board.

A laser light source 21, a condenser 26, a polygon mirror 22, multi-beam stationary mirrors 23-1 to 23-7, a single-beam stationary mirror 23-8, and a condensing sensor 25 are incorporated in the head of the reader. The multi-beam stationary mirrors 23-1 to 23-7 correspond to the floor mirrors 23-1 to 230-7 in FIG. 7, and the single-beam stationary mirror 23-8 corresponds to the floor mirror 23-8 in FIG. 7. The other component elements correspond to those shown in FIG. 7.

The stationary mirrors are locked in an optical frame 122. The optical frame is attached to a cover 121 of the reader via cushioning members 124 and 125. Since the reader of this embodiment may be used as a hand-held reader, there is a fear that the reader may suffer a shock when it is used to read a bar code or mounted or dismounted on or from the stand. When shocks are conveyed to an optical system in the reader, there arises a fear that the optical system may be displaced or damaged. In the reader shown in FIG. 71, the optical frame 122, in which the optical system is locked is attached to the cover of the reader via the cushioning members 124 and 125 so that shocks applied to the reader will not be conveyed to the optical system.

A motor 221 for driving the polygon mirror 22 is especially susceptible to shocks. When the motor receives shocks, a bearing may be damaged. Consequently, a sound may occur during the rotation of the motor. At worst, there is a possibility that the motor may fail. The polygon mirror is therefore attached to the optical frame 122 via a motor cushion 126. Owing to the operation of the motor cushion 126, in addition to the effect of shock reduction by the cushioning members, shocks applied to the motor can be greatly attenuated.

The condensing sensor 25, laser light source 21, and condenser mirror 26 are also locked in the optical frame 122, though FIG. 78 does not show them clearly. The optical frame is attached to the reader body via the cushioning members 124 and 125. These cushioning members are used to prevent vibrations stemming from the usage of the reader as a hand-held reader from being conveyed to the optical system.

Figure 79:
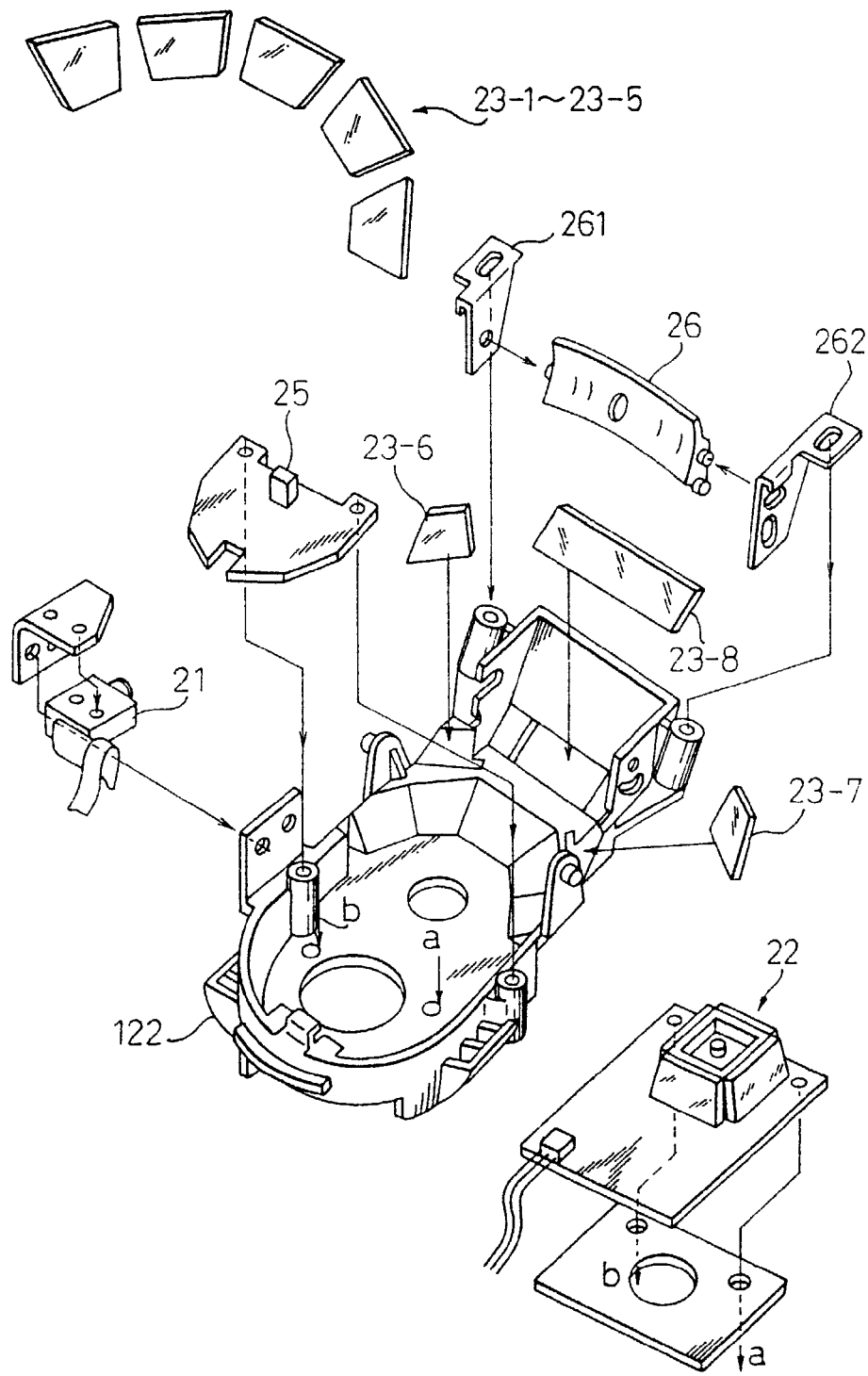
FIG. 79 is a view showing an optical frame and optical parts.

FIG. 79 is a view showing the optical frame 122 and parts constituting the optical system to be locked in the optical frame. FIGS. 80 to 83 are views showing a state in which the optical parts are locked in the optical frame 122.

The optical frame 122 is molded as a united body using, for example, a resin. The eight floor mirrors 23-1 to 23-8, condenser mirror 26, laser light source 21, light reception sensor 25, polygon mirror 22 (polygon motor), and cushioning members and motor cushion 124, 125, and 126 are locked in the optical frame 122.

The reflection surfaces of the polygon mirror 22 are affixed to respective sides of a base whose cross section is shaped like a trapezoid. Alternatively, the polygon mirror may be molded as a united body using a resin, and reflection membranes may be deposited on the reflection surfaces.

The base of the polygon mirror is engaged with an axis of rotation of the motor 221 placed on a substrate. Leads over which signals or the like used to drive the motor are fed are coupled with one end of the substrate. The polygon motor 221 is locked in the optical frame 122 via the motor cushion 126. The polygon motor 221 is screwed to the optical frame 122 through a screw hole bored in the substrate 120.

The light reception sensor 25 is placed on a substrate. A control unit for controlling the light reception sensor is mounted on the substrate 120. A screw hole bored in the substrate on which the light reception sensor 25 is placed in located at a position coincident with a screw hole bored in the optical frame 122. The substrate on which the light reception sensor 25 is placed is screwed to the optical frame 122.

The laser diode (laser light source) 21 is secured to an attachment member with two screws. The attachment member having the laser diode 21 is screwed to an attachment plate formed on the lateral side of the optical frame 122, whereby the laser diode is secured to the optical frame. The emission direction of laser light emanating from the laser diode 21 is a direction toward a small reflection mirror 26' attached to the center of the condenser mirror 26.

Planes on which the floor mirrors 26-1 to 26-8 are affixed is placed on the base of the optical frame 122. The numerals written on the base correspond to the reference numerals denoting the floor mirrors. The floor mirrors are affixed to the positions.

The condenser mirror 26 has both edges thereof supported by the optical frame 122. Both the edges have three stems which are fitted into holes bored in a first clamp and second clamp. The condenser mirror attached to the clamps is locked in the optical frame.

Figure 84:
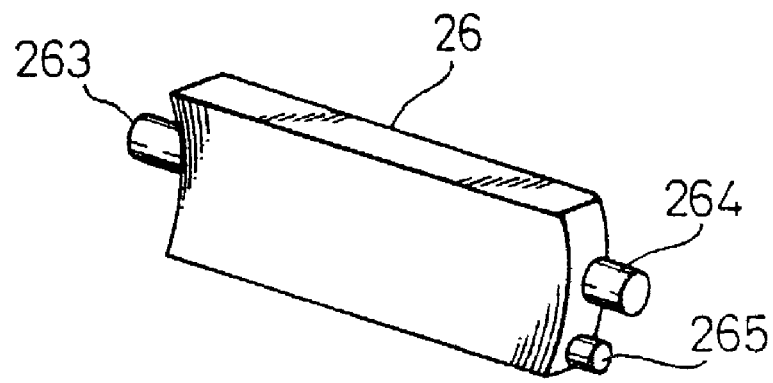
FIG. 84 is a view showing a condenser mirror.

FIG. 84 is a view showing the condenser mirror in enlarged form. The stems 263 and 264 are formed on the left-hand and right-hand sides of the condenser mirror 26 and located coaxially. The stems 263 and 264 serve as an axis of rotation of the condenser mirror 26. The stem 265 is located under the stem 264 on the side of the condenser mirror having the stem 264.

Figure 85:
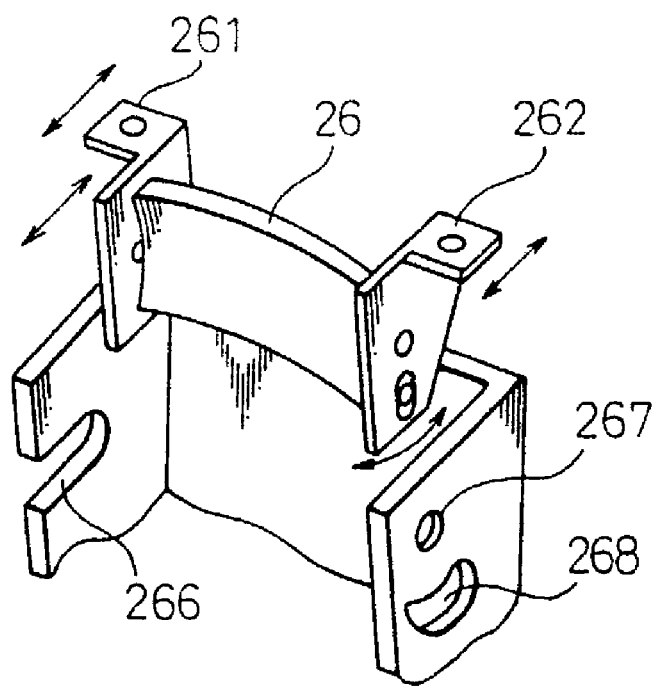
FIG. 85 is a view showing the condenser mirror to be attached to the optical frame.

FIG. 85 is a view showing the condenser mirror 26 attached to the first and second clamps 261 and 262, and a portion of the optical frame 122 in which the condenser 26 is locked. A slit (first hole) 266 extending horizontally is formed in a first wall of the optical frame 122. A second hole 267 and a third hole 268 shaped like an arc with the second hole as a center are formed in a second wall of the optical frame.

The first stem 263 of the condenser mirror 26 is fitted into the first hole 266. The second and third stems 264 and 265 of the condenser mirror are fitted into the second and third holes 267 and 268 of the optical frame.

The first hole 266 of the optical frame 122 is an elongated hole extending horizontally. The side of the condenser mirror 26 having the first stem 263 can therefore be moved back and forth with the condenser mirror locked in the optical frame 122. Moreover, the second stem 264 of the condenser mirror 26 is merely fitted into the second hole 267. However, the third hole 268 of the optical frame is shaped like an arc with the second hole 267 as a center. The other side of the condenser mirror 26 having a the second and third stems 264 and 265 can therefor be pivoted back and forth with the second stem 264 as a fulcrum.

Owing to the foregoing structure, the condenser mirror can be moved back and forth by moving the side of the condenser mirror 26 having the first stem 263. The sideways position of the condenser mirror can thus be adjusted. Moreover, the reflection surface of the condenser mirror 26 can be tilted vertically by pivoting the other side of the condenser mirror 26 having the second and third stems 264 and 265. The vertical inclination of the condenser mirror can thus be adjusted.

The condenser mirror 26 incorporated in the conventional reader is fixed to a member (metallic plate) having elasticity. The angle of the condenser mirror is adjusted by tightening an adjustment screw inserted into the back side of the frame. This structure cannot preserve a space between the condenser mirror 26 and frame.

By contrast, in the reader of this embodiment, scanning light reflected from the floor mirror 23-8 must be directed toward the second read window 13b. It is therefore required to preserve a space, through which scanning light passes, behind the condenser 26. However, according to the conventional method of attaching the condenser mirror, a sufficient space through which scanning light can pass cannot be preserved behind the condenser mirror 26.

In the case of the condenser mirror 26 shown in FIG. 84, both the edges of the condenser mirror 26 are attached to the optical frame 122. A sufficient space can therefore be preserved behind the optical frame. Furthermore, alignment of the condenser mirror 26 is achieved by moving both the edges of the condenser mirror. A mechanism for securing the condenser mirror can be used in common as a mechanism for aligning the condenser mirror. Consequently, the number of parts can be reduced and the space around the condenser mirror can be saved.

Incidentally, the first and second clamps 261 and 262 each have an elongated hole. The aligned condenser mirror can be secured by screwing the first and second clamps to the optical frame 122 through screw holes bored in the optical frame.

Figure 80:
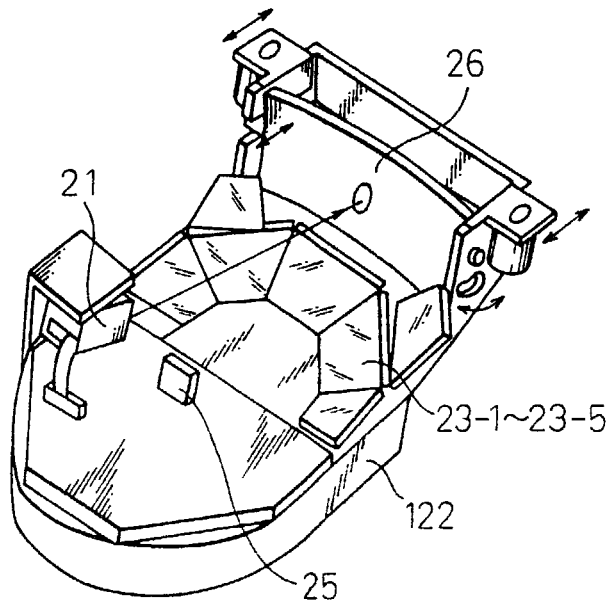
FIG. 80 is a view showing the optical frame in which the parts are locked.

FIG. 80 shows the optical frame 122 in a state in which all the parts are locked in the optical frame. The floor mirror 23-8 is hidden behind the condenser mirror 26. Likewise, the polygon mirror is hidden under the substrate on which the light reception sensor 25 is mounted. All the optical parts are thus locked in the optical frame, whereby the optical system can be constructed as a united body. Furthermore, the effect of the cushioning members of absorbing shocks that may be conveyed to the optical system can be intensified.

Figure 81:
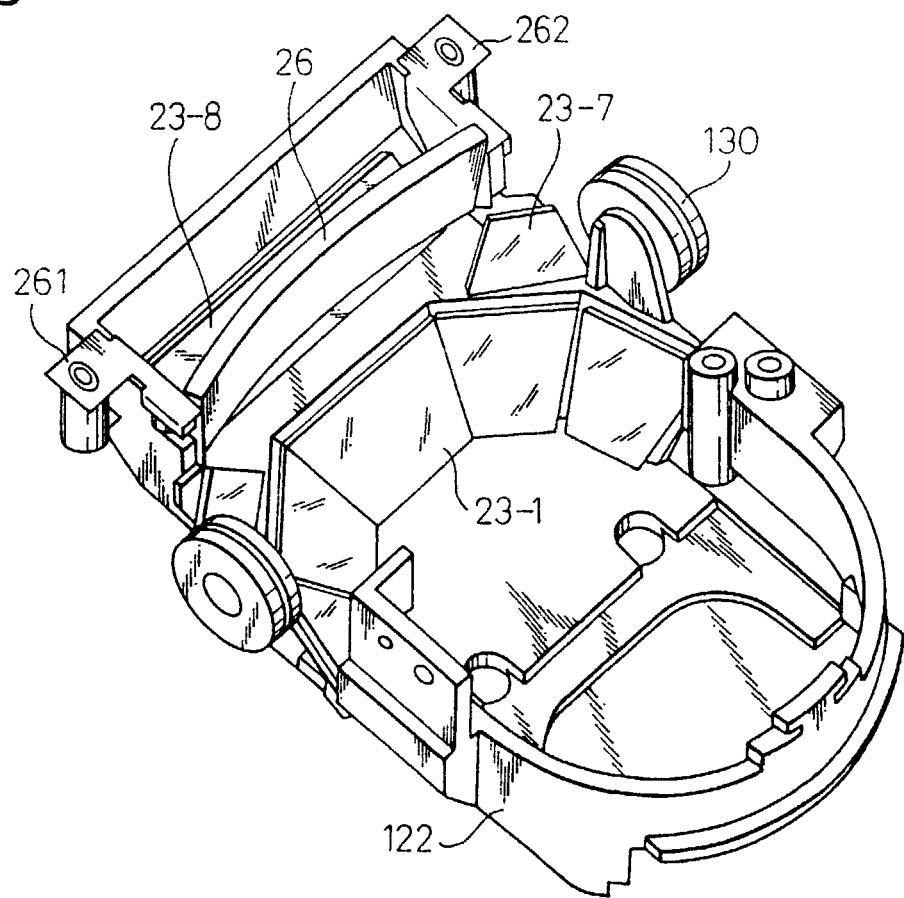
FIG. 81 is a view showing the optical frame in which the parts are locked.
Figure 82:
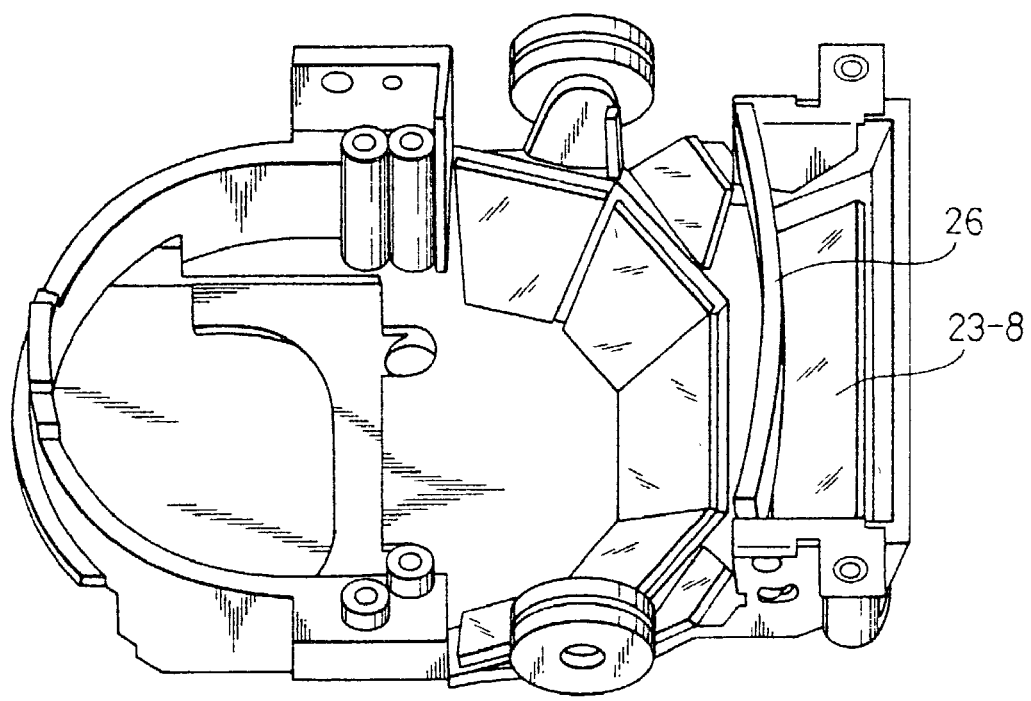
FIG. 82 is a view showing the optical frame in which the parts are locked.
Figure 83:
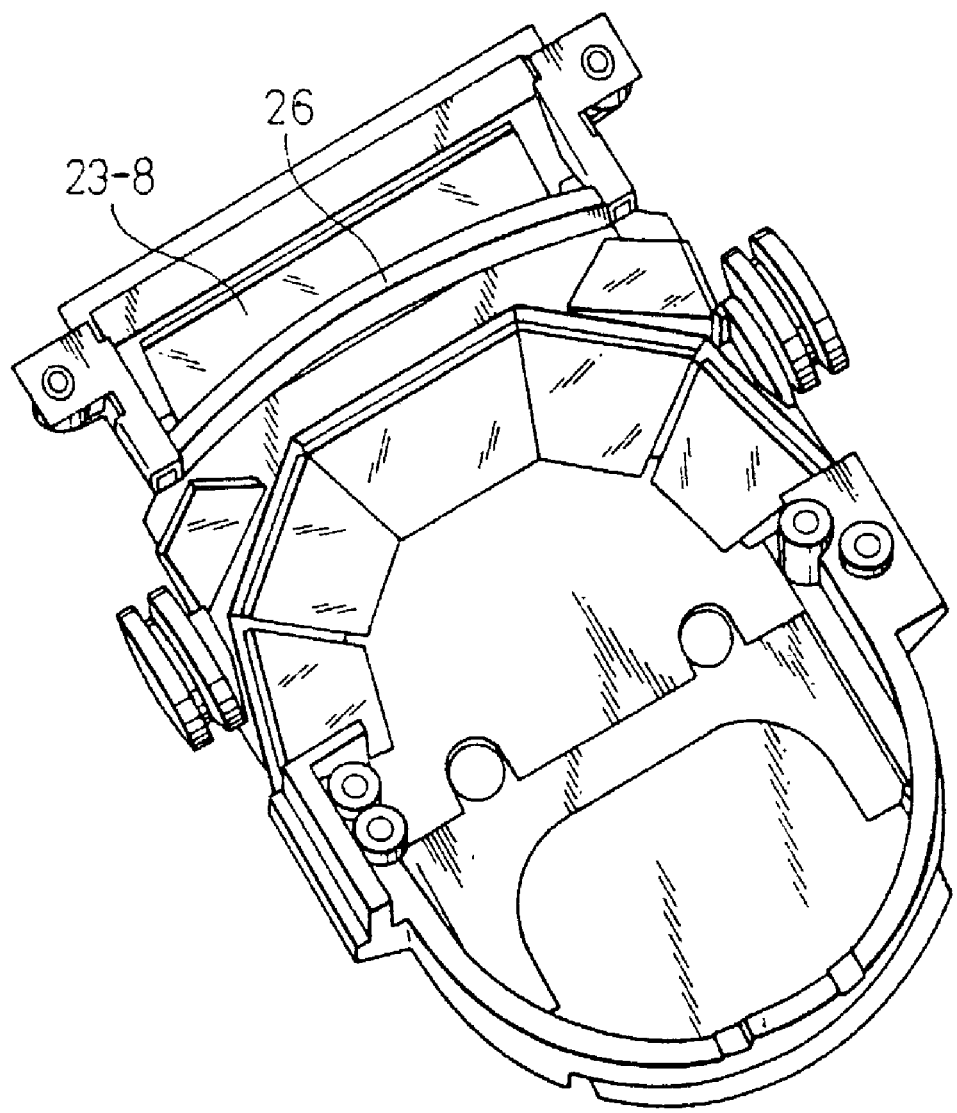
FIG. 83 is a view showing the optical frame in which the parts are locked.

FIGS. 81 and 83 are, similarly to FIG. 80, views showing the optical frame accommodating the optical parts in three directions. In FIGS. 81 to 83, the polygon mirror, light reception sensor, and the like are emitted. In particular, as apparent from the top view, a sufficient space that is wide enough for scanning light emanating from the floor mirror 23-8 and light reflected from a bar code and incident to the floor mirror 23-8 to pass is preserved between the back margin of the optical frame 122 and the condenser mirror 26.

One cushioning member 130 having a circular cross section is attached to each of the right-hand and left-hand sides of the optical frame 122. The cushioning members are each formed by joining large round members with a small round member inserted into the centers thereof. Slits formed in the cover of the reader body are engaged with the gaps between the large round members. Thus, the optical frame is not directly attached to the cover. Shocks applied to the reader are therefore absorbed by the cushioning members. Cushioning members are affixed onto the border of the optical frame, though they are not shown in FIGS. 81 to 83. These cushioning members are interposed between the contact surfaces of the optical frame and reader body, and absorb shocks.

The head of the reader further comprises a multi-beam exit (first read window) 13a and a single-beam exit (second read window) 13b. The single-beam exit is angled so that the emission direction of scanning light emitted through the second read window 13b will not be a vertical direction. The angle at which the single-beam stationary mirror 23-8 is mounted is also defined so that scanning light will be emitted in the direction. As shown in FIG. 78, the top of the cover is shaped so that when the cover is hit against a bar-code surface, scanning light emitted through the second read window 13b will not be irradiated vertically to the bar code.

A printed-circuit board having a control unit for controlling the operations of the whole reader is located behind (on the right-hand side of) the optical system incorporated in the reader. An interface cable 3 to be coupled with an external unit is attached to one end of the printed-circuit board.

A switch 127 and switch 128 are located on the back side of the reader. The switch 128 corresponds to the aforesaid mode selection switch 15b and has a switch plate. The switch 127 corresponds to the switch 15c shown in FIG. 15 and is used to change the other functions.

The reader shown in FIG. 78 is, as already described, mounted on the stand and used as a stationary reader. In particular, when the reader is erected on the stand, if the center of gravity of the reader is located in an upper part of the reader, the holder section to which the reader is fitted tends to pivot because of the weight of the reader. The orientation of the read window employed of the reader mounted on the stand becomes inconstant.

The reader of this embodiment therefore has the center of gravity set as low as possible. In particular, preferably, the center of gravity should be present in the grip.

For setting the center of gravity as low as possible in the illustrated state, in the reader of this embodiment, the polygon mirror is placed below the stationary mirrors. What is the heaviest among all the components of the reader is the motor 221 for driving the polygon mirror. The center of gravity can be lowered by placing the motor as low as possible.

However, the grip needs a certain length. The motor 221 for driving the polygon mirror 22 cannot be stowed in any place other than the head. Even when the polygon mirror and motor are arranged in a lower area of the head, the center of gravity cannot be shifted satisfactorily. In the reader shown in FIG. 78, therefore, a weight 123 used to lower the center of gravity is stowed in the grip. Since there is a sufficient space in the grip, the center of the gravity of the reader can be lowered as much as possible by setting the weight in the space. Even when the reader is mounted on the stand, the orientation of the read window employed can be kept constant.

If the center of gravity were located at an upper area, when the grip is held, the head would feel heavier than it actually is. However, since the center of gravity of the reader is shifted to the grip to the greatest extent, when a user holds the grip of the reader, he/she will not feel the head heavy but can grasp the reader in a stable manner.

Figure 86:
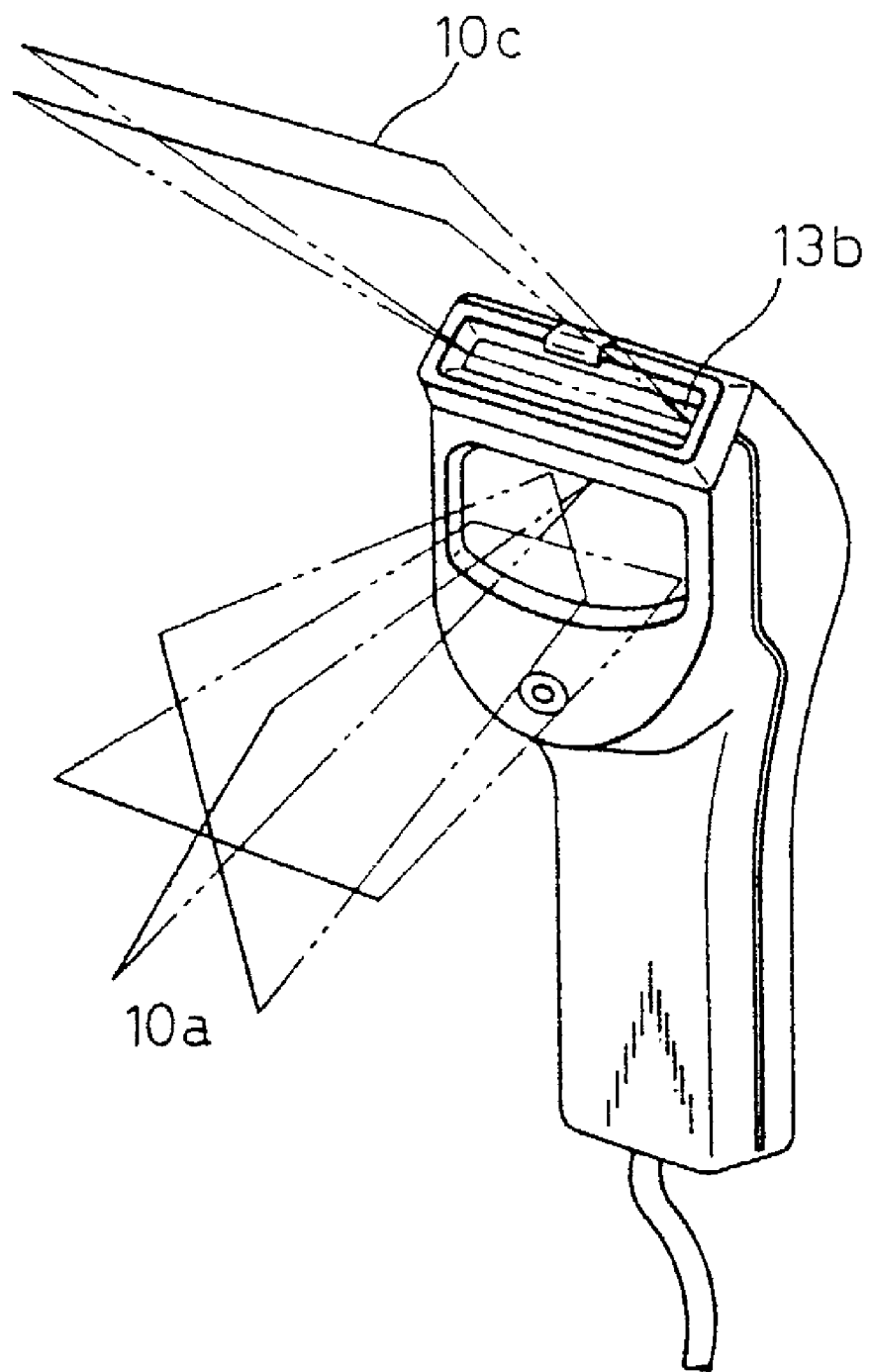
FIG. 86 is a view showing a reader that supplies a parallel-ray scanning pattern through a second read window.

FIG. 86 is a view showing an example of a reader in which the scanning pattern supplied through the second read window 13b has been modified. In the reader shown in FIG. 86, a plurality of scanning rays (two rays in FIG. 86) of which scan directions are mutually parallel and of which angles of emission are slightly different from each other are emitted through the second read window 13b. Thus, the scanning pattern supplied from the second read window 13b is composed of a plurality of scanning rays. Even if a bar code to be brought to the face of the read window is slightly deviated from the position of the read window, the bar code can be scanned by either of the scanning rays. Alignment of a bar code need not be worried about very much.

For generating a plurality of scanning rays, scanning rays reflected from a plurality of reflection surfaces of the polygon mirror having different inclinations must fall on the single-beam stationary mirror. Since the inclinations of the reflection surfaces of the polygon mirror are different from one another, the angles of incidence of scanning rays incident to the single-beam stationary mirror become different from each other. The different angles of incidence result in different emission directions of the scanning rays.

For example, in the case shown in FIGS. 8 and 9, a scanning ray incident to the floor mirror 23-8 (corresponding to the single-beam stationary mirror) is reflected only from the fourth reflection surface of the polygon mirror. The number of scanning rays emitted through the second read window 13b is therefore one. However, when scanning rays reflected from the other reflection surfaces are allowed to fall on the floor mirror 23-8, the number of scanning rays emitted through the second read window 13b increases accordingly.

Figure 87:
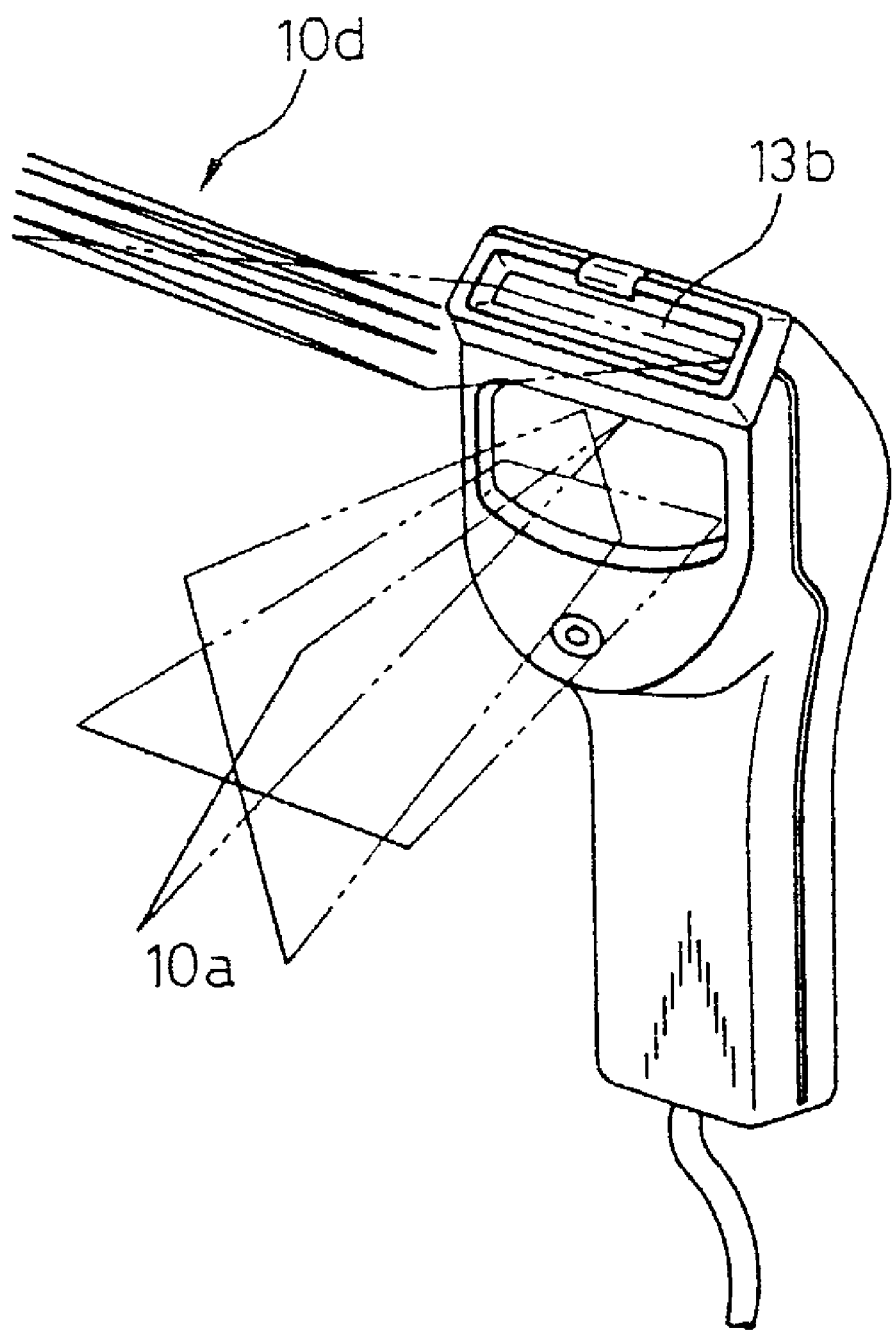
FIG. 87 is a view showing a reader that supplies a raster-form scanning pattern through a second read window.
Figure 88:
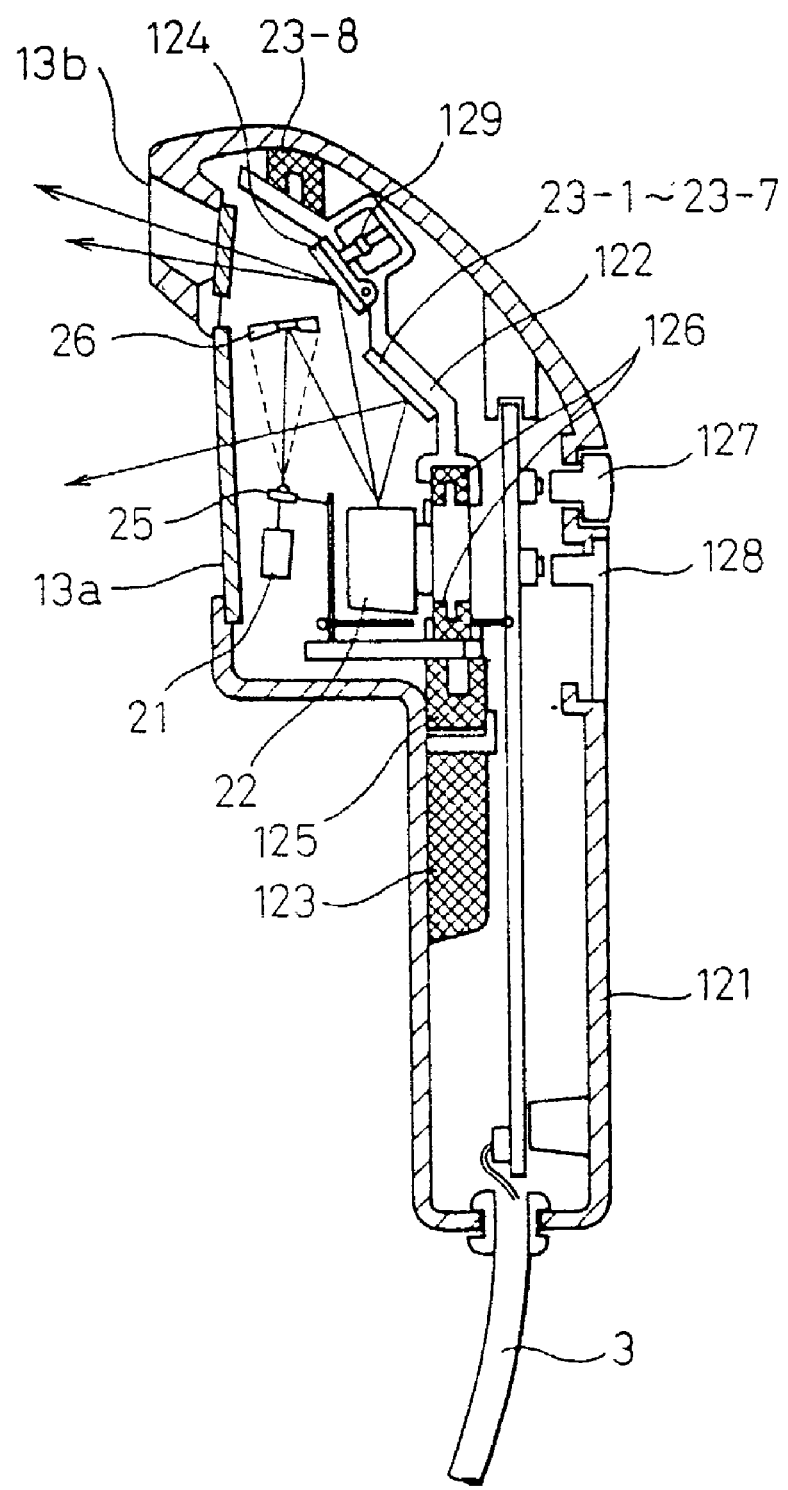
FIG. 88 is a side sectional view of a reader in which a floor mirror is driven.
Figure 89:
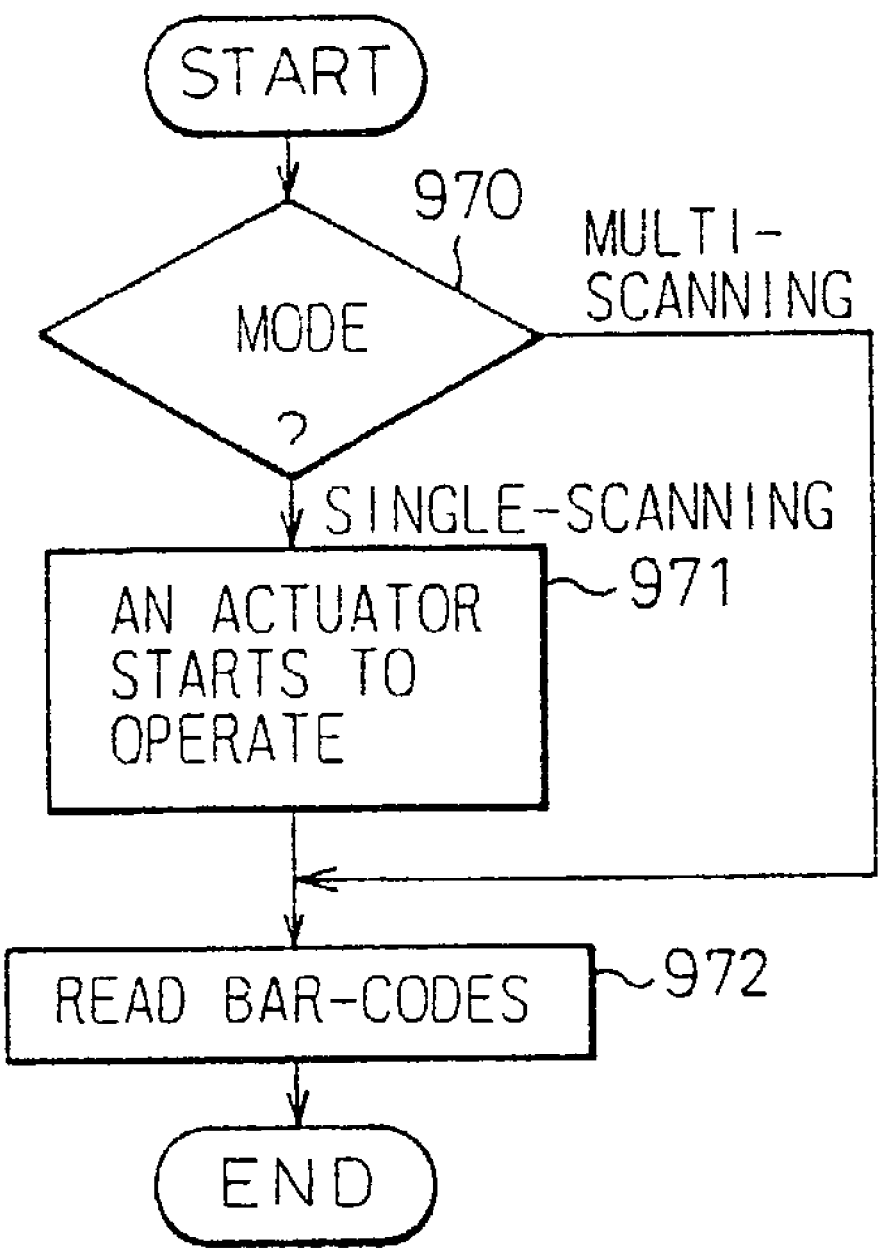
FIG. 89 is a flowchart describing a procedure of actuator drive.

FIG. 87 shows a variant of the reader shown in FIG. 86, wherein a scanning ray emitted through the second read window is scanned in raster form. FIG. 88 is a side sectional view of a reader for realizing the raster-form scanning shown in FIG. 89. A structure shown in FIG. 88 is basically identical to that shown in FIG. 78. FIG. 89 is a flowchart describing control to be given in order to select raster-form scanning.

In the reader shown in FIG. 88, a mirror driving actuator 129 is located below the single-beam mirror 23-8. The operation of the mirror driving actuator 129 is controlled by a control unit that is not shown. When the mirror driving actuator 129 is driven, the single-beam mirror 23-8 is moved back and forth. The scan timing of scanning light reflected from the polygon mirror 22 and the drive timing of the mirror driving actuator 129 are adjusted so that the scanning light emitted from the second read window 13b will trace a raster-form trajectory as shown in FIG. 87.

To be more specific, when the read mode is the single-scanning mode, the control unit drives the mirror driving actuator 129 (step 971). The drive timing comes after the scan by one scanning ray is completed and before the next scan is started. The magnitude of a drive is varied depending on a pitch of a parallel-line pattern.

The reader shown in FIG. 87 can exert the same effect as the reader shown in FIG. 86. Moreover, when a so-called two-dimensional bar code must be read using scanning light emitted through the second read window, it is required to scan the two-dimensional bar code horizontally and vertically. For reading such a two-dimensional bar code, as shown in FIG. 87, scanning the scanning light emitted through the second read window 13b in raster form is very effective.

As already described, preferably, the focal position of scanning light should be set in the vicinity of the position of a bar code to be read. For reading a bar code through the second read window 13b, since the bar code is located very close to the read window, the focal position of scanning light is set in the vicinity of the second read window 13b. Incidentally, scanning light emitted through the first read window 13a is set at a position away from the read window because of its associated read form.

Scanning light 10a emitted through the first read window 13a and scanning light 10d emitted through the second read window 13b are produced by the same optical system. It is therefore very hard to differentiate one focal position from the other. The differentiation can be achieved to some extent by differentiating the lengths of light paths of the scanning light in the reader. Thinking of the recent demands for a more compact reader, the lengths of the light paths cannot be increased.

Moreover, it is also required to vary the read depths (distances in a back-and-forth direction permitting bar-code reading) of scanning light emitted through the first and second read windows.

For reading a bar code through the first read window 13a, there is a necessity of widening a read range three-dimensionally. It is therefore required to increase the read depth of scanning light emitted through the first read window 13a.

By contrast, for reading a bar-code menu 4 through the second read window 13b, anything other than a bar code that is an object of reading must not be read. However, when the read depth of scanning light emitted through the second read window 13b is large, while the reader is moving over the menu sheet 4, any bar code (that is not the bar code to be read) recorded on the menu sheet 4 may be read. The read depth of scanning light emitted through the second read window 13b must be small.

For decreasing the read depth of scanning light, the scanning light to be emitted is spread, or on the contrary, focused. In contrast, to make the focal position of scanning light close to a read window, the scanning light to be emitted must be focused.

Figure 90:
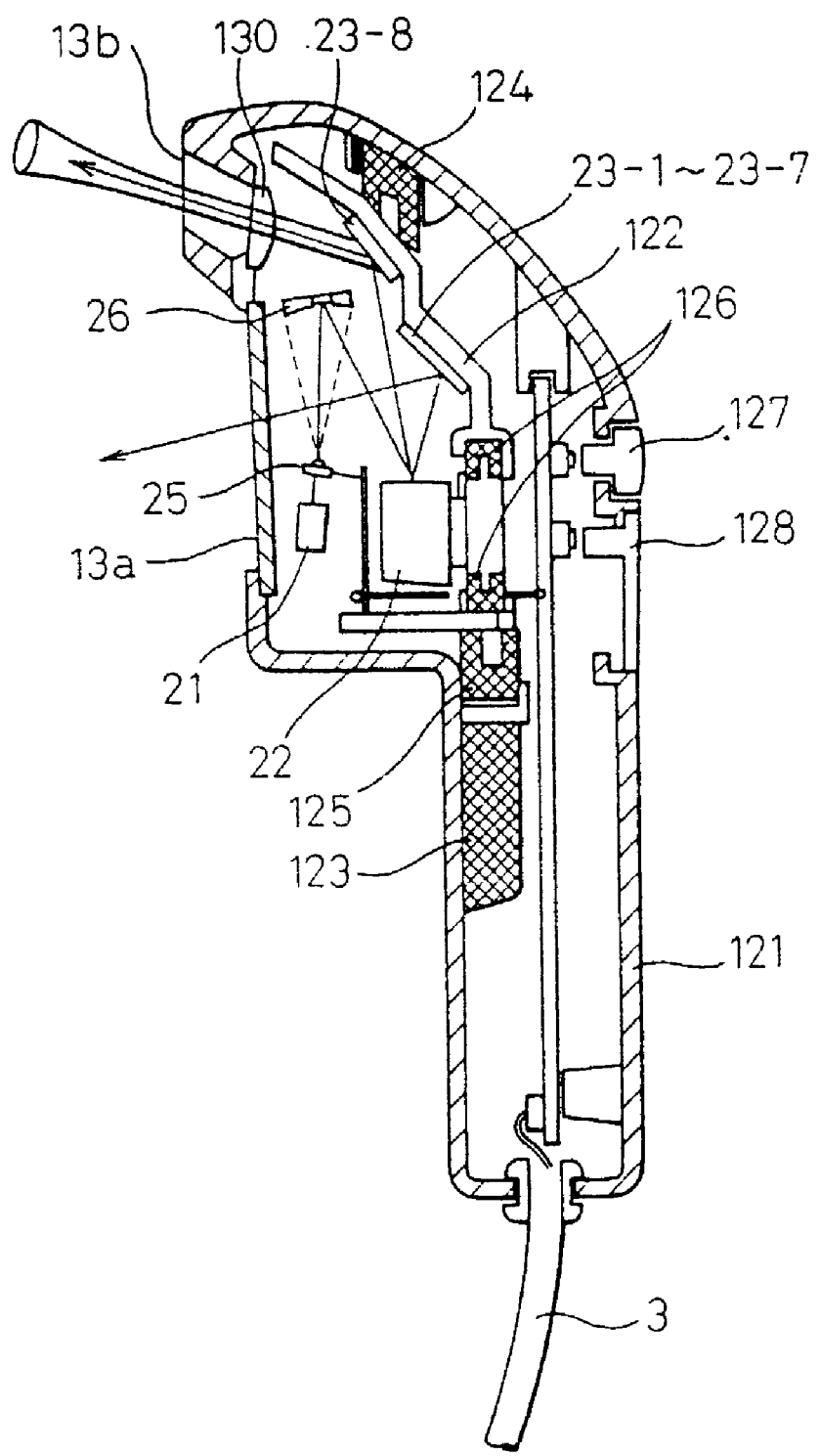
FIG. 90 is a side sectional view of a reader in which scanning light emitted through a second read window is condensed.

In the reader shown in FIG. 90, a beam reshaping lens 130 is placed in the vicinity of the second read window 13b. The beam reshaping lens 130 is a convex cylindrical lens, focuses scanning light in a vertical direction in FIG. 90, but does not change the diameter of the light in a horizontal direction (corresponding to a scan direction). Using this kind of beam reshaping lens, the focal position of the scanning light can approach the second read window. Furthermore, the read depth of the scanning light can be decreased.

Now, the reason why a cylindrical lens is used as the beam reshaping lens 130 will be described.

Figure 91A:
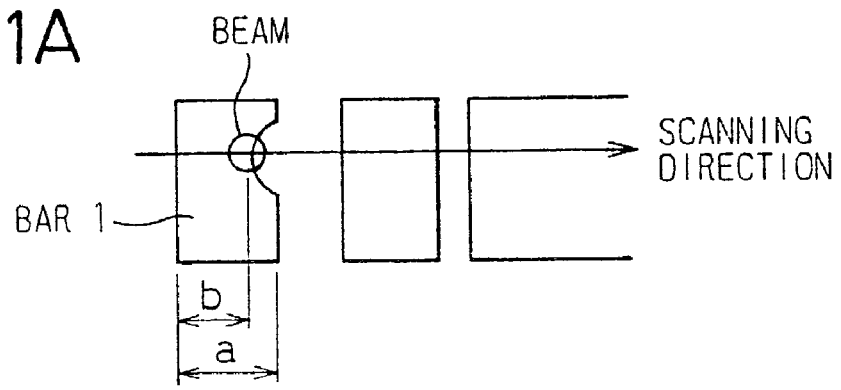
FIGS. 91A to 91C are diagrams for explaining the relationship between a diagram of light and bar-code reading.

Especially, when the diameter of light in a vertical direction is smaller than that in a scan direction, if a printed bar code has a missing portion as shown in FIG. 91A, the thickness of a bar of the read bar code may be recognized incorrectly. That is to say, in the case of FIG. 91A, although a bar 1 originally has a thickness a, when a missing portion thereof is scanned, the reader may recognize that the bar 1 has a thickness b. Bar-code reading is achieved incorrectly.

Figure 91B:
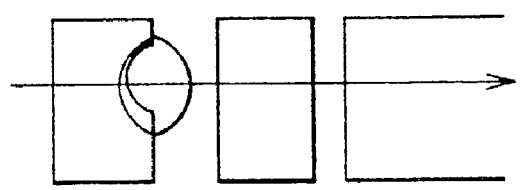

When the diameter of light in the vertical direction is made larger than that in the scan direction, a not-missing portion of a bar can be scanned as shown in FIG. 91B. The reader detects a bar code on the basis of an entire quantity of light emanating from a portion scanned by scanning light. In the case shown in FIG. 91B, although the bar 1 has a missing portion, the reader can recognize that the bar 1 has the thickness a.

As mentioned above, when the diameter of light in the vertical direction is made larger than that in the scan direction, incorrect reading caused by the missing portion of a bar shown in FIG. 91A can be prevented.

Figure 91C:
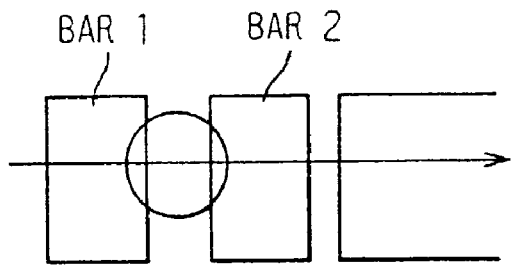

By contrast, if the diameter of light in the scan direction were made larger, the bar 1 and a bar 2 would be scanned by scanning light simultaneously as shown in FIG. 91C. This poses a problem that the reader cannot distinguish the bar 1 from the bar 2. The diameter of light in the scan direction must not be made larger.

For the above reason, a cylindrical lens is used as the beam reshaping lens.

Figure 92:
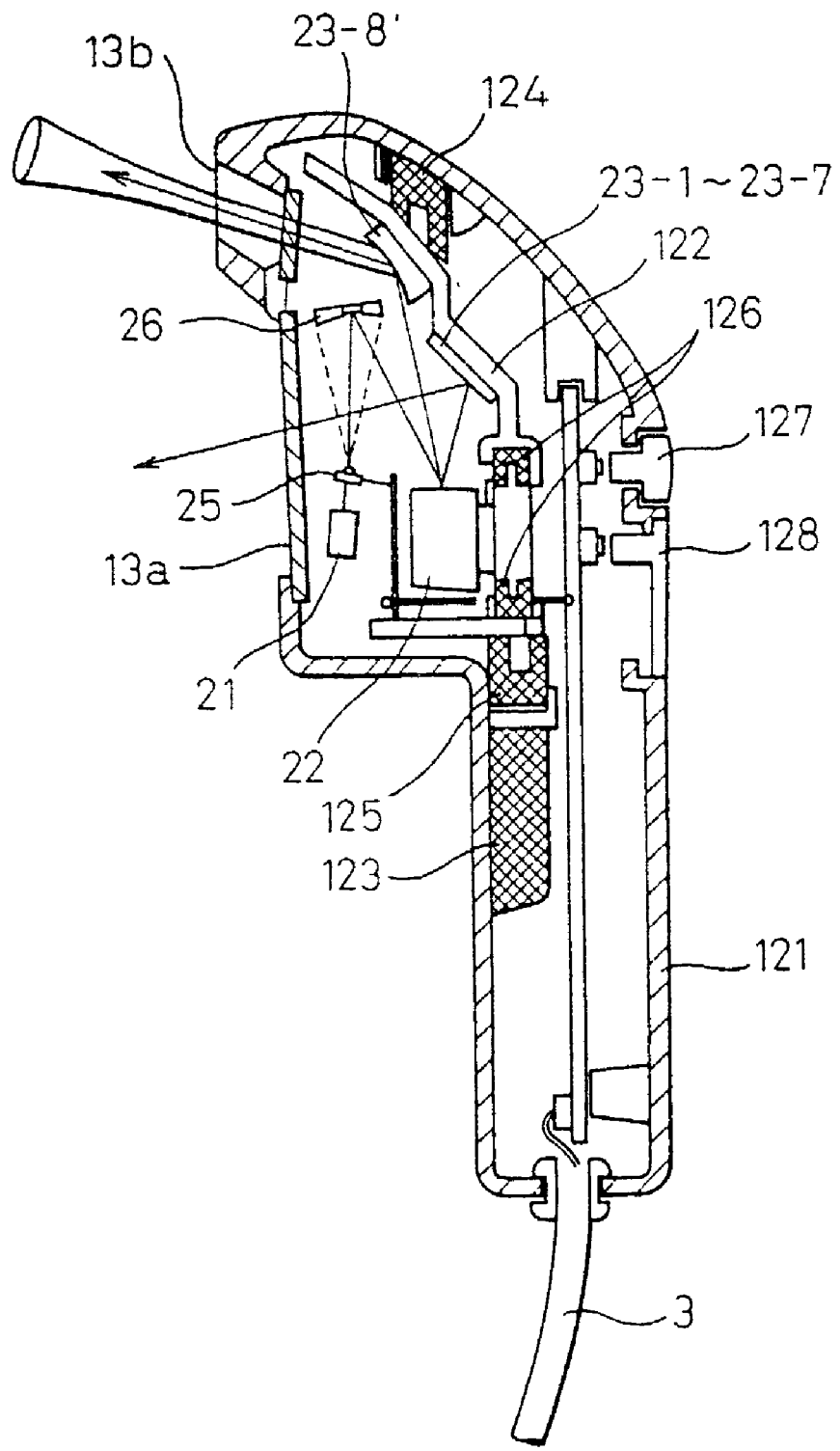
FIG. 92 is a view showing another example of a reader in which scanning light emitted through a second read window is condensed.

FIG. 92 is a variant of the reader shown in FIG. 90. In the case of the reader shown in FIG. 92, a cylindrical concave mirror is used as the floor mirror 23-8' in place of the cylindrical convex lens 130. In this case, the floor mirror 23-8' exerts the same operation as the cylindrical convex lens. That is to say, the focal position of scanning light is close to the second read window and the read depth of the scanning light is decreased.

When the foregoing cylindrical convex lens 130 and concave mirror are used in combination, reflected light received from a bar code can be varied depending on a distance of the bar code.

For example, when the cylindrical concave mirror 23-8' is used, light reflected from a bar code is converged on the cylindrical concave mirror 23-8'. The focal position of light reflected from the cylindrical concave mirror is varied depending on a distance between the cylindrical concave mirror and bar code. For reading a bar code through the second read window 13b, when the bar code is located at an optimal read position, reflected light to be converged on the cylindrical concave mirror 23-8' (plus a condenser mirror) must be focused on the face of a light reception sensor.

Owing to the above arrangement, light reflected from a bar code located away from the second read window 13b does not focus on the light reception surface of the light reception sensor, but goes out of focus. The light reflected from the bar code located away from the second read window cannot therefore be recognized by the reader. Thus, the read depth is substantially decreased.

A method of varying a quantity of scanning light is conceivable as another method for adjusting a read depth. When the quantity of scanning light diminishes, a quantity of light reflected from a bar code located away from a read window decreases. The reader cannot detect the reflected light. By contrast, when the quantity of scanning light is increased, a bar code separated by a distance comparable to the increase from the read window can be read.

During a period during which scanning light is being emitted through the first read window 13a, the quantity of scanning light is increased. Moreover, during a period during which scanning light is being emitted through the second read window 13b, the quantity of scanning light is decreased. The degree of a change in quantity of light is set according to a desired read depth. Owing to this system design, the read depth of scanning light emitted through each read window can be substantially adjusted without the necessity of using an optical part such as a lens.

A method similar to the one illustrated in FIGS. 36 to 39 can be adopted as a method for identifying a read window through which scanning light is emitted.

It is important to notify a user of the reader of whether the reader is set to the single-scanning mode or multi-scanning mode. In particular, when a bar code is read, if whichever read mode is set to read the bar code is notified, it can be reported to a user that, for example, a bar code supposed to be read in single-scanning mode has been read in multi-scanning mode.

Take for instance a reader in which the read mode can be changed to the single-scanning mode by pressing the mode selection switch. In this case, for reading a bar-code menu, the read mode must be changed to the single-scanning mode. A user moves the reader close to a bar code that is an object of reading while pressing the mode selection switch. However, in the case of a reader in which when the mode selection switch is released, the read mode is changed to the multi-scanning mode, there is a possibility that when a user releases the mode selection switch carelessly, the read mode is changed to the other, though the user did not intend it.

In such a case, the possibility that a bar code that is not an object of reading may be scanned and read using a scanning pattern supplied through the first read window becomes higher. Since all bar codes recorded on a menu sheet are valid, even if a bar code that is not a desired one is read because read modes have been changed, the reader considers that bar-code reading has been achieved correctly and reports the result of bar-code reading.

At this time, if it can be reported to the user in which read mode the reader operates or in which read mode the bar code has been read, it can be notified whether or not the reported bar-code reading meets the user's intention. Consequently, if necessary, input bar-code data can be invalidated or a desired bar code may be read.

Figure 93:
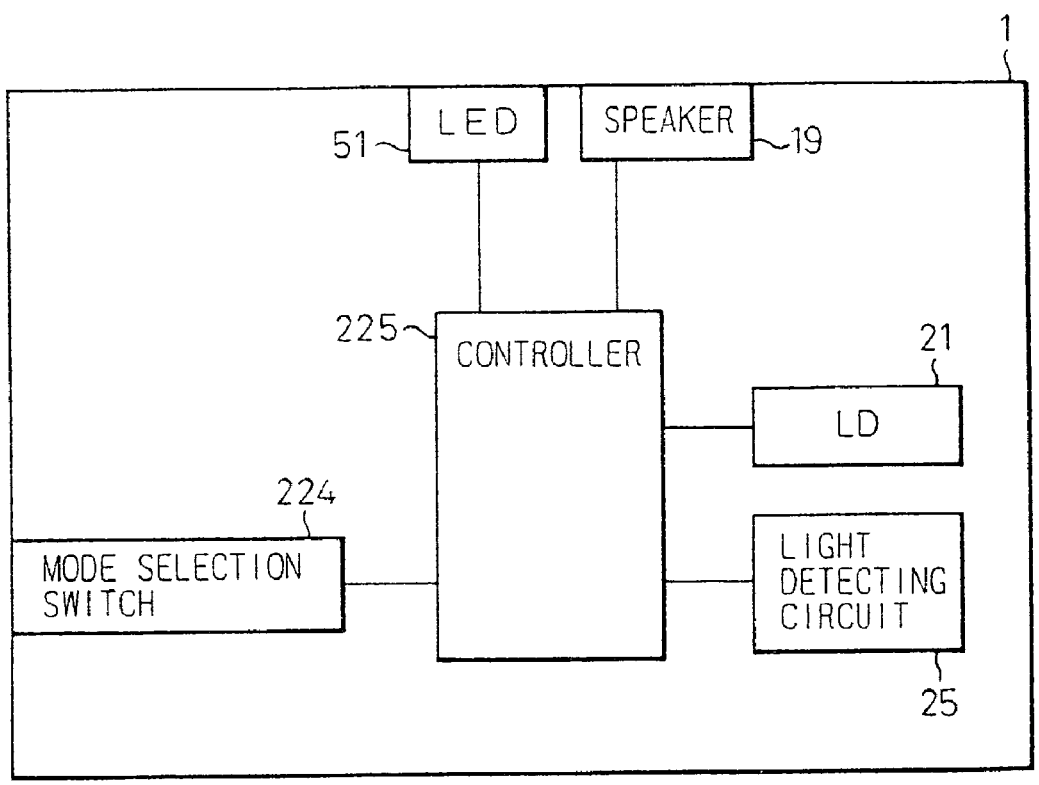
FIG. 93 is a block diagram of a reader.

FIG. 93 is a functional block diagram of a reader capable of making such notification. A controller 225 controls the operations of the whole reader, and is connected to a mode selection switch 224, a laser light source 21, and a light detection circuit 25. Furthermore, an LED 51 and speaker 19, used to notify a user of a bar-code reading situation, are connected to the controller 225.

Figure 94:
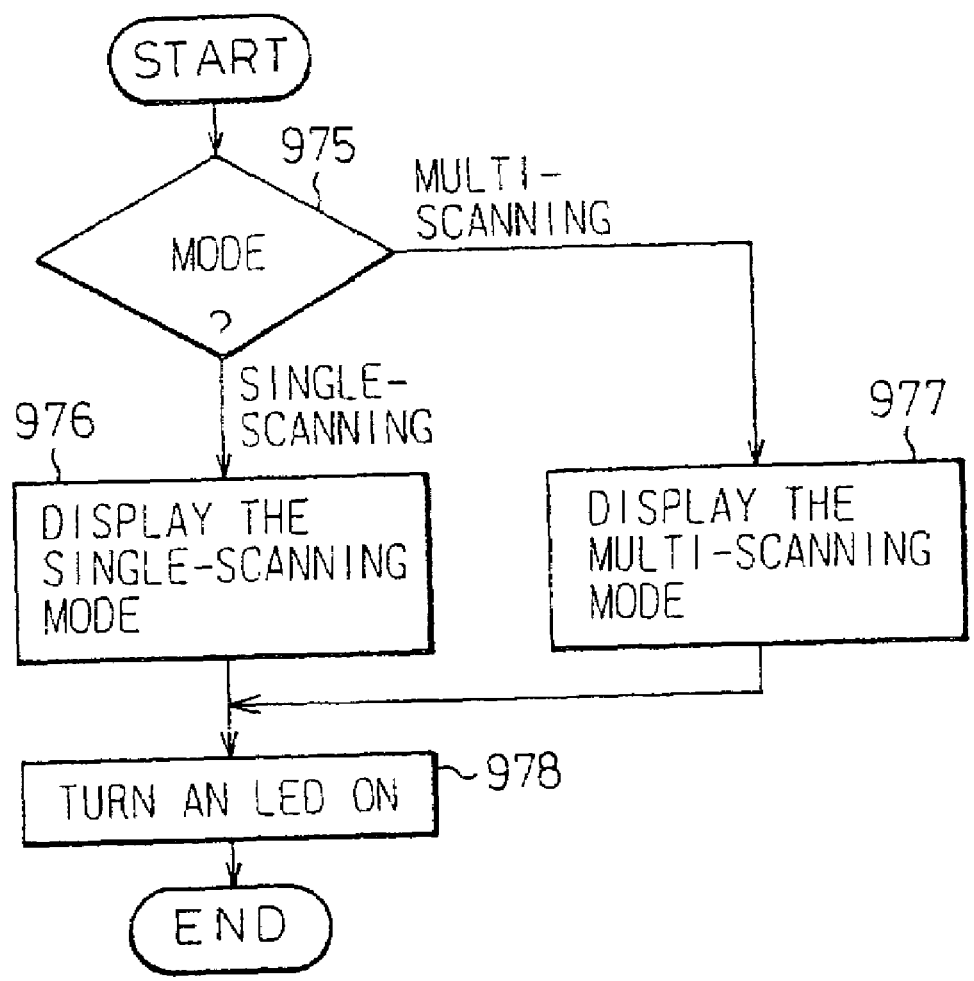
FIG. 94 is a flowchart describing a procedure of changing indicators of reading modes.

FIG. 94 is a flowchart describing indication control for the LED used to notify a user of a read mode in which the reader shown in FIG. 93 has been set for reading a bar code.

The controller 225 first recognizes a designated read mode (step 975). When the designated read mode is the single-scanning mode, indication control for the single-scanning mode is selected (step 976). By contrast, when the designated read mode is the multi-scanning mode, the controller selects indication control for the multi-scanning mode (step 977). For example, when a bar code has been read normally, the LED is lit through the selected indication control (step 987).

Herein, it is preferable that an indication of the single-scanning mode and an indication of the multi-scanning mode be indications mutually-distinguishable at sight.

Figure 95:
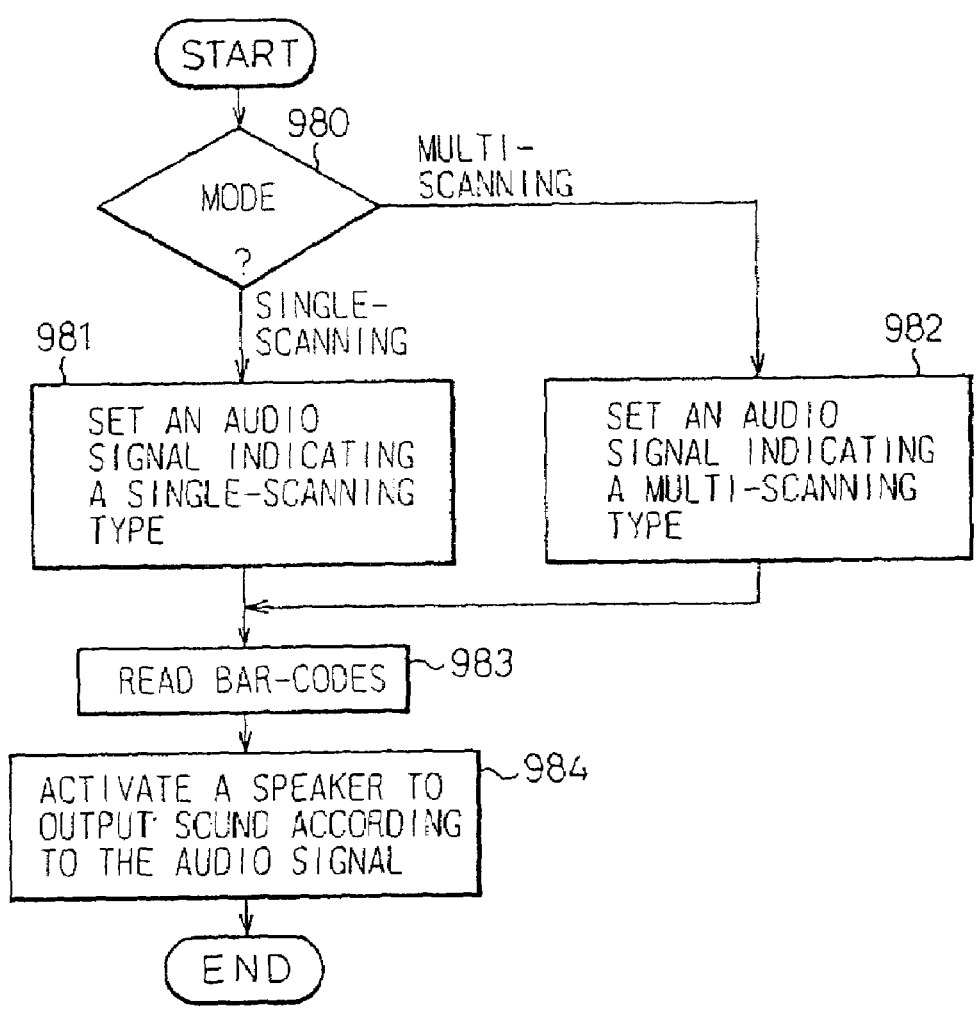
FIG. 95 is a flowchart describing a procedure of rumbling sound change to be performed for notifying read modes using rumbling sounds.

FIG. 95 is a flowchart describing control of rumbling of the speaker, which is used to notify a user of a read mode in which the reader shown in FIG. 93 has been set for reading a bar code.

The controller first recognizes a designated read mode (step 980). When the designated read mode is the single-scanning mode, rumbling control for the single-scanning mode is selected (step 981). By contrast, when the designated read mode is the multi-scanning mode, the controller selects rumbling control for the multi-scanning mode (step 982). For example, when a bar code is read normally (step 983), the speaker is driven to generate a rumbling sound through the selected rumbling control (step 984).

Herein, it is preferable that a rumbling sound for the single-scanning mode and a rumbling sound for the multi-scanning mode be rumbling sounds mutually-distinguishable immediately.

Figure 96:
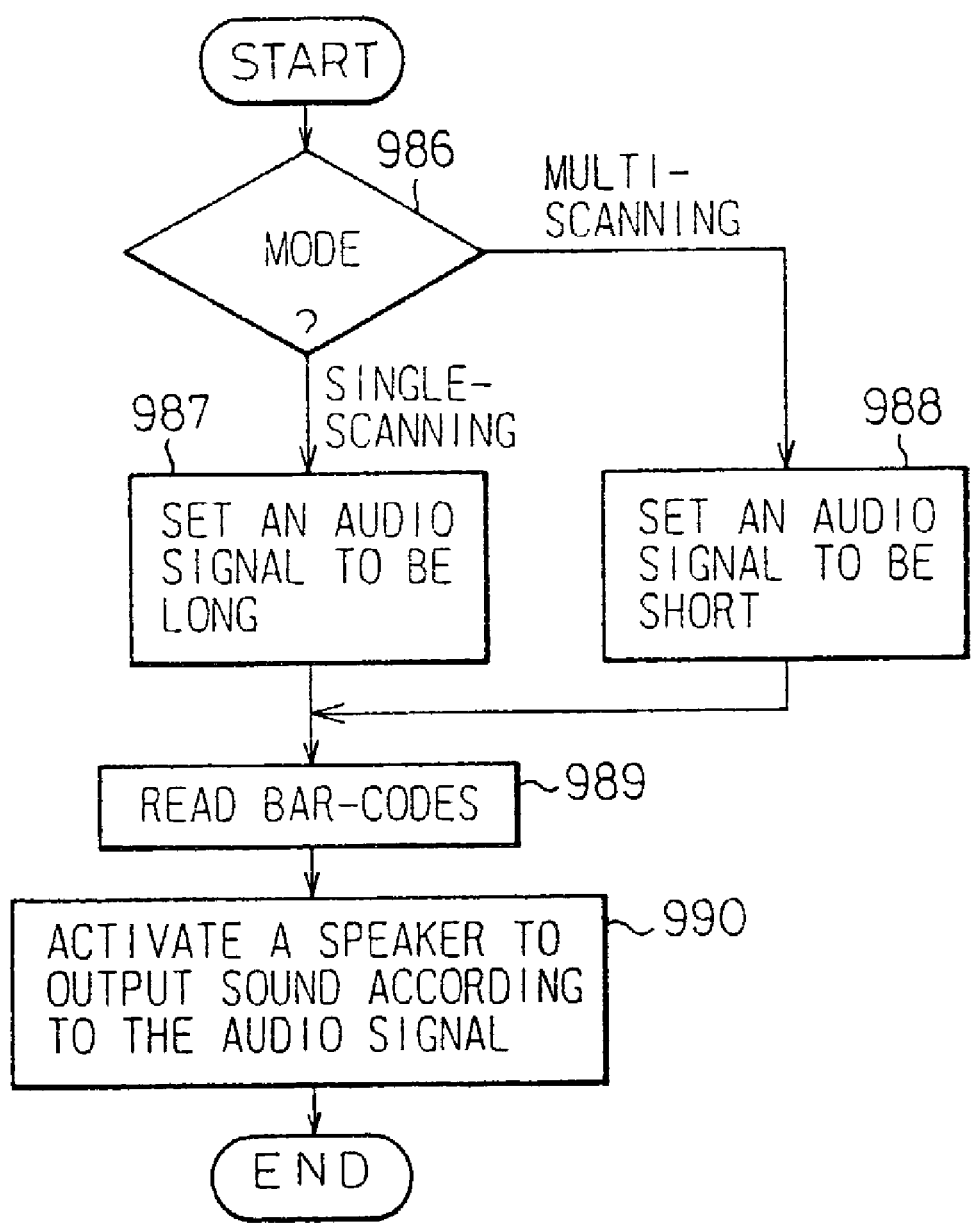
FIG. 96 is a flowchart describing a procedure of rumbling sound change to be performed for notifying read modes using long and short rumbling sounds.

FIG. 96 is a flowchart describing control of varying the length of a rumbling sound between the single-scanning mode and multi-scanning mode in order to distinguish one read mode from the other. Herein, for the single-scanning mode, the rumbling sound is made longer. For the multi-scanning mode, the rumbling sound is made shorter.

The controller first recognizes a designated read mode (step 986). When the designated read mode is the single-scanning mode, the controller sets the rumbling sound to a longer one (step 987). By contrast, when the designated read mode is the multi-scanning mode, the controller sets the rumbling sound to a shorter one (step 988).

Thereafter, every time bar-code reading is carried out, the controller drives the speaker according to a designated length of the rumbling sound and allows the speaker to generate a rumbling sound (step 990).

Figure 97:
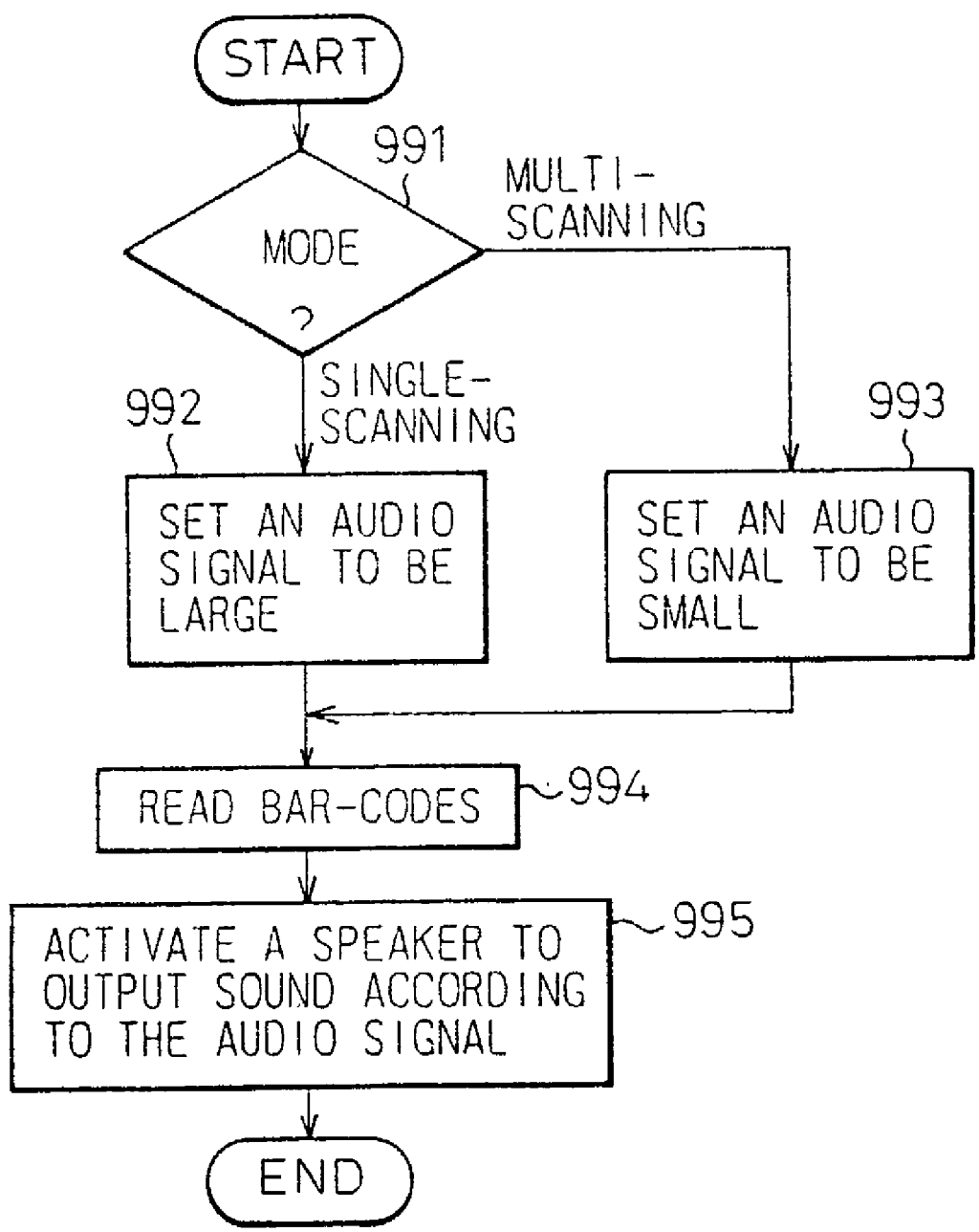
FIG. 97 is a flowchart describing a procedure of rumbling sound change to be performed for notifying read modes using large- and small-volume rumbling sounds.

FIG. 97 is a flowchart describing control for varying the volume of a rumbling sound according to a designated read mode unlike the control described in FIG. 96. In the case described in FIG. 97, in particular, the rumbling sound is made larger for the single-scanning mode, and made smaller for the multi-scanning mode.

The controller first recognizes a designated read mode (step 991). When the designated read mode is the single-scanning mode, the controller sets the rumbling sound to a larger volume (step 992). By contrast, when the designated read mode is the multi-scanning mode, the controller sets the rumbling sound to a smaller volume (step 993).

Thereafter, every time bar-code reading is carried out (step 994), the controller drives the speaker according to a designated volume of the rumbling sound and allows the speaker to generate a rumbling sound (step 995).

Figure 98:
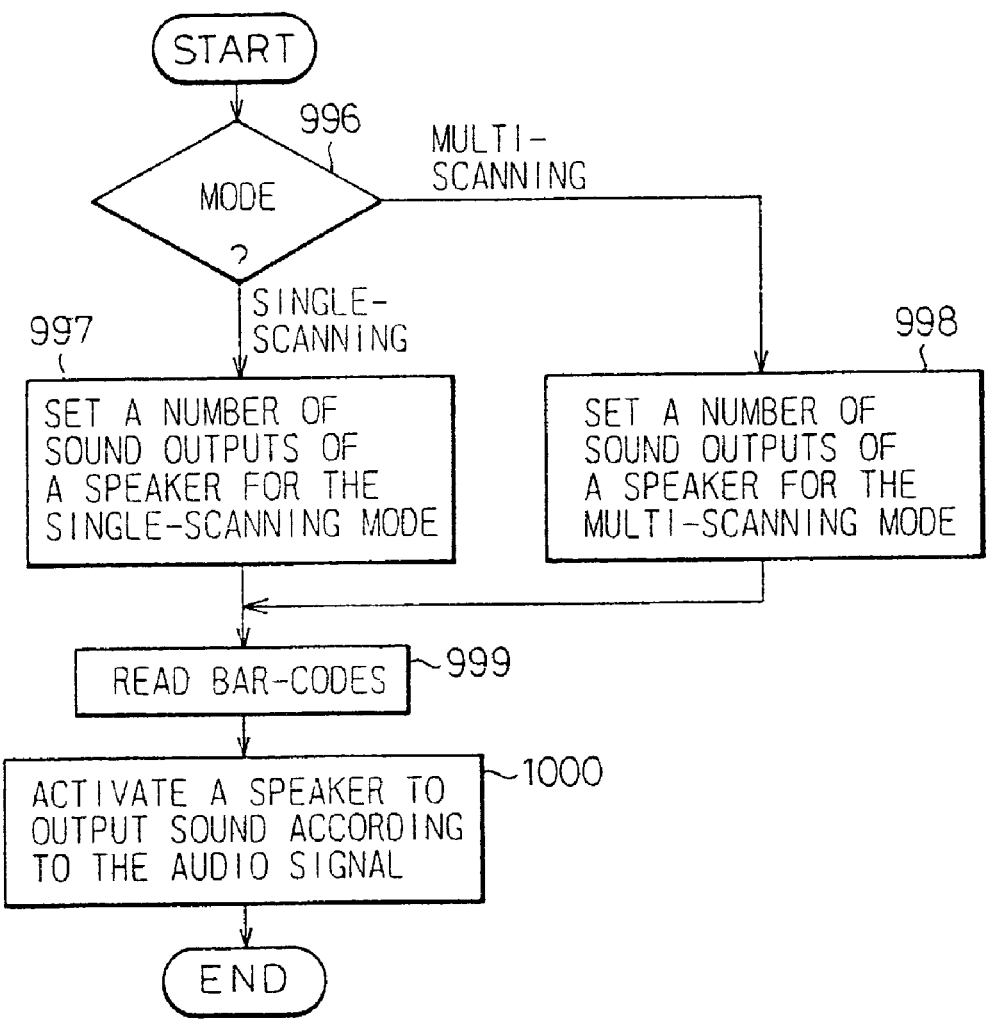
FIG. 98 is a flowchart describing a procedure of rumbling sound change to be performed for notifying read modes using the different numbers of rumbling sounds.

FIG. 98 is a flowchart describing control for varying the number of rumbling sounds given by the speaker according to a designated read mode.

The controller recognizes a designated read mode (step 996). When the designated read mode is the single-scanning mode, the number of rumbling sounds is set to a value specified for the single-scanning mode (for example, one) (step 997).

By contrast, when the designated read mode is the multi-scanning mode, the controller sets the number of rumbling sounds to a value specified for the multi-scanning mode (for example, three) (step 998).

Thereafter, every time a bar-code is read (step 999), the controller generates a designated number of rumbling sounds (step 1000).

Figure 99:
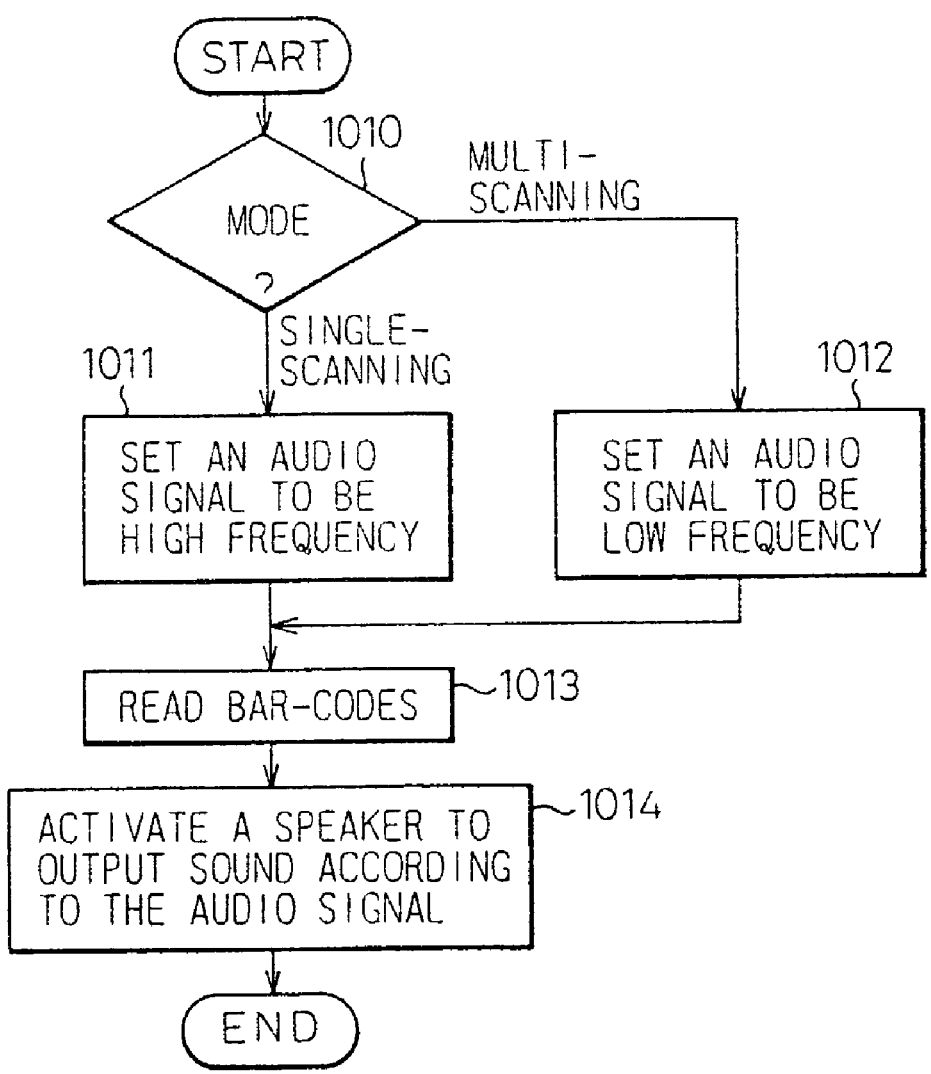
FIG. 99 is a flowchart describing a procedure of rumbling sound change to be performed for notifying read modes using high- and low-pitch rumbling sounds.

FIG. 99 is a flowchart describing control for varying the pitch of a rumbling sound given by the speaker according to a read mode. In the case shown in FIG. 99, in particular, the pitch of the rumbling sound is made higher for the single-scanning mode.

The controller first recognizes a read mode (step 1010). When the single-scanning mode is designated, the controller sets the rumbling sound to a higher pitch (step 1011).

By contrast, when the designated read mode is the multi-scanning mode, the controller sets the rumbling sound to a lower pitch (step 1012).

Thereafter, every time a bar code is read (step 1013), the controller operates the speaker according to a designated pitch of the rumbling sound (step 1014).

Figure 100:
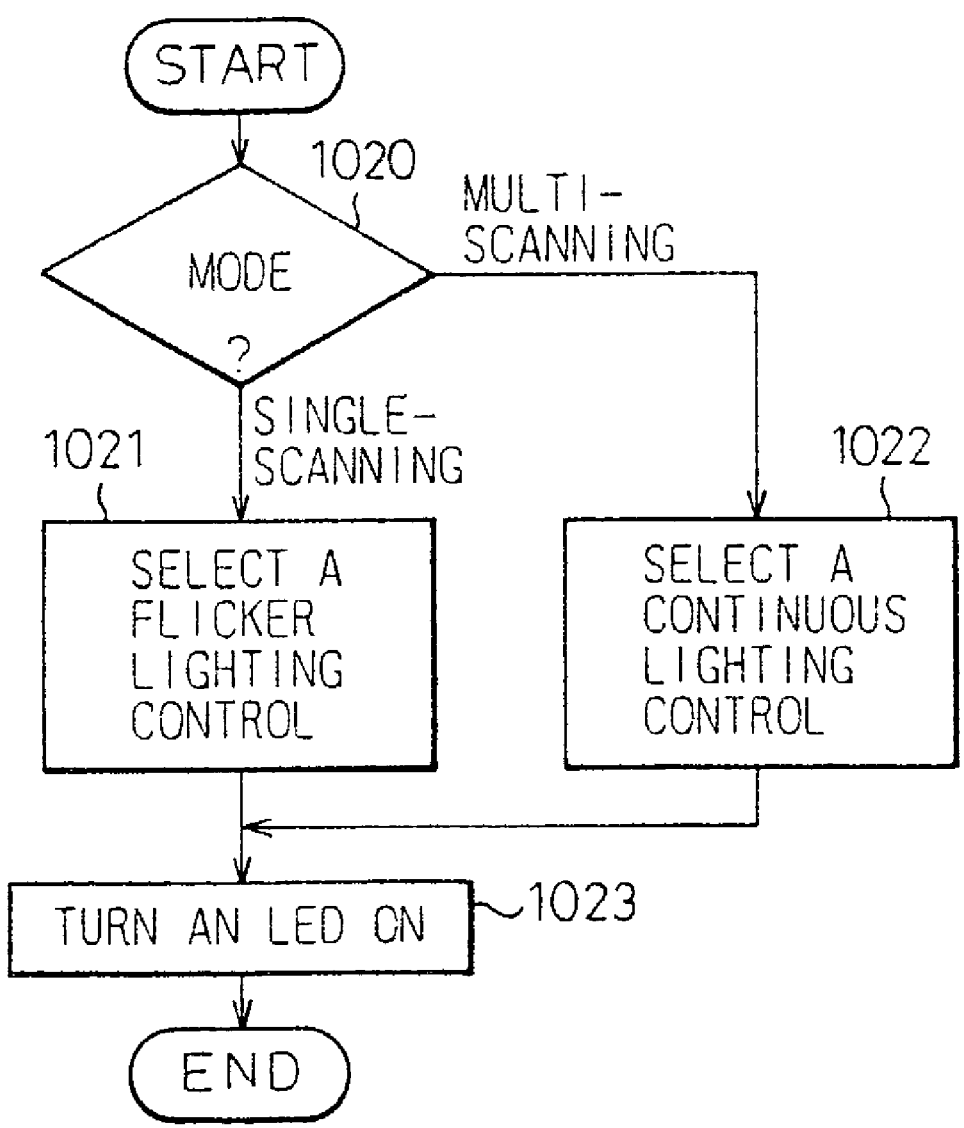
FIG. 100 is a flowchart describing indicator state change control to be performed when read modes are notified according to the indication mode of indicators.

FIG. 100 is a flowchart describing control for notifying a user of a currently-set read mode using an LED indicator. Herein, the LED flickers in single-scanning mode, and is lit continually in multi-scanning mode.

First, when a read mode is selected, the controller recognizes the read mode (step 1020). When the single-scanning mode is selected, control of flickering the LED is selected and the LED flickers (step 1021). By contrast, when the multi-scanning mode is selected, the controller selects control of continual lighting and the LED is lit continually (step 1022).

LED control is changed from one to the other concurrently with changing of the read mode from the multi-scanning mode to the single-scanning mode or vice versa which has been described in conjunction with FIG. 41. Specifically, when the multi-scanning mode is selected, the controller changes LED control into continual lighting, and gives control for validating the multi-scanning mode; that is, reading to be performed during a period during which scanning light is emitted through the first read window.

By adopting the foregoing method, a read mode set at that time can be reported to a user. Incorrect bar-code reading (reading without selecting a read mode that should be selected) can therefore be prevented. In particular, when the method of notifying a read mode irrespective of the result of reading is adopted, it can be reported to a user that manipulating the mode selection switch is requested.

As a method for giving different indications using the LED, aside from the method of flickering or continually lighting the LED, there is a method of changing indication colors of the LED.

Incidentally, for varying a rumbling sound, an interval between rumbling sounds may be varied according to a read mode.

Figure 101:
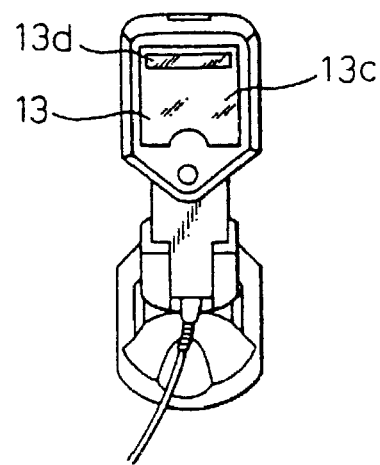
FIG. 101 is a view showing a reader having one read window (divided into a plurality of areas)

The reader in which the first read window 13a and second read window 13b are independent windows has been described so far. Alternatively, as shown in FIG. 101, the number of read windows may be one. Herein, a read window is divided into a first area 13c through which a scanning pattern composed of numerous scanning rays is supplied, and second area 13d through which a scanning ray suitable for reading a bar-code menu is emitted. In the case shown in FIG. 101, a mark defining the second area is inscribed around the area. This mark enables a user to identify a position from which scanning light is emitted. Needless to say, the mark need not be inscribed on the face of the read window. As long as scanning patterns suitable for respective read modes can be supplied, an object of the present invention can be accomplished satisfactorily.

In the embodiment described so far, a scanning pattern is supplied from each of the first read area and second read area. Alternatively, the areas may be united into one, and multi-scanning may be carried out in principle. For performing single-scanning, a specific scanning ray constituting a multi-scanning pattern is selected, and bar-code reading is validated only during a period during which the scanning ray is emitted. In the case of the scanning patten shown in FIG. 10, since the scanning ray El-1 is scanning horizontally, the scanning ray El-1 alone is used in single-scanning mode.

In this case, it becomes unnecessary to include the floor mirror 23-8 and second read window 13b in the reader. The scanning pattern 23-8 shown in FIG. 10 will not be created.

Figure 102:
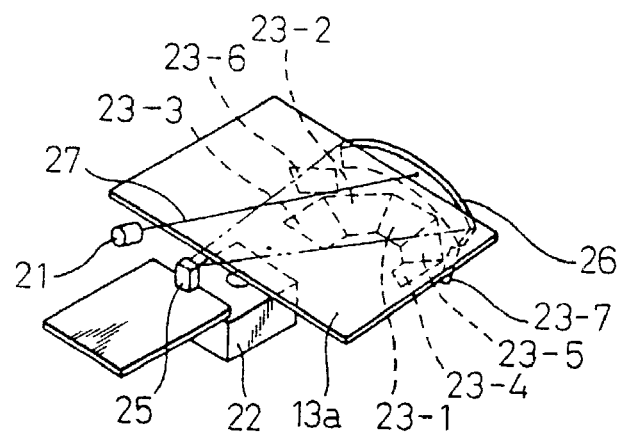
FIG. 102 is a perspective oblique view showing a reader in which reading is validated in a single-scanning mode during a period during which part of scanning rays constituting a multi-scanning pattern is emitted.
Figure 103:
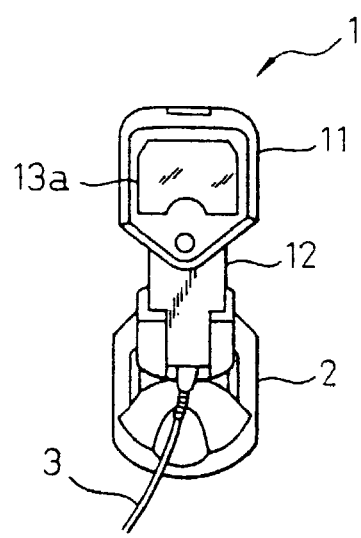
FIG. 103 is a view showing the appearance of the reader shown in FIG. 94.

Moreover, the components of the optical system are only the floor mirrors 23-1 to 23-5 as shown in FIG. 102. The reader can have an area for forming a read window reduced as shown in FIG. 103. Assuming that the specific scanning ray is a scanning ray reflected from the floor mirror 23-1, in a single-scanning mode, bar-code reading is validated only during a period during which the floor mirror 23-1 is being scanned (the light source is lit, the light reception circuit is validated, or decoding is validated).

Judging whether or not light reflected from the polygon mirror is scanning the floor mirror 23-1 is achieved by utilizing the slits formed in the polygon mirror which are shown in FIG. 36 and thereafter. Moreover, the system design for validating bar-code reading only during a period during which the floor mirror 23-1 is being scanned is the same as the one described previously.

In the description made so far, one read mode is changed to the other only during a period during which the mode selection switch is held down. When the mode selection switch is released, the one read mode is reset. However, the mode selection switch is not limited to this structure. Alternatively, every time the mode selection switch is pressed (it need not be pressed continually), read modes may be changed.

The invention claimed is:

1. An optical scanning device comprising:
a housing;
a pistol grip for holding the housing;
a scanner, disposed in the housing, producing reading scan patterns for reading a bar code, said scanner selectively producing a first reading scan pattern, and a second reading scan pattern different from the first reading scan pattern, wherein both first and second reading scan patterns are used for reading and decoding bar code data;
a switch, mounted on said housing, manipulated by a user for instructing which of said first and second reading scan patterns should be selected;
a stand on which said housing is mounted; and
a controller disposed in the housing to control the scanner to produce either of the first and second reading scan patterns on the basis of instruction of said switch,
wherein said switch is located on the pistol grip for front-side manipulation.

2. The optical scanning device according to claim 1, wherein the switch is located where an index finger lies when the grip is held by a hand for scanning.

* * * * *